US012521072B2

(12) United States Patent
Shimizukawa et al.

(10) Patent No.: US 12,521,072 B2
(45) Date of Patent: Jan. 13, 2026

(54) COMPUTED TOMOGRAPHY APPARATUS

(71) Applicant: FUJIFILM CORPORATION, Tokyo (JP)

(72) Inventors: Sho Shimizukawa, Kanagawa (JP); Takashi Tajima, Kanagawa (JP); Tatsuya Taneichi, Kanagawa (JP); Naoyuki Nishino, Kanagawa (JP); Hisatsugu Horiuchi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 203 days.

(21) Appl. No.: 18/448,982

(22) Filed: Aug. 14, 2023

(65) Prior Publication Data

US 2024/0065644 A1 Feb. 29, 2024

(30) Foreign Application Priority Data

Aug. 23, 2022 (JP) ................... 2022-132604

(51) Int. Cl.
*A61B 6/00* (2024.01)
*A61B 6/03* (2006.01)
*A61B 6/40* (2024.01)

(52) U.S. Cl.
CPC ............ *A61B 6/032* (2013.01); *A61B 6/4014* (2013.01); *A61B 6/4078* (2013.01); *A61B 6/5241* (2013.01); *A61B 6/54* (2013.01)

(58) Field of Classification Search
CPC ..... A61B 6/032; A61B 6/4014; A61B 6/4078; A61B 6/5241; A61B 6/54; A61B 6/5205
See application file for complete search history.

(56) References Cited

U.S. PATENT DOCUMENTS

| 2005/0175143 | A1* | 8/2005 | Miyazaki | ............... A61B 6/032 378/19 |
| 2008/0009717 | A1* | 1/2008 | Herrmann | ............. G06T 11/006 600/425 |
| 2010/0034346 | A1* | 2/2010 | Kato | ...................... A61B 6/587 378/115 |
| 2016/0081635 | A1* | 3/2016 | Divine | .................. A61B 6/032 378/19 |
| 2016/0278724 | A1* | 9/2016 | Papaioannou | ......... A61B 6/102 |
| 2021/0145374 | A1* | 5/2021 | Seppala | ............... A61B 6/0442 |
| 2021/0383582 | A1* | 12/2021 | De Man | ............... A61B 6/5264 |

FOREIGN PATENT DOCUMENTS

JP 2003-061946 A 3/2003

* cited by examiner

*Primary Examiner* — David J Makiya
*Assistant Examiner* — Mamadou Faye
(74) *Attorney, Agent, or Firm* — SOLARIS Intellectual Property Group, PLLC

(57) ABSTRACT

An imaging control unit performs conventional scanning, which directs a rotation mechanism to rotate a radiation source and a radiation detector without changing a positional relationship between a subject, and the radiation source and the radiation detector in a rotation axis direction, directs the radiation source to emit radiation whenever the radiation source and the radiation detector are rotated by a preset angle, and directs the radiation detector to output a projection image, at a plurality of height positions along the rotation axis direction. The image processing unit generates a tomographic image on the basis of the projection images obtained at the plurality of height positions.

10 Claims, 41 Drawing Sheets

| CASE IN WHICH DESIGNATED IMAGING RANGE EXCEEDS WIDTH OF DETECTION SURFACE |

| SET TWO OR MORE HEIGHT POSITIONS |

| CASE IN WHICH DESIGNATED IMAGING RANGE IS WITHIN WIDTH OF DETECTION SURFACE |

| SET ONE HEIGHT POSITION |

COMPUTED TOMOGRAPHY APPARATUS

CROSS-REFERENCE TO RELATED APPLICATIONS

The present application claims priority under 35 U.S.C. § 119 to Japanese Patent Application No. 2022-132604, filed on Aug. 23, 2022. The above application is hereby expressly incorporated by reference, in its entirety, into the present application.

BACKGROUND

1. Technical Field

The technology of the present disclosure relates to a computed tomography apparatus.

2. Description of the Related Art

JP2003-061946A discloses a computed tomography apparatus (hereinafter, referred to as a CT apparatus) for imaging a subject in a decubitus posture. In the CT apparatus disclosed in JP2003-061946A, a radiation source that emits radiation to the subject and a radiation detector that detects the radiation transmitted through the subject are rotated around a body axis of the subject. Whenever the radiation source and the radiation detector are rotated by a preset angle, the radiation is emitted from the radiation source, and a plurality of projection images at each of the preset angles are obtained from the radiation detector. Then, a tomographic image is generated from the plurality of projection images. The radiation source emits a cone beam, and the radiation detector has a configuration in which a plurality of pixels are arranged in a two-dimensional matrix.

JP2003-061946A discloses an aspect in which helical scanning (referred to as spiral scanning in JP2003-061946A) is performed around the body axis of the subject with the radiation source and the radiation detector in order to obtain a tomographic image of a wider range of the subject in a body axis direction.

SUMMARY

The inventors have conceived a CT apparatus for obtaining a tomographic image of a subject in a standing posture or a sitting posture. In a case in which the technique disclosed in JP2003-061946A is used, the CT apparatus has the following problems. That is, in the CT apparatus disclosed in JP2003-061946A, in a case in which the helical scanning is performed, a bed on which the subject in the decubitus posture is placed is moved in the body axis direction. However, the subject in the standing posture or the sitting posture is more unstable than that in the decubitus posture. Therefore, in a case in which the subject in the standing posture or the sitting posture is raised or lowered in the body axis direction according to JP2003-061946A, the subject is likely to stagger, and there is a high possibility that the quality of the tomographic image will deteriorate due to body movement such as staggering. In addition, operation control for the helical scanning is complicated.

One embodiment of the technology of the present disclosure provides a computed tomography apparatus that can obtain a tomographic image of a wider range of a subject in a body axis direction with simple operation control while reducing a concern that body movement will occur in the subject.

According to the present disclosure, there is provided a computed tomography apparatus comprising: a radiation source that emits radiation having a quadrangular pyramid shape to a subject positioned in either a standing posture or a sitting posture; a radiation detector in which a plurality of pixels detecting the radiation transmitted through the subject are two-dimensionally arranged and which outputs a projection image of the subject; a rotation mechanism that rotates the radiation source and the radiation detector around a body axis of the subject; an elevating mechanism that raises and lowers the radiation source and the radiation detector along a rotation axis direction; and a processor that controls operations of the radiation source, the radiation detector, the rotation mechanism, and the elevating mechanism. The processor performs conventional scanning, which directs the rotation mechanism to rotate the radiation source and the radiation detector without changing a positional relationship between the subject, and the radiation source and the radiation detector in the rotation axis direction, directs the radiation source to emit the radiation whenever the radiation source and the radiation detector are rotated by a preset angle, and directs the radiation detector to output the projection image, at a plurality of height positions along the rotation axis direction, and generates a tomographic image on the basis of the projection images obtained at the plurality of height positions.

Preferably, the processor sets the height positions such that a first overlapping imaging range occurs between the projection images obtained at the height positions adjacent to each other, generates a plurality of the tomographic images at each of the plurality of height positions from the projection images obtained at the plurality of height positions, and registers the plurality of tomographic images on the basis of the first overlapping imaging range to combine the plurality of tomographic images.

Preferably, the processor combines the plurality of tomographic images, selectively using a portion that is closer to a focal axis of the radiation in the first overlapping imaging range.

Preferably, the processor rotates the radiation source and the radiation detector in different directions at the height positions adjacent to each other.

Preferably, the processor receives designation of an imaging range along the rotation axis direction and directs the elevating mechanism to move the radiation source and the radiation detector to the height position corresponding to the designated imaging range.

Preferably, in a case in which the designated imaging range is within a width of a detection surface for the radiation in the radiation detector, the processor performs the conventional scanning only once at one height position corresponding to the designated imaging range.

Preferably, the computed tomography apparatus further comprises a camera that images the subject, and the processor performs control to display bars indicating upper and lower ends of the imaging range to be superimposed on a camera image obtained from the camera and receives the imaging range designated by an operation of moving the bars.

Preferably, the processor performs control to output a warning in a case in which an upper end of the designated imaging range exceeds an upper limit and in a case in which a lower end of the designated imaging range exceeds a lower limit.

Preferably, the computed tomography apparatus further comprises a plurality of imaging units each of which is composed of a set of the radiation source and the radiation detector and which have different phases in a rotation direction.

Preferably, the computed tomography apparatus further comprises a displacement mechanism that changes an interval between the plurality of imaging units in the rotation axis direction.

Preferably, the processor sets the interval such that a second overlapping imaging range occurs between the projection images obtained by the imaging units adjacent to each other in a case in which the plurality of imaging units are rotated in parallel to image an imaging range that exceeds a width of a detection surface for the radiation in the radiation detector, generates a plurality of the tomographic images for each of the plurality of imaging units on the basis of the projection images obtained from each of the plurality of imaging units, and registers the plurality of tomographic images on the basis of the second overlapping imaging range to combine the plurality of tomographic images.

According to the technology of the present disclosure, it is possible to provide a computed tomography apparatus that can obtain a tomographic image of a wider range of a subject in a body axis direction with simple operation control while reducing a concern that body movement will occur in the subject.

BRIEF DESCRIPTION OF THE DRAWINGS

Exemplary embodiments according to the technique of the present disclosure will be described in detail based on the following figures, wherein.

DETAILED DESCRIPTION

Figure 1:
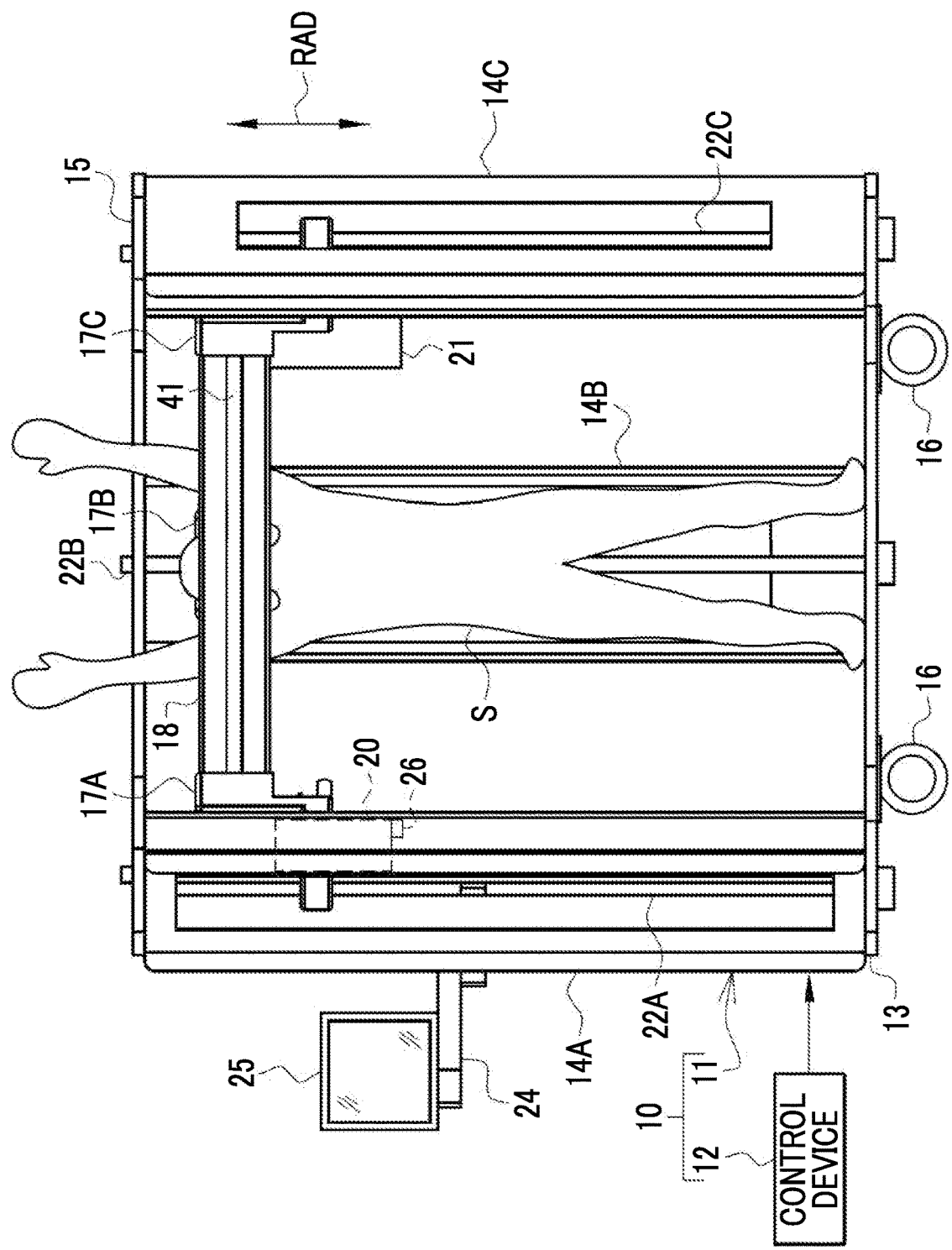
FIG. 1 is a front view illustrating a CT apparatus.

For example, as illustrated in FIG. 1, a CT apparatus 10 is an apparatus for obtaining a tomographic image of a subject S and is composed of an apparatus main body 11 and a control device 12. The apparatus main body 11 is installed, for example, in an imaging room of a medical facility. The control device 12 is installed, for example, in a control room next to the imaging room. The control device 12 is a desktop personal computer, a notebook personal computer, or a tablet terminal. The control device 12 is operated by an operator of the CT apparatus 10 such as a medical radiologist.

Figure 2:
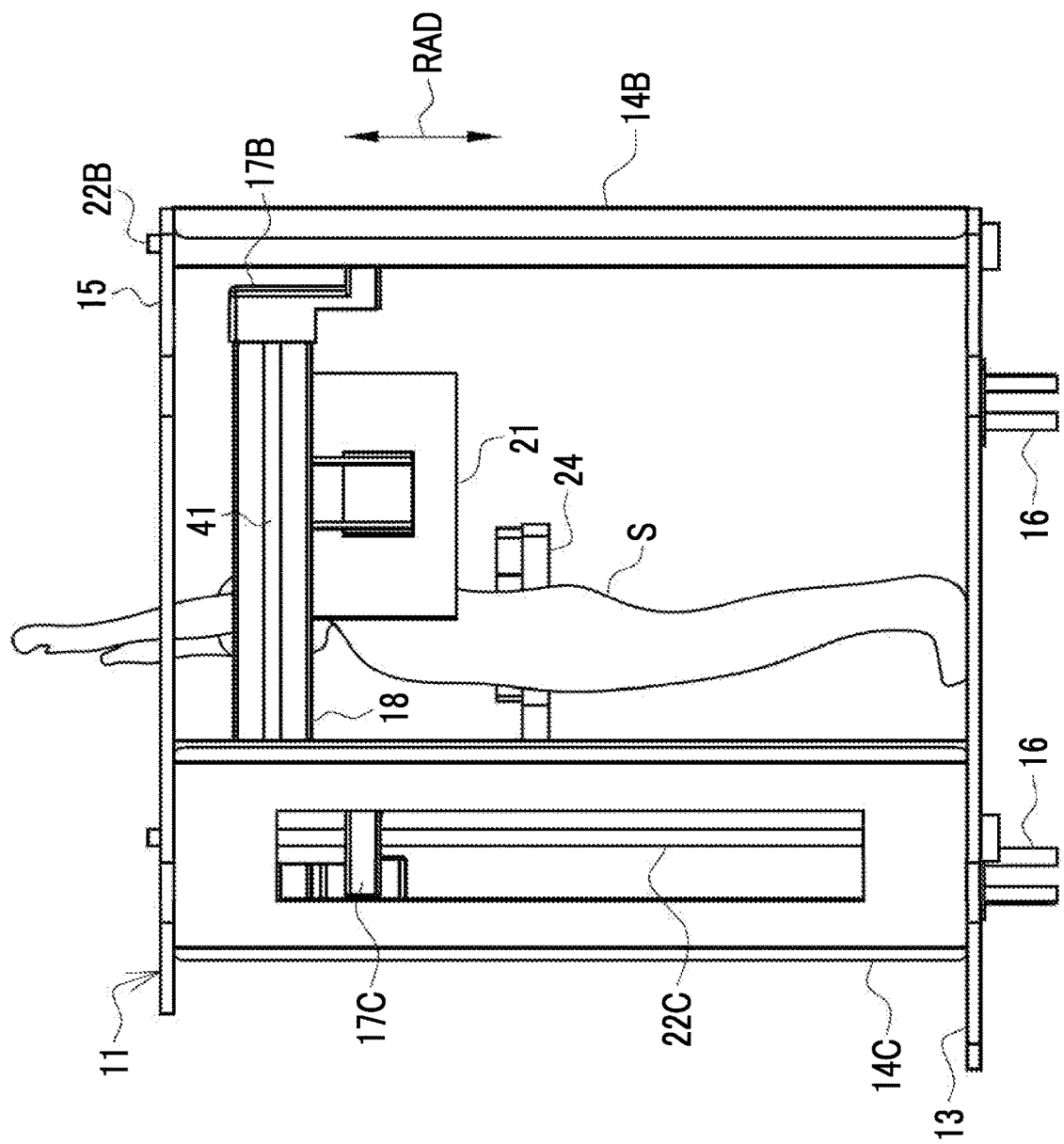
FIG. 2 is a side view illustrating the CT apparatus.

For example, as illustrated in FIG. 2, the apparatus main body 11 comprises a stage 13, three columns 14A, 14B, and 14C, and a top plate 15. The stage 13 is, for example, an octagonal flat plate (see FIG. 6). Casters 16 for transportation are attached to four corners of a rear surface of the stage 13. The caster 16 comprises a rotation lock mechanism (not illustrated). After the apparatus main body 11 is installed at an installation position, the rotation lock mechanism can be operated to lock the rotation of the caster 16. Alternatively, the caster 16 can be removed from the stage 13. The caster 16 can be removed after the apparatus main body 11 is installed at the installation position.

The outer shape of the columns 14A to 14C is a rectangular plate shape, and the columns 14A to 14C are vertically provided at four corners of the surface of the stage 13. The columns 14A and 14C are disposed on the front left and right sides of the apparatus main body 11 (the front left and right sides of the subject S). The column 14B is disposed at the center of the rear side of the apparatus main body 11 (behind the subject S). The top plate 15 is attached to the upper end portions of the columns 14A to 14C. The top plate 15 is, for example, an octagonal flat plate having an outer shape that follows the stage 13 (see FIG. 6). The top plate 15 has a C-shape in which a central portion is hollowed out in a circular shape and a portion corresponding to the front side of the apparatus main body 11 between the columns 14A and 14C is cut out. Further, in the following description, the columns 14A to 14C are collectively referred to as columns 14 in a case in which they do not need to be distinguished from each other.

A connection member 17A is connected to the column 14A, a connection member 17B is connected to the column 14B, and a connection member 17C is connected to the column 14C. A frame 18 is connected to the connection members 17A to 17C. That is, the columns 14A to 14C and the frame 18 are connected to each other through the connection members 17A to 17C. Furthermore, in the following description, the connection members 17A to 17C are collectively referred to as connection members 17 in a case in which they do not need to be distinguished from each other.

The frame 18 has an annular shape. The subject S is positioned at a center C (see FIG. 6) of the annular frame 18. FIGS. 1 and 2 illustrate an aspect in which the subject S in a standing posture with both hands raised above the head is positioned.

The column 14 is provided with a guide rail (not illustrated) to which the connection member 17 is fitted. The connection member 17 and thus the frame 18 can be raised and lowered in the vertical direction along the guide rail. That is, the columns 14 hold the frame 18 to be raised and lowered in the vertical direction. In addition, the frame 18 can be rotated around a body axis of the subject S, using an axis passing through the center C in the vertical direction as a rotation axis RTA (see FIG. 3). That is, the columns 14A to 14C hold the frame 18 to be rotatable around the body axis of the subject S. Hereinafter, the center C may be referred to as a rotation center C. An arrow represented by letters RAD indicates a rotation axis direction of the frame 18. The rotation axis direction RAD is parallel to the vertical direction. Here, the body axis is an axis extending from the top of the head to the caudal portion (anus) of the subject S. In a case in which the subject S is in the standing posture or a sitting posture (see FIG. 4), the body axis is parallel to the vertical direction and the rotation axis direction RAD. The term "parallel" indicates parallel including an error which is generally allowed in the technical field to which the technology of the present disclosure belongs and is not contrary to the gist of the technology of the present disclosure, in addition to perfectly parallel. Further, the columns 14 may be expanded and contracted to change a height position of the frame 18.

Figure 3:
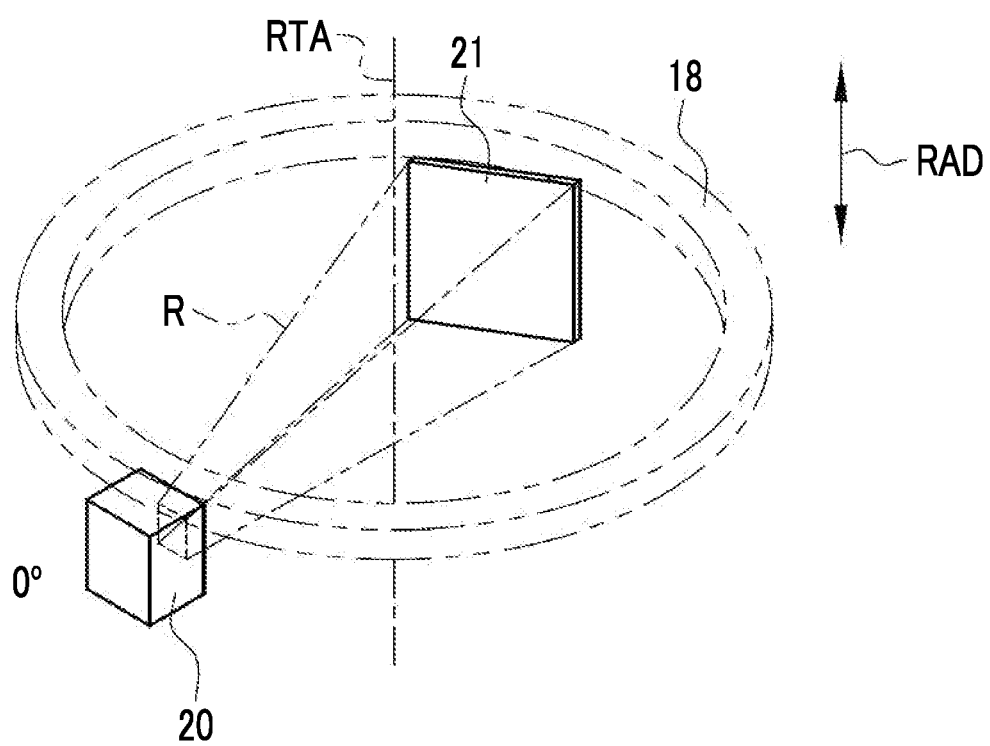
FIG. 3 is a diagram illustrating positions where a radiation source and a radiation detector are disposed.

As illustrated in FIG. 3, a radiation source 20 that irradiates the subject S with radiation R (see FIG. 7), such as X-rays or γ-rays, and a radiation detector 21 that detects the radiation R transmitted through the subject S are attached to the frame 18. The radiation source 20 has a box shape, and the radiation detector 21 has a rectangular plate shape.

The column 14A is provided with a screw shaft 22A, the column 14B is provided with a screw shaft 22B, and the column 14C is provided with a screw shaft 22C. The screw shafts 22A to 22C have a height from the stage 13 to the top plate 15. The screw shafts 22A to 22C are rotated to raise and lower the connection members 17A to 17C and thus the frame 18 in the rotation axis direction RAD. In addition, in the following description, the screw shafts 22A to 22C are collectively referred to as screw shafts 22 in a case in which they do not need to be distinguished from each other.

A touch panel display 25 is attached to the column 14A through a movable arm 24. The touch panel display 25 is operated by an operator. In addition, the touch panel display 25 displays various types of information to the operator.

A camera 26 is provided in the radiation source 20. The camera 26 images the subject S positioned in the apparatus main body 11 and transmits a camera image 121 (see FIG. 11) obtained by the imaging to the control device 12. The camera 26 is provided separately from the radiation source 20 and is attached to a lower portion of the radiation source 20 which does not interfere with the radiation R. In addition, the camera 26 may be integrated with the radiation source 20 or may be provided in the radiation source 20.

Figure 4:
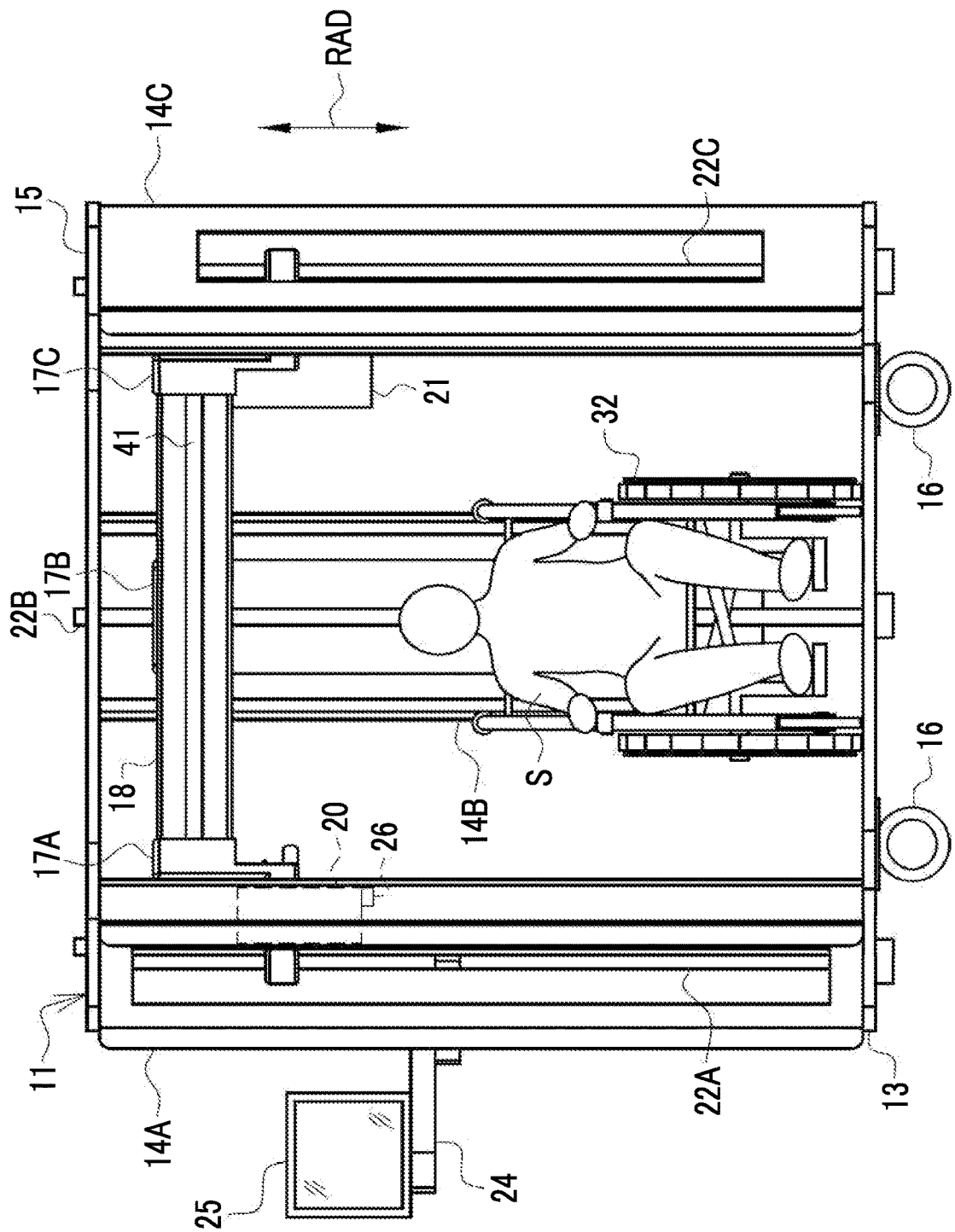
FIG. 4 is a front view of the CT apparatus illustrating a state in which a subject is positioned in a sitting posture on a wheelchair.

FIGS. 1 and 2 illustrate an example in which the subject S is positioned in the frame 18 in the standing posture with both hands raised above the head. However, the present disclosure is not limited thereto. For example, as illustrated in FIG. 4, the CT apparatus 10 can image the subject S who is positioned in the frame 18 in the sitting posture on a wheelchair 32. In addition, either the subject S in the standing posture or the subject S in the sitting posture on the wheelchair 32 is positioned such that the front side faces the columns 14A and 14C and the back side faces the support column 14B.

Figure 5:
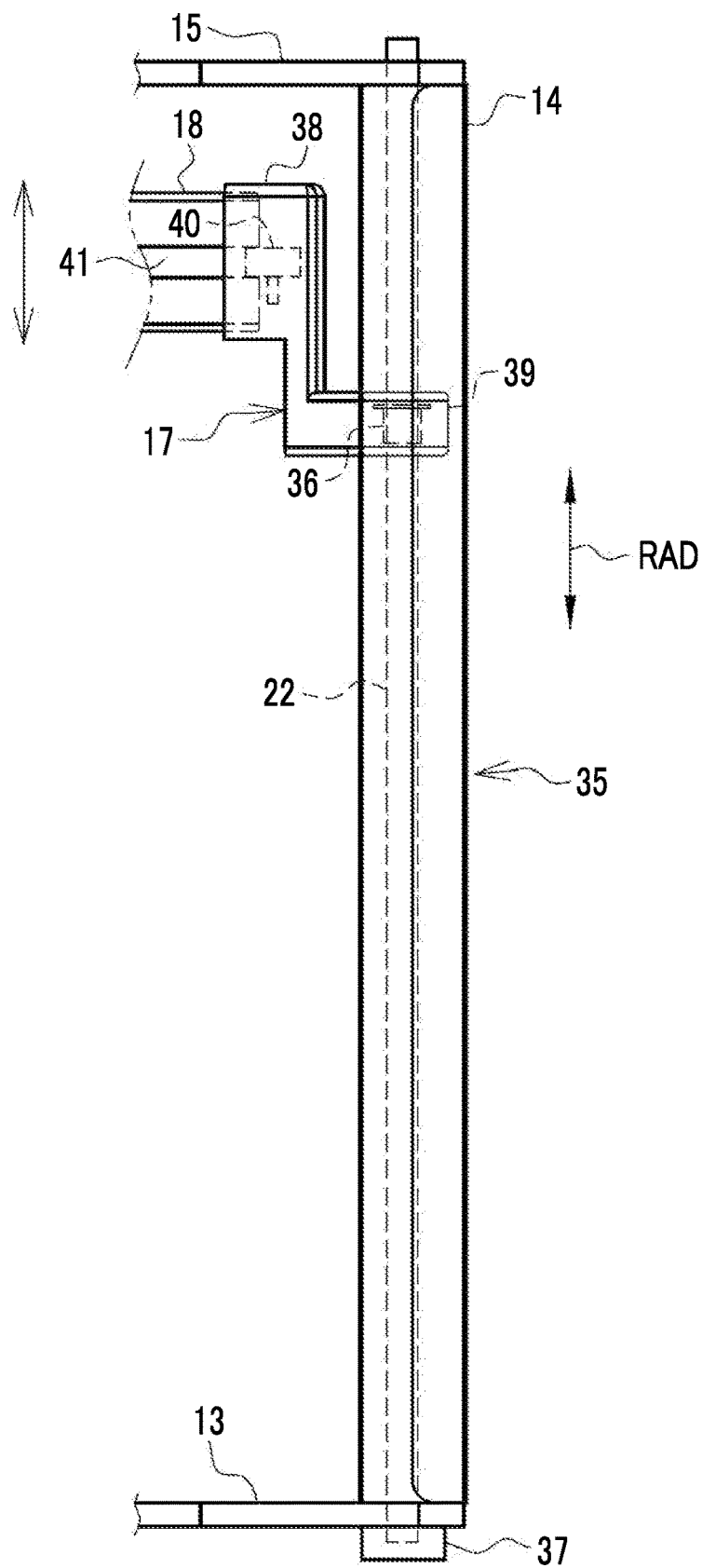
FIG. 5 is a diagram illustrating a frame elevating mechanism.

For example, as illustrated in FIG. 5, a frame elevating mechanism 35 that raises and lowers the connection member 17 and thus the frame 18 in the rotation axis direction RAD is a ball screw mechanism which is composed of the screw shaft 22, a nut 36 that has a ball provided therein and is engaged with the screw shaft 22, a frame elevating motor 37 that rotates the screw shaft 22, and the like. The frame elevating motor 37 is attached to the rear surface of the stage 13. The height position of the frame 18 is determined from the rotation direction and rotation speed of the frame elevating motor 37. The frame elevating mechanism 35 is an example of an "elevating mechanism" according to the technology of the present disclosure.

The connection member 17 has a first connection portion 38 that is connected to the frame 18 and a second connection portion 39 that is connected to the column 14. The first connection portion 38 protrudes toward the frame 18, and the second connection portion 39 protrudes toward the column 14. The connection member 17 has a Z-shape as a whole. A bearing 40 is provided in the first connection portion 38. The bearing 40 is fitted to a guide groove 41 (see also FIG. 1 and the like) that is formed over the entire circumference of the frame 18. The bearing 40 rolls as the frame 18 is rotated. The nut 36 is provided in the second connection portion 39.

Figure 6:
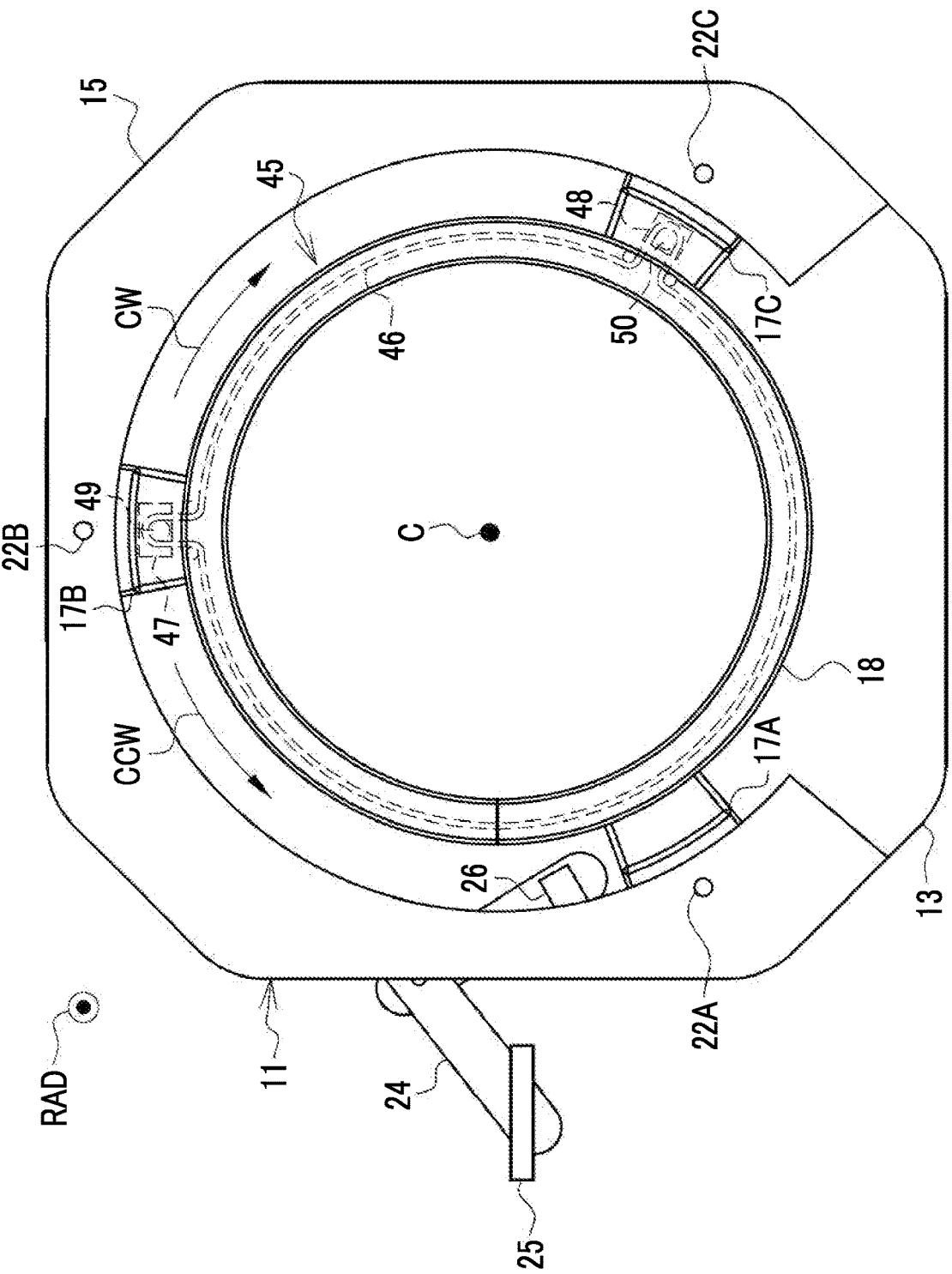
FIG. 6 is a diagram illustrating a rotation mechanism.

For example, as illustrated in FIG. 6, a rotation mechanism 45 that rotates the frame 18 and thus the radiation source 20 and the radiation detector 21 around the body axis of the subject S is composed of a rotation belt 46 that is wound around the entire circumference of the frame 18, a rotary motor 47, a potentiometer 48, and the like. The rotary motor 47 is provided in the connection member 17B and is connected to a portion of the rotation belt 46 drawn out from the frame 18 through a pulley 49. The rotary motor 47 is driven to rotate the frame 18 and thus the radiation source 20 and the radiation detector 21 in a clockwise (right-hand rotation) direction CW and a counterclockwise (left-hand rotation) direction CCW. The rotation speeds of the radiation source 20 and the radiation detector 21 are, for example, 36°/second (sec). In this case, the time required for one rotation (360° rotation) of the radiation source 20 and the radiation detector 21 is 10 sec. The clockwise direction CW and the counterclockwise direction CCW are examples of a "rotation direction" according to the technology of the present disclosure.

The potentiometer 48 is provided in the connection member 17C and is connected to a portion of the rotation belt 46 drawn out from the frame 18 through the pulley 50. The potentiometer 48 has a variable resistor whose resistance value is changed depending on the rotation position of the frame 18 and outputs a voltage signal corresponding to the rotation position of the frame 18. The rotation position of the frame 18 is determined by the voltage signal from the potentiometer 48. In addition, in FIG. 6, the radiation source 20 and the radiation detector 21 are not illustrated in order to avoid complication.

Figure 7:
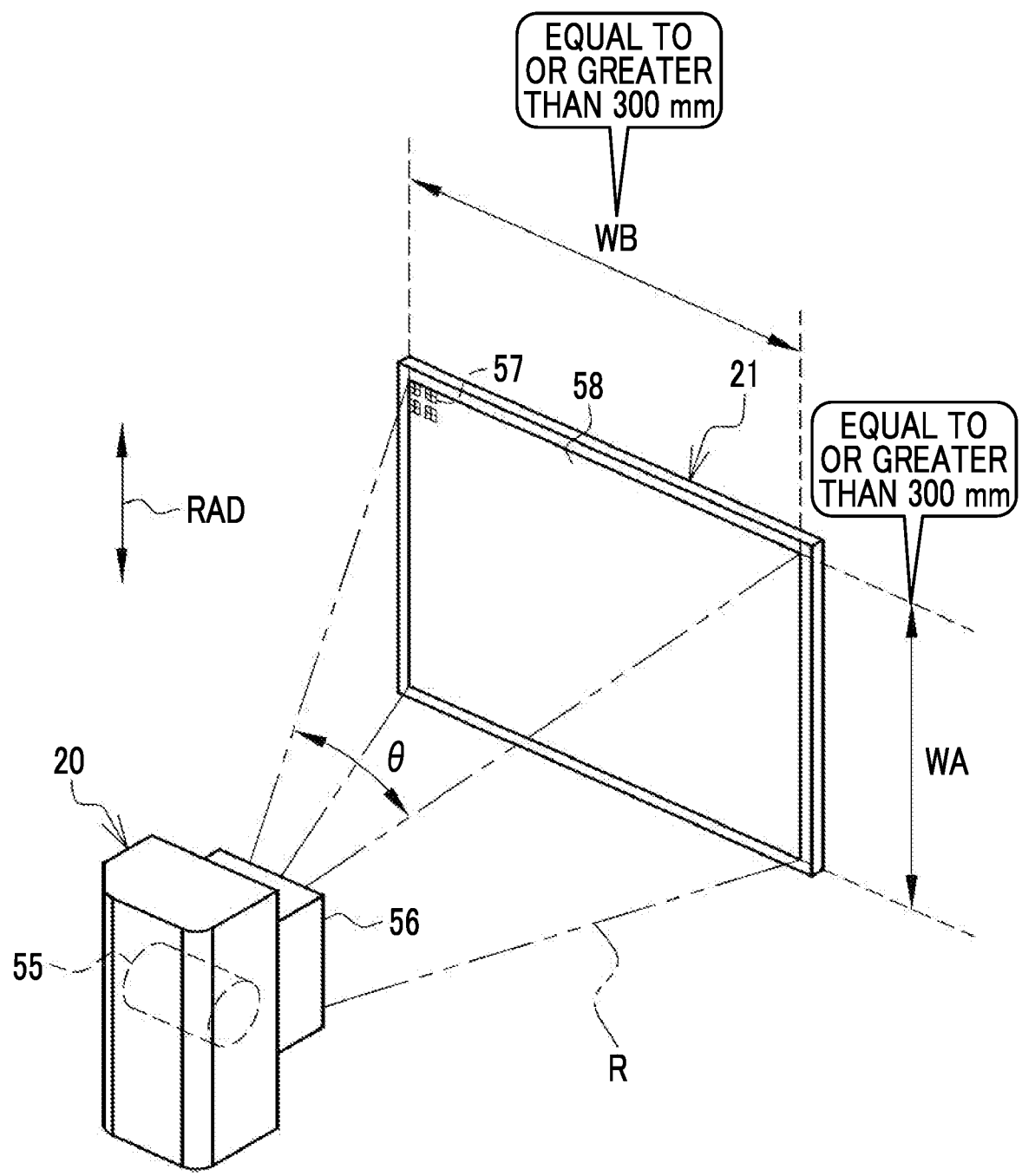
FIG. 7 is a perspective view illustrating a radiation source, a radiation detector, and radiation.

For example, as illustrated in FIG. 7, the radiation source 20 includes a radiation tube 55. The radiation tube 55 emits the radiation R. In addition, the radiation source 20 is also provided with an irradiation field lamp that emits, for example, orange visible light indicating an irradiation field of the radiation R, which is not illustrated.

The radiation source 20 has an irradiation field limiter 56. The irradiation field limiter 56 is also called a collimator and defines the irradiation field of the radiation R to the radiation detector 21. An incident opening through which the radiation R from the radiation tube 55 is incident and an exit opening through which the radiation R exits are formed in the irradiation field limiter 56. For example, four shielding plates are provided in the vicinity of the exit opening. The shielding plate is made of a material that shields the radiation R, for example, lead. The shielding plates are disposed on each side of a quadrangle, in other words, are assembled in a checkered pattern and form a quadrangular irradiation opening through which the radiation R is transmitted. The irradiation field limiter 56 changes the position of each shielding plate to change the size of the irradiation opening, thereby changing the irradiation field of the radiation R to the radiation detector 21. The radiation R having a quadrangular pyramid shape is emitted from the radiation source 20 by the operation of the irradiation field limiter 56. An emission angle $\theta$ of the radiation R as viewed from the rotation axis direction RAD is, for example, 10° to 30°. The emission angle $\theta$ is also called a cone angle.

The radiation detector 21 is composed of, for example, a scintillator that converts the radiation R into visible light, a thin film transistor (TFT) substrate having a detection surface 58 in which a plurality of pixels 57 that accumulate charge corresponding to the visible light to detect the radiation R are arranged in a two-dimensional matrix, a signal processing circuit that outputs a voltage signal corresponding to the charge as a projection image, and a housing that accommodates these components. Letters WA indicate the width of the detection surface 58 in the rotation axis direction RAD. In addition, letters WB indicate the width of the detection surface 58 in a direction orthogonal to the rotation axis direction RAD. Both the widths WA and WB are equal to or greater than 300 mm. For example, the widths WA and WB are 430 mm (17 inches). A source-to-image distance (SID) which is a distance from the focus of the radiation R (a point at which the radiation R is emitted in the radiation tube 55) to the detection surface 58 is, for example, 1200 mm. The width WA is an example of a "width of a detection surface" according to the technology of the present disclosure. In addition, the radiation detector 21 may be a type that directly detects the radiation R instead of the visible light converted from the radiation R.

Figure 8:
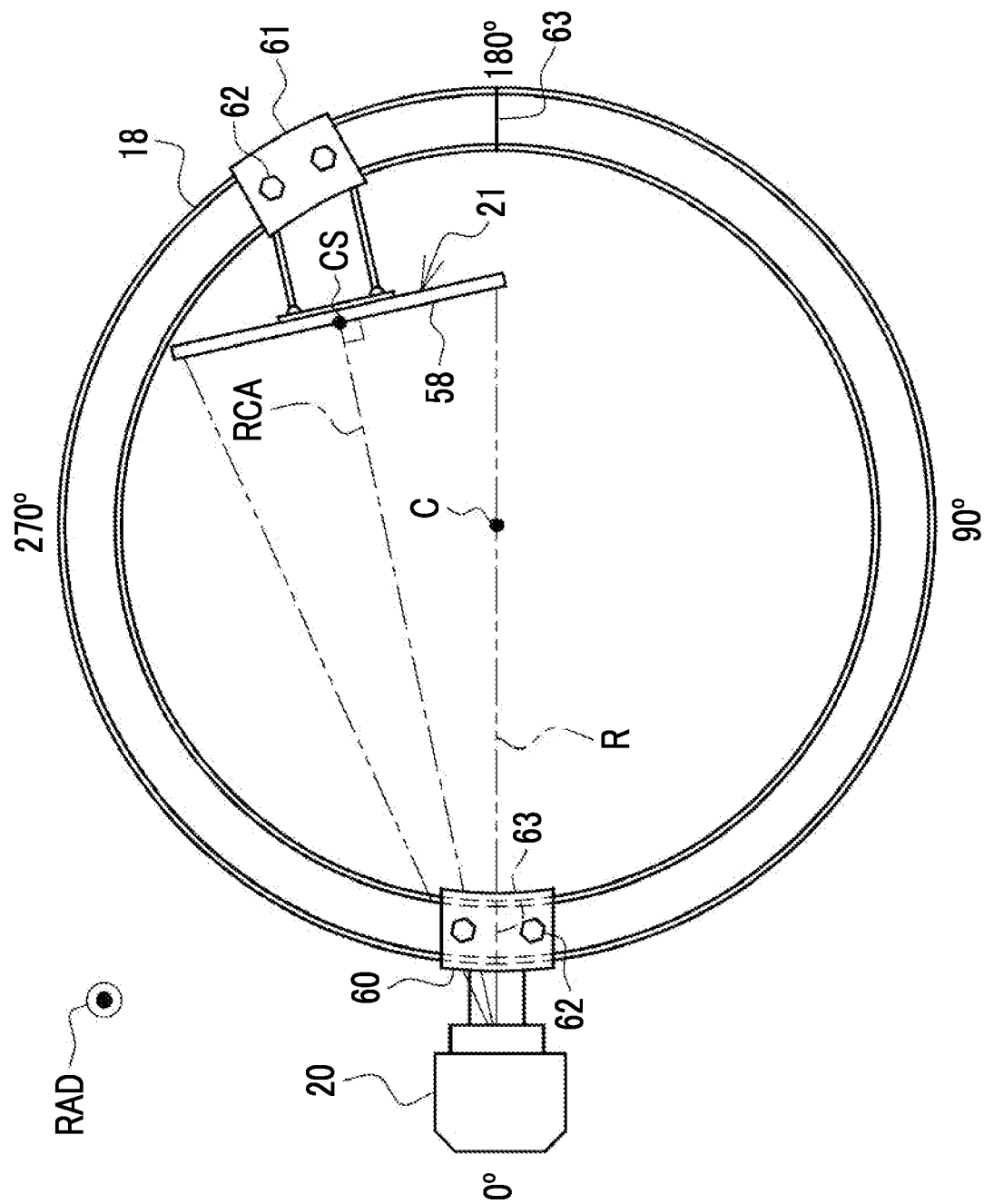
FIG. 8 is a diagram illustrating the positions where the radiation source and the radiation detector are disposed.

For example, as illustrated in FIG. 8, a central axis RCA of a flux of the radiation R perpendicularly intersects a center point CS of the detection surface 58 of the radiation detector 21. In the following description, it is assumed that the position where the radiation source 20 is disposed 0° and the positions of every 90° in the counterclockwise direction CCW are 90°, 180°, and 270°.

The radiation source 20 is attached to the frame 18 by an attachment 60. Similarly, the radiation detector 21 is attached to the frame 18 by an attachment 61. The attachments 60 and 61 are fixed to the frame 18 by bolts 62. The radiation source 20 is disposed outside the frame 18, and the radiation detector 21 is disposed inside the frame 18 as viewed from the rotation axis direction RAD.

The frame 18 is formed by joining two semi-annular members by, for example, welding. The attachment 60 is attached to cover one of two opposing joint portions 63 of the frame 18. This attachment of the attachment 60 to the joint portion 63 makes it possible to reinforce the joint portion 63, which is a mechanically weak portion, with the attachment 60.

Figure 9:
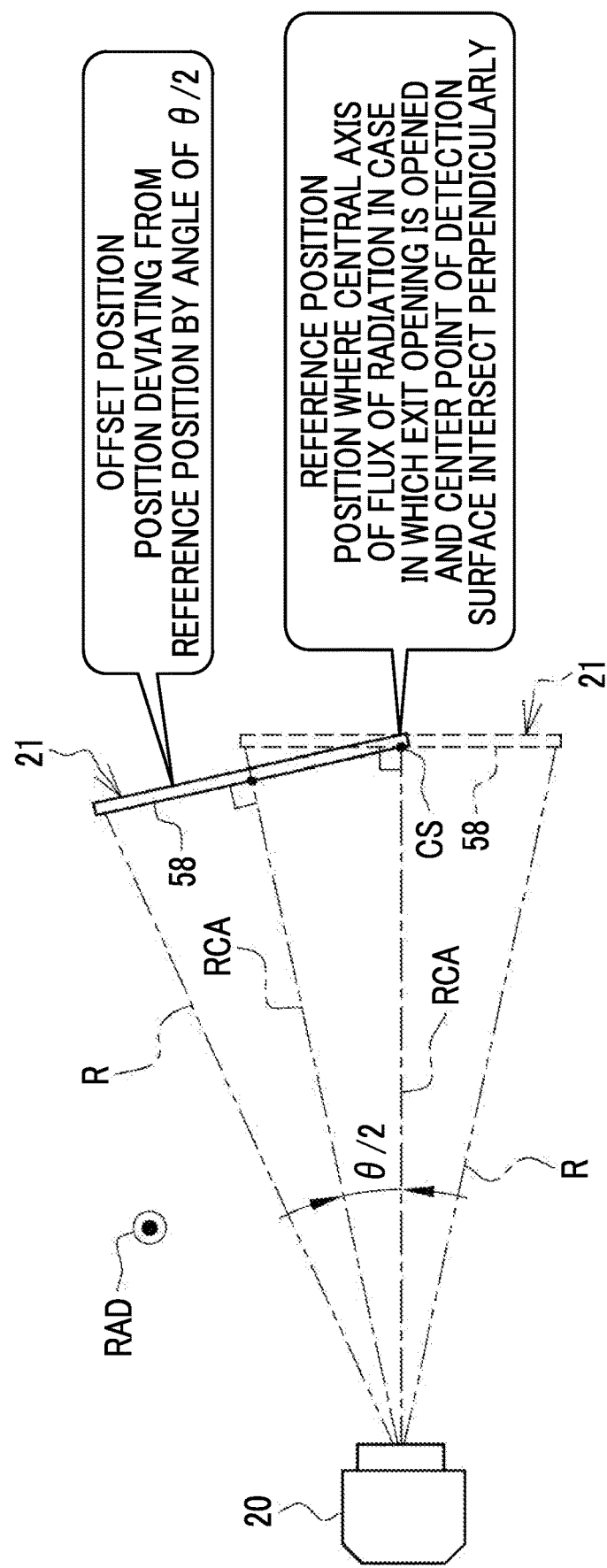
FIG. 9 is a diagram illustrating a reference position and an offset position of the radiation detector.

For example, as illustrated in FIG. 9, the radiation detector 21 is disposed at an offset position that deviates from a reference position facing the radiation source 20 by a preset angle as viewed from the rotation axis direction RAD. Here, the reference position is a position where the central axis RCA of a flux of the radiation R in a case in which the exit opening of the irradiation field limiter 56 is opened to the maximum and the center point CS of the detection surface 58 of the radiation detector 21 intersect perpendicularly. The preset angle at the offset position is half (θ/2) of the emission angle θ in this example.

Figure 10:
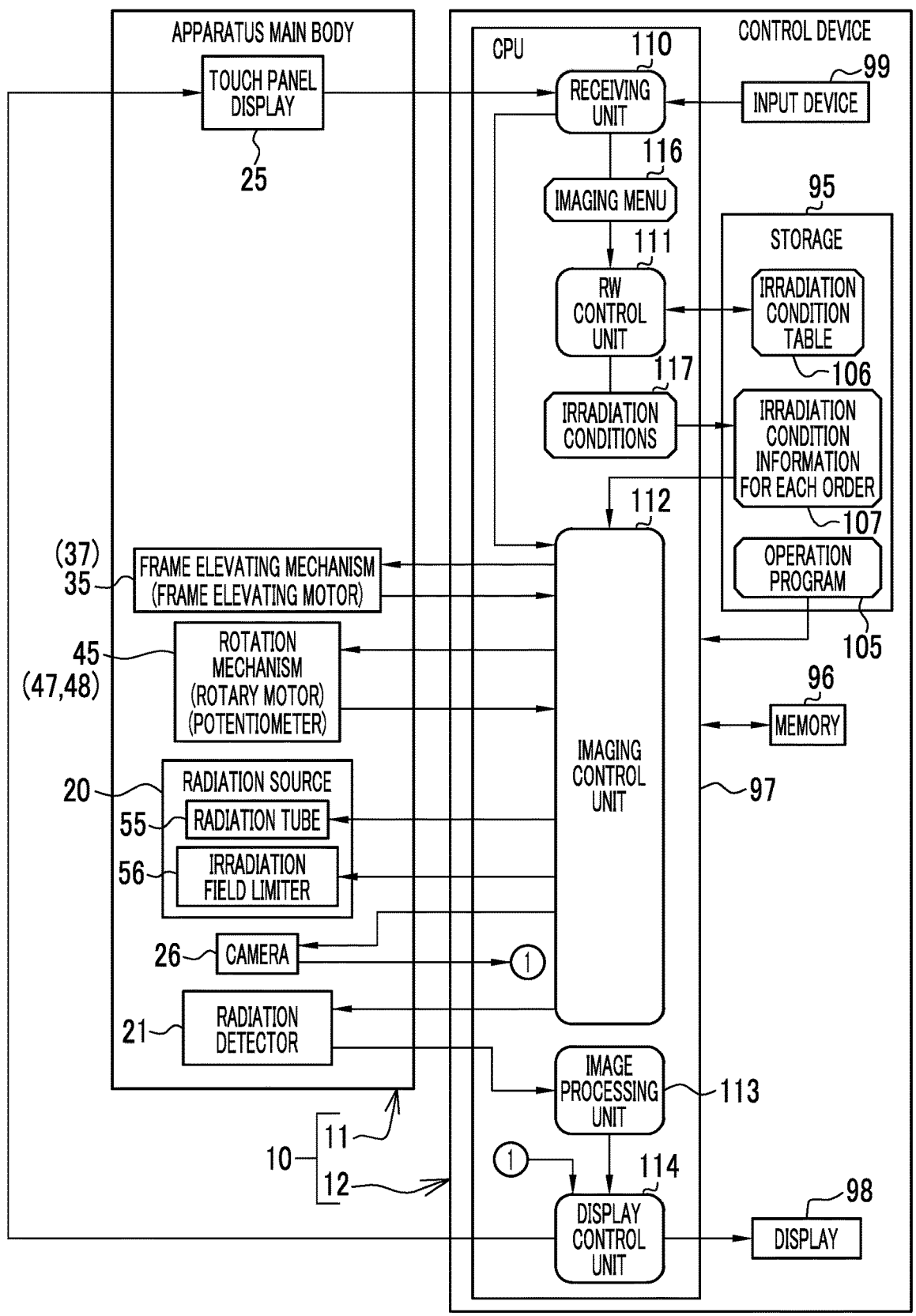
FIG. 10 is a block diagram illustrating processing units of a CPU of a control device.

For example, as illustrated in FIG. 10, a computer constituting the control device 12 comprises a storage 95, a memory 96, a central processing unit (CPU) 97, a display 98, an input device 99, and the like.

The storage 95 is a hard disk drive that is provided in the computer constituting the control device 12 or is connected to the computer through a cable or a network. Alternatively, the storage 95 is a disk array in which a plurality of hard disk drives are connected. The storage 95 stores, for example, a control program, such as an operating system, various application programs, and various types of data associated with these programs. In addition, a solid state drive may be used instead of the hard disk drive.

The memory 96 is a work memory for the CPU 97 to perform processes. The CPU 97 loads the program stored in the storage 95 to the memory 96 and performs a process corresponding to the program. Therefore, the CPU 97 controls the overall operation of each unit of the computer. The CPU 97 is an example of a "processor" according to the technology of the present disclosure. In addition, the memory 96 may be provided in the CPU 97.

The display 98 displays various screens. The various screens have operation functions by a graphical user interface (GUI). The computer constituting the control device 12 receives operation instructions input from the input device 99 through various screens. The input device 99 is, for example, a keyboard, a mouse, a touch panel, and a microphone for voice input.

An operation program 105 is stored in the storage 95. The operation program 105 is an application program for causing the computer to function as the control device 12. The storage 95 stores, for example, an irradiation condition table 106 and irradiation condition information 107 for each order, in addition to the operation program 105.

In a case in which the operation program 105 is started, the CPU 97 of the control device 12 functions as a receiving unit 110, a read and write (hereinafter, abbreviated to RW) control unit 111, an imaging control unit 112, an image processing unit 113, and a display control unit 114 in cooperation with, for example, the memory 96.

The receiving unit 110 receives various operation instructions input by the operator through the touch panel display 25 of the apparatus main body 11 and the input device 99. For example, the receiving unit 110 receives an imaging menu 116. The receiving unit 110 outputs the imaging menu 116 to the RW control unit 111.

The RW control unit 111 receives the imaging menu 116 from the receiving unit 110. The RW control unit 111 reads irradiation conditions 117 of the radiation R which correspond to the received imaging menu 116 from the irradiation condition table 106. The RW control unit 111 writes the irradiation conditions 117 read from the irradiation condition table 106 to the irradiation condition information 107 for each order.

The imaging control unit 112 controls the operations of the radiation source 20 (the radiation tube 55 and the irradiation field limiter 56), the camera 26, the frame elevating mechanism 35 (frame elevating motor 37), the rotation mechanism 45 (the rotary motor 47 and the potentiometer 48), and the radiation detector 21. The imaging control unit 112 reads the irradiation conditions 117 from the irradiation condition information 107 for each order. The imaging control unit 112 drives the irradiation field limiter 56 according to the irradiation conditions 117 to adjust the irradiation field. The operator inputs an imaging instruction to the control device 12 through an irradiation switch (not illustrated). In a case in which the imaging instruction is input, the imaging control unit 112 drives the radiation tube 55 according to the irradiation conditions 117 such that the radiation tube 55 generates the radiation R. The imaging control unit 112 directs the radiation detector 21 to output a projection image 135 (see FIG. 21) obtained by the detection of the emitted radiation R by the radiation detector 21 to the image processing unit 113.

The image processing unit 113 receives the projection image 135 from the radiation detector 21. The image processing unit 113 performs various types of image processing on the projection image 135 to generate a tomographic image 138 (see FIG. 22). The image processing unit 113 outputs the tomographic image 138 to the display control unit 114.

The display control unit 114 controls the display of various types of information on the touch panel display 25 and the display 98. The display control unit 114 receives the camera image 121 from the camera 26. The display control unit 114 displays the camera image 121 on the touch panel display 25 and the display 98. In addition, the display control unit 114 receives the tomographic image 138 from the image processing unit 113. The display control unit 114 displays the tomographic image 138 on the touch panel display 25 and the display 98.

The imaging menu 116 includes, for example, imaging order identification data (ID) and an imaging technique. The imaging order ID is identification information of an imaging order issued by a doctor who makes a diagnosis using the tomographic image 138. The imaging technique is composed of a posture of the subject S, such as a standing posture or a sitting posture, an imaging part, such as the head, the neck, or the entire spine, and attributes of the subject S such as an adult male, an adult female, and a child.

The imaging order is transmitted from a radiology information system (RIS) (not illustrated) to the control device 12. The control device 12 displays a list of imaging orders on the display 98 under the control of the display control unit 114. The operator browses the list of the imaging orders and checks the content of the list. Then, the control device 12 displays the imaging menu corresponding to the imaging order on the display 98 such that it can be set. The operator operates the input device 99 to select the imaging menu corresponding to the imaging order and to input the imaging menu.

The irradiation conditions 117 are registered in the irradiation condition table 106 for each imaging technique. The irradiation conditions 117 include a tube voltage and a tube current applied to the radiation tube 55 and the irradiation time of the radiation R. In addition, the irradiation conditions 117 also include the size of the irradiation field. The operator can finely adjust the irradiation conditions 117 by hand. Further, instead of the tube current and the irradiation time, a tube current-irradiation time product, that is, a so-called mAs value may be set as the irradiation condition 117.

The irradiation conditions 117 for each imaging order ID is registered in the irradiation condition information 107 for each order. The imaging control unit 112 reads the irradiation condition 117 corresponding to an imaging order ID of the next imaging from the irradiation condition information 107 for each order and controls the operation of each unit according to the read irradiation conditions 117.

Figure 11:
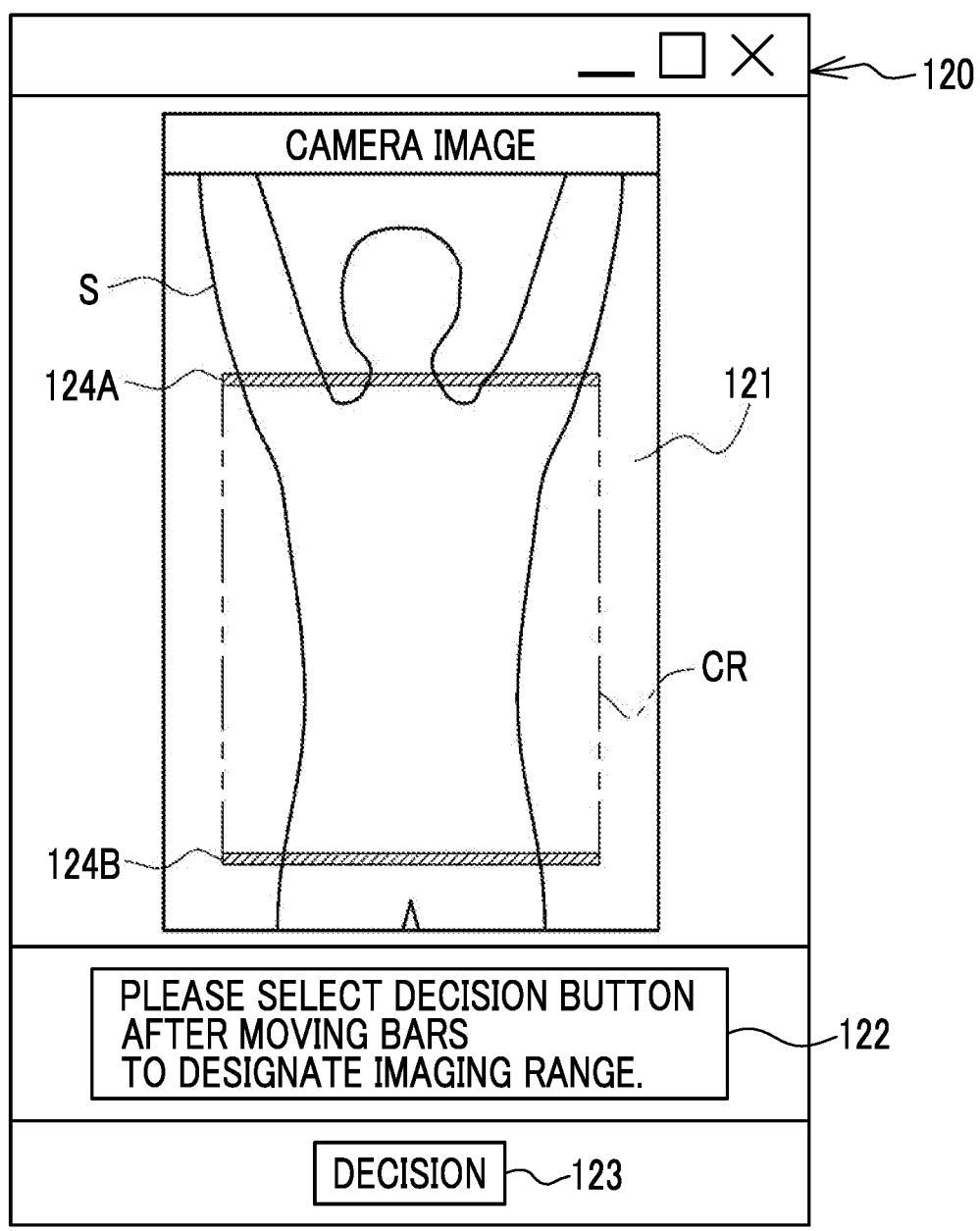
FIG. 11 is a diagram illustrating a camera image display screen.

For example, as illustrated in FIG. 11, the display control unit 114 performs control to display a camera image display screen 120 on the display 98 or the like in a stage before imaging. The camera image 121 obtained from the camera 26, a message 122, and a decision button 123 are displayed on the camera image display screen 120. The subject S is included in the camera image 121. The display control unit 114 displays an imaging range CR that can be reconstructed as the tomographic image 138 to be superimposed on the camera image 121. In addition, the display control unit 114 displays a bar 124A indicating an upper end of the imaging range CR and a bar 124B indicating a lower end of the imaging range CR to be superimposed on the camera image 121.

In an initial display state of the camera image display screen 120 illustrated in FIG. 11, for example, the bars 124A and 124B are displayed at positions corresponding to the imaging range CR that can cover the half body of a general adult male (the upper half of the body above the waist and the lower half of the body below the waist (the upper half of the body is illustrated in FIG. 11)). The bars 124A and 124B can be operated by the operator to be moved up and down. The imaging range CR is changed by the operation of moving the bars 124A and 124B. The content of the message 122 is to prompt the operation of moving the bars 124A and 124B and the selection of the decision button 123.

Figure 12:
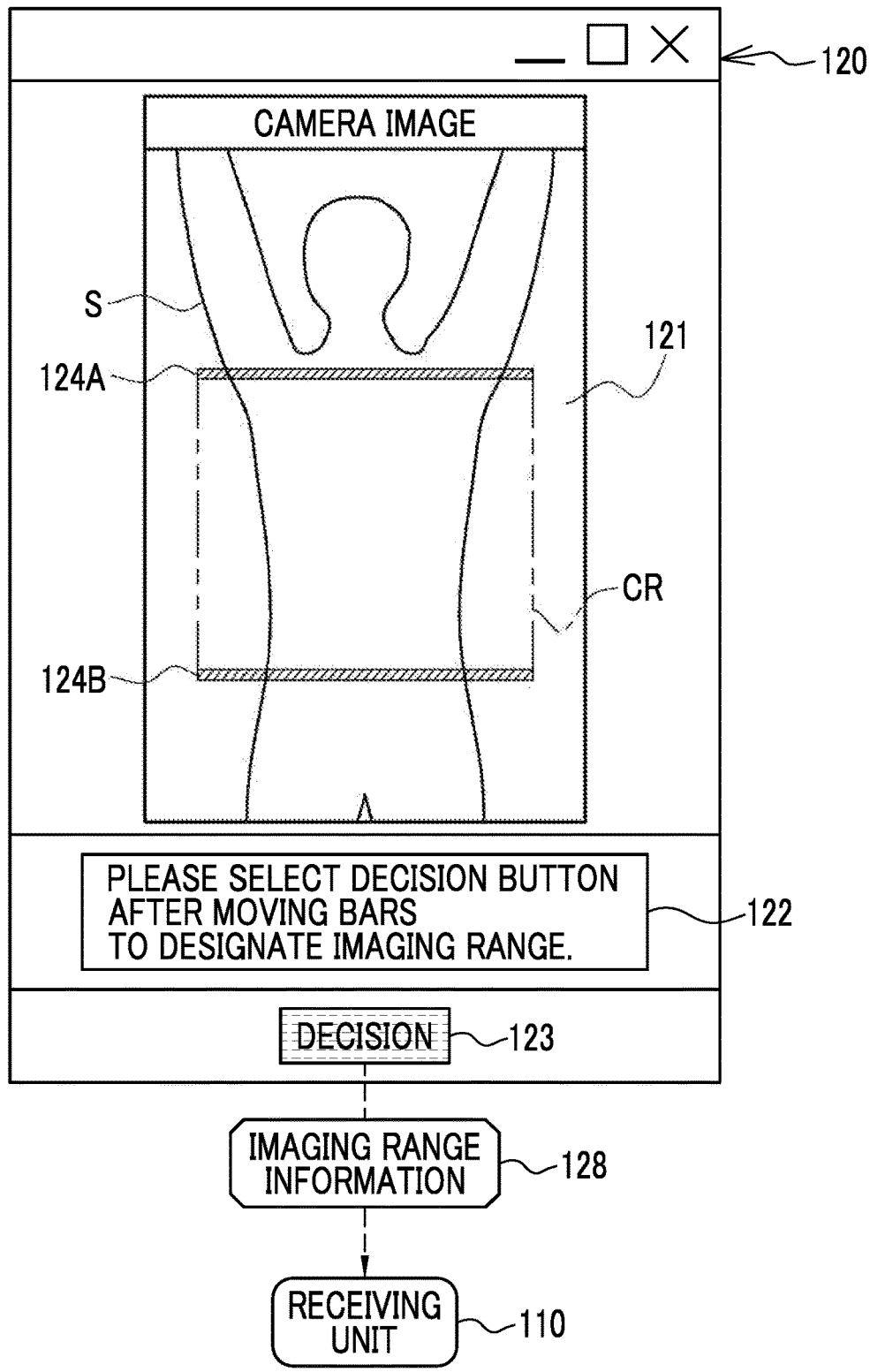
FIG. 12 is a diagram illustrating an aspect in which an imaging range is designated on the camera image display screen.

The operator moves the bars 124A and 124B in consideration of, for example, the content of the imaging menu 116 and the physique of the subject S to set a desired imaging range CR. Then, the operator selects the decision button 123. In a case in which the decision button 123 is selected, for example, as illustrated in FIG. 12, the receiving unit 110 receives imaging range information 128 which is information of the imaging range CR designated by the bars 124A and 124B at that time. Specifically, the imaging range information 128 is information indicating the height positions of the bars 124A and 124B. The receiving unit 110 outputs the imaging range information 128 to the imaging control unit 112.

Figure 13:
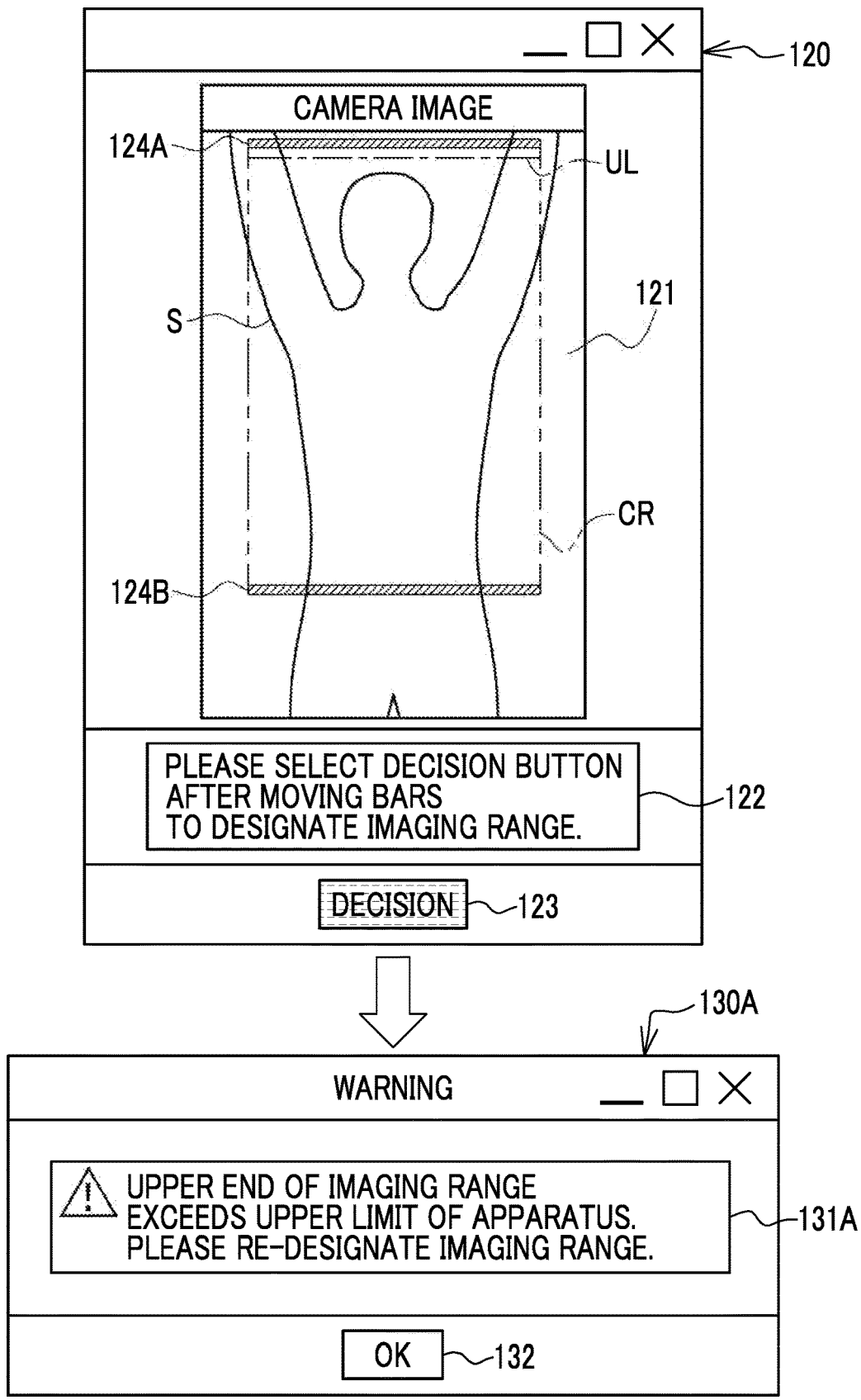
FIG. 13 is a diagram illustrating an aspect in which a warning screen is displayed in a case in which an upper end of a designated imaging range exceeds an upper limit.

For example, as illustrated in FIG. 13, in a case in which the bar 124A in case of selecting the decision button 123, that is, the upper end of the designated imaging range CR exceeds an upper limit UL, the display control unit 114 performs control to display a warning screen 130A on the display 98 or the like. A message 131A indicating that the upper end of the imaging range CR exceeds the upper limit UL and prompting the operator to re-designate the imaging range is displayed on the warning screen 130A. The upper limit UL is the upper end of the imaging range CR in a case in which the radiation source 20 and the radiation detector 21 are raised to an upper limit height position by the frame elevating mechanism 35.

Figure 14:
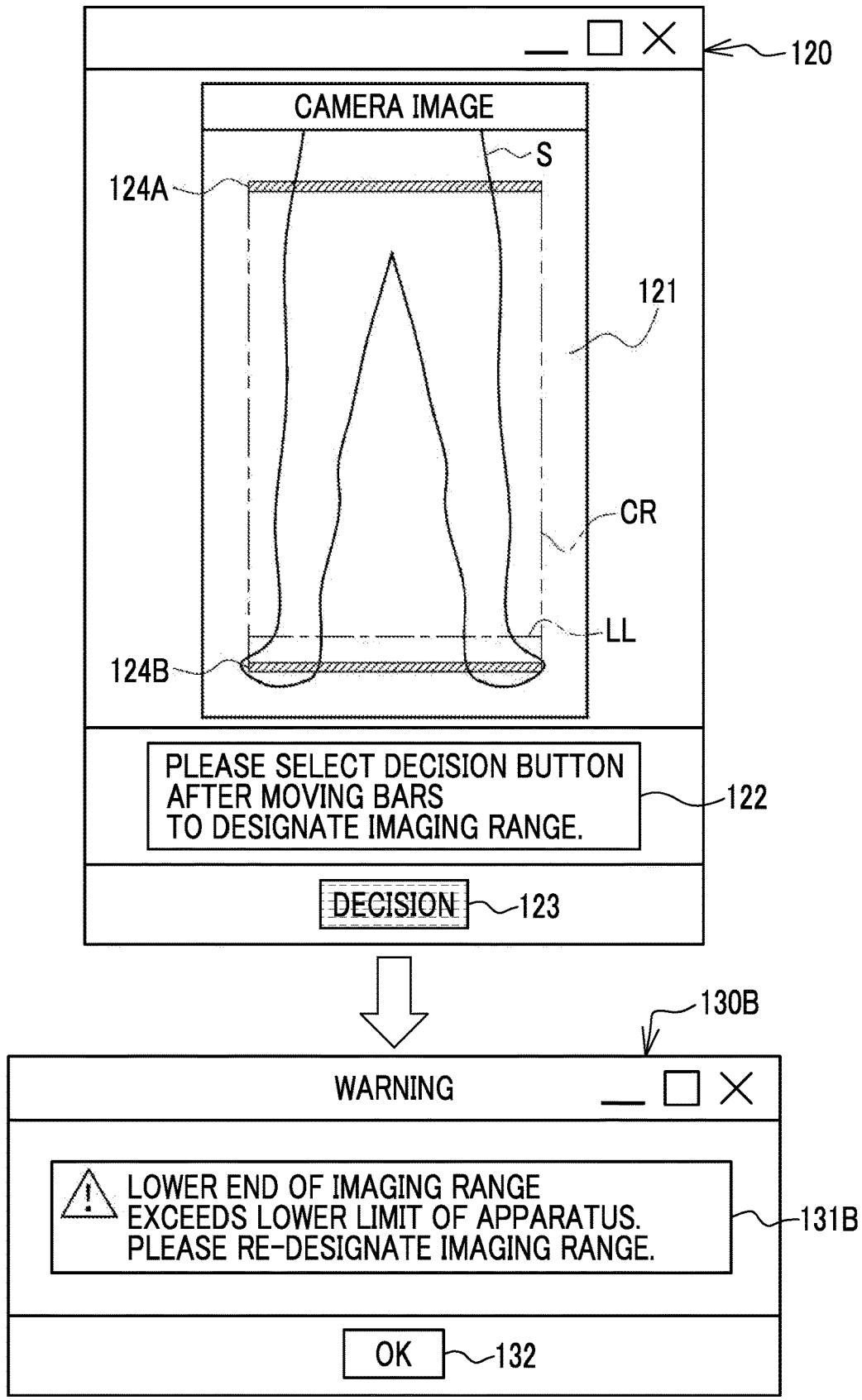
FIG. 14 is a diagram illustrating an aspect in which a warning screen is displayed in a case in which a lower end of the designated imaging range exceeds a lower limit.

Further, for example, as illustrated in FIG. 14, in a case in which the bar 124B in case of selecting the decision button 123, that is, the lower end of the designated imaging range CR exceeds a lower limit LL, the display control unit 114 performs control to display a warning screen 130B on the display 98 or the like. A message 131B indicating that the lower end of the imaging range CR exceeds the lower limit LL and prompting the operator to re-designate the imaging range is displayed on the warning screen 130B. The lower limit LL is the lower end of the imaging range CR in a case in which the radiation source 20 and the radiation detector 21 are lowered to a lower limit height position by the frame elevating mechanism 35.

For example, the warning screens 130A and 130B are displayed on the camera image display screen 120 in a pop-up manner. In addition, the warning screens 130A and 130B disappear by selecting an OK button 132. The control to display the warning screens 130A and 130B is an example of "control to output a warning" according to the technology of the present disclosure. In addition, instead of or in addition to the display of the warning screens 130A and 130B, for example, a voice reading the messages 131A and 131B may be output as the warning.

Figure 15:
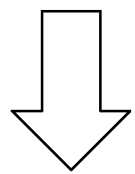
FIG. 15 is a diagram illustrating a method for setting a height position in a case in which the designated imaging range exceeds a width of a detection surface for the radiation in the radiation detector.
Figure 16:
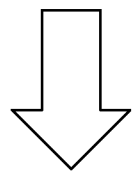
FIG. 16 is a diagram illustrating a method for setting the height position in a case in which the designated imaging range is within the width of the detection surface for the radiation in the radiation detector.

The imaging control unit 112 sets the height positions of the radiation source 20 and the radiation detector 21 during imaging on the basis of the imaging range information 128 from the receiving unit 110. Specifically, for example, as illustrated in FIG. 15, in a case in which the designated imaging range CR exceeds the width WA of the detection surface 58 of the radiation detector 21 in the rotation axis direction RAD, the imaging control unit 112 sets two or more height positions as the height positions of the radiation source 20 and the radiation detector 21 during imaging. On the other hand, for example, as illustrated in FIG. 16, in a case in which the designated imaging range CR is within the width WA of the detection surface 58 of the radiation detector 21 in the rotation axis direction RAD, the imaging control unit 112 sets one height position as the height positions of the radiation source 20 and the radiation detector 21 during imaging. The imaging control unit 112 operates the frame elevating mechanism 35 to move the radiation source 20 and the radiation detector 21 to the set height positions.

Figure 17:
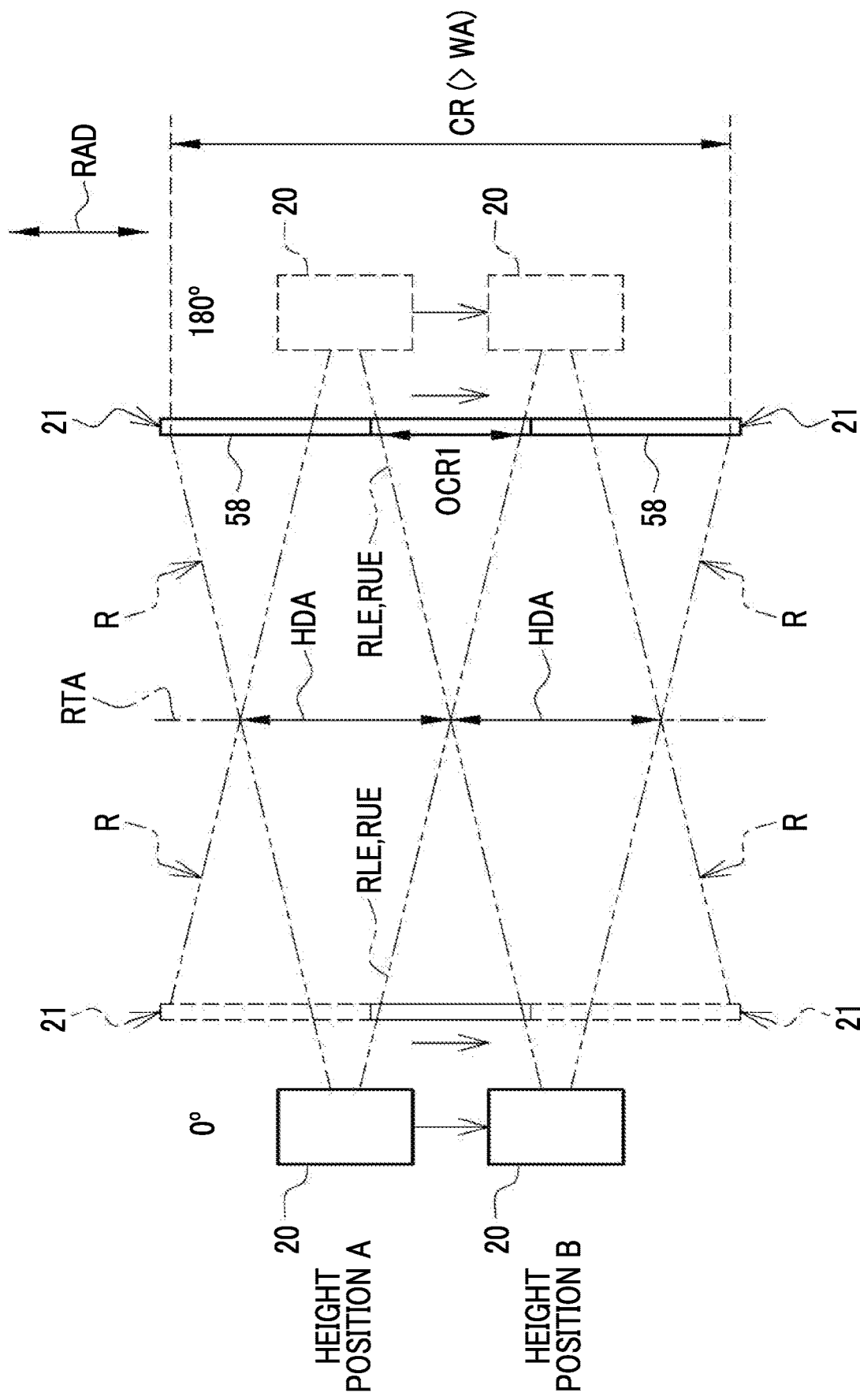
FIG. 17 is a diagram illustrating a case in which two height positions are set.
Figure 18:
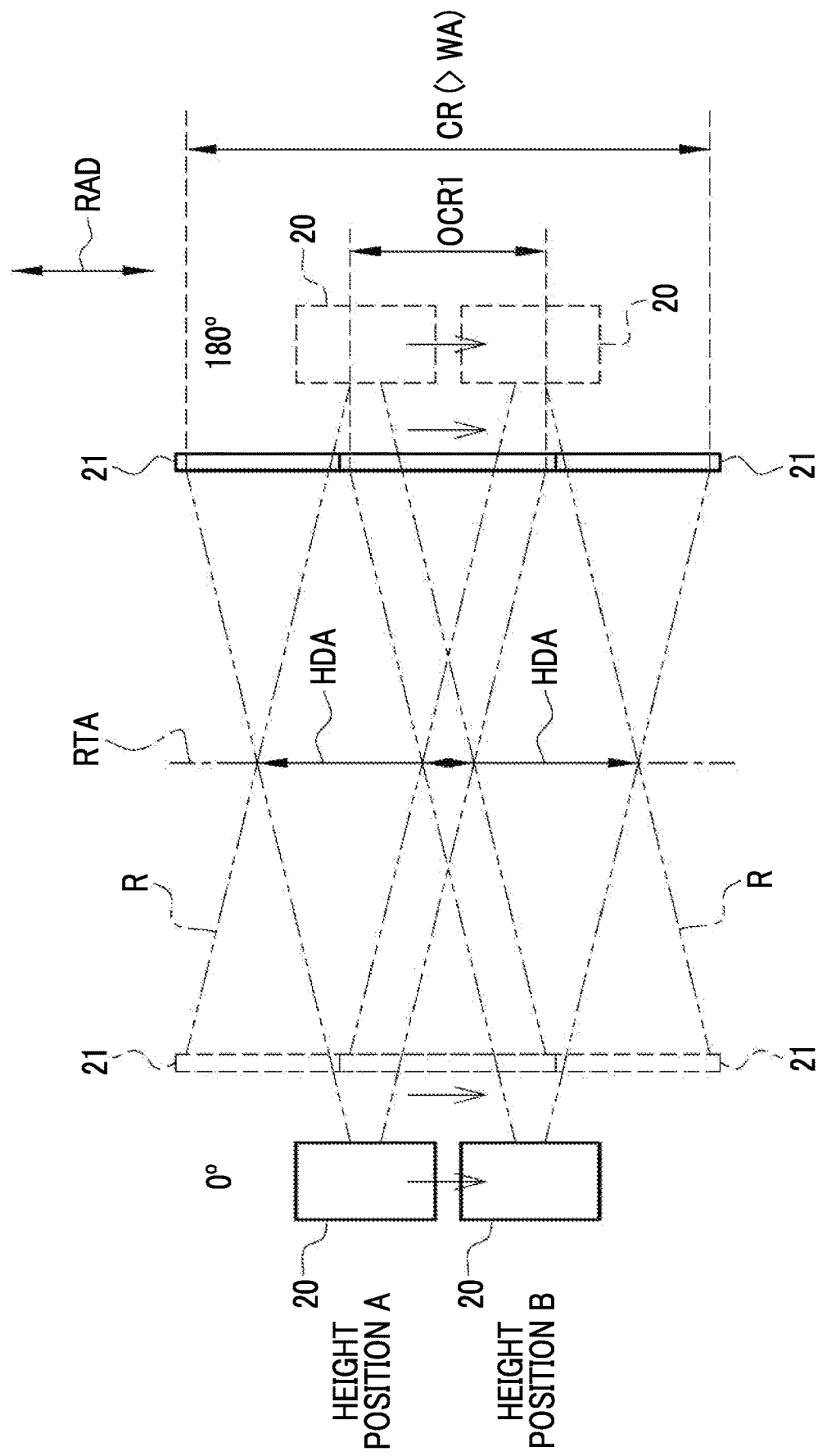
FIG. 18 is a diagram illustrating another example of the case in which two height positions are set.
Figure 19:
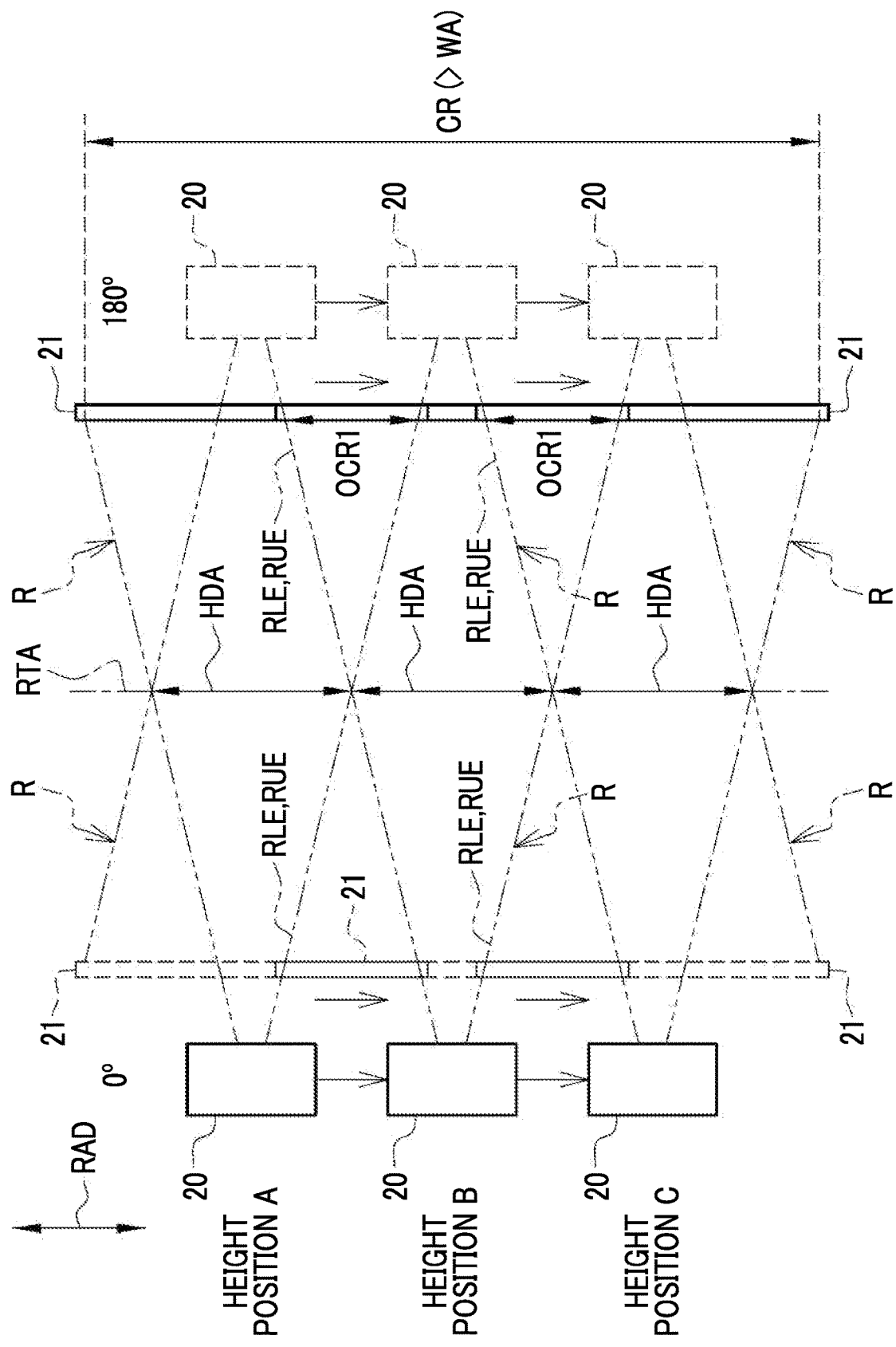
FIG. 19 is a diagram illustrating a case in which three height positions are set.

FIGS. 17 to 19 illustrate a case in which the designated imaging range CR exceeds the width WA of the detection surface 58 of the radiation detector 21 in the rotation axis direction RAD (CR>WA) and the imaging control unit 112 sets two or more height positions as the height positions of the radiation source 20 and the radiation detector 21 during imaging as illustrated in FIG. 15.

First, FIGS. 17 and 18 illustrate a case in which two height positions A and B are set as the height positions of the radiation source 20 and the radiation detector 21 during imaging. The height positions A and B illustrated in FIG. 17 are set such that a lower end RLE of a flux of the radiation R at the height position A is matched with an upper end RUE of a flux of the radiation R at the height position B. In this case, the imaging range CR is an imaging range in which the total width of a high-definition drawing region HDA along the rotation axis RTA has the maximum value in a case in which the two height positions A and B are set as the height positions of the radiation source 20 and the radiation detector 21 during imaging. The high-definition drawing region HDA is a region in which the radiation R is emitted at any rotation angle and a high-definition tomographic image 138 can be obtained. The width of the high-definition drawing region HDA at one height position is determined by, for example, the rotation radius of the radiation source 20 (the distance between the rotation center C and the focus of the radiation R of the radiation source 20), the rotation radius of the radiation detector 21 (the distance between the rotation center C and the center point CS of the detection surface 58 of the radiation detector 21), and the widths WA and WB of the detection surface 58 of the radiation detector 21 and is, for example, 200 mm to 300 mm. Further, in this embodiment, the term "match" means match including an error that is generally allowed in the technical field to which the technology of the present disclosure belongs and does not deviate from the gist of the technology of the present disclosure, in addition to perfect match.

The imaging range CR illustrated in FIG. 17 is a range having a width that is about 1.5 times the width WA of the detection surface 58 of one radiation detector 21 in the rotation axis direction RAD. In addition, FIG. 17 illustrates the radiation R in a case in which the radiation source 20 and the radiation detector 21 are located at each of the positions of 0° and 180° illustrated in FIG. 8, for convenience of explanation. Further, in FIG. 17, the radiation detector 21 is not offset unlike FIG. 9 in order to avoid complication. The same is also applied to FIG. 18 and the like which will be described below.

The imaging ranges CR partially overlap at the height positions A and B as represented by reference numeral OCR1. The imaging control unit 112 sets positions where a first overlapping imaging range OCR1 can be secured as the height positions A and B. That is, the imaging control unit 112 sets the height positions A and B such that the first overlapping imaging range OCR1 occurs between projection images 135A and 135B (see FIG. 21) obtained at the height positions A and B. In addition, the first overlapping imaging range OCR1 in the case illustrated in FIG. 17 is, for example, 10 mm to 30 mm.

FIG. 18 illustrates a case in which the imaging range CR exceeds the width WA of the detection surface 58 of the radiation detector 21 in the rotation axis direction RAD and is narrower than that in the case illustrated in FIG. 17. In this case, the imaging control unit 112 sets the height positions A and B to be closer than those in the case illustrated in FIG. 17. In this case, the high-definition drawing regions HDA at the height positions A and B partially overlap. In addition, the first overlapping imaging range OCR1 is wider than that in the case illustrated in FIG. 17.

FIG. 19 illustrates a case in which three height positions A, B, and C are set as the height positions of the radiation source 20 and the radiation detector 21 during imaging. The height positions A and B illustrated in FIG. 19 are set such that the lower end RLE of the flux of the radiation R at the height position A is matched with the upper end RUE of the flux of the radiation R at the height position B as in the case illustrated in FIG. 17. Further, the height positions B and C illustrated in FIG. 19 are set such that the lower end RLE of the flux of the radiation R at the height position B is matched with the upper end RUE of the flux of the radiation R at the height position C. In this case, the imaging range CR is an imaging range in which the total width of the high-definition drawing regions HDA along the rotation axis RTA has the maximum value in a case in which the three height positions A, B, and C are set as the height positions of the radiation source 20 and the radiation detector 21 during imaging. In this case, the first overlapping imaging range OCR1 is, for example, 10 mm to 30 mm as in the case illustrated in FIG. 17. Further, four or more height positions may be set depending on the imaging range CR, which is not illustrated.

Figure 20:
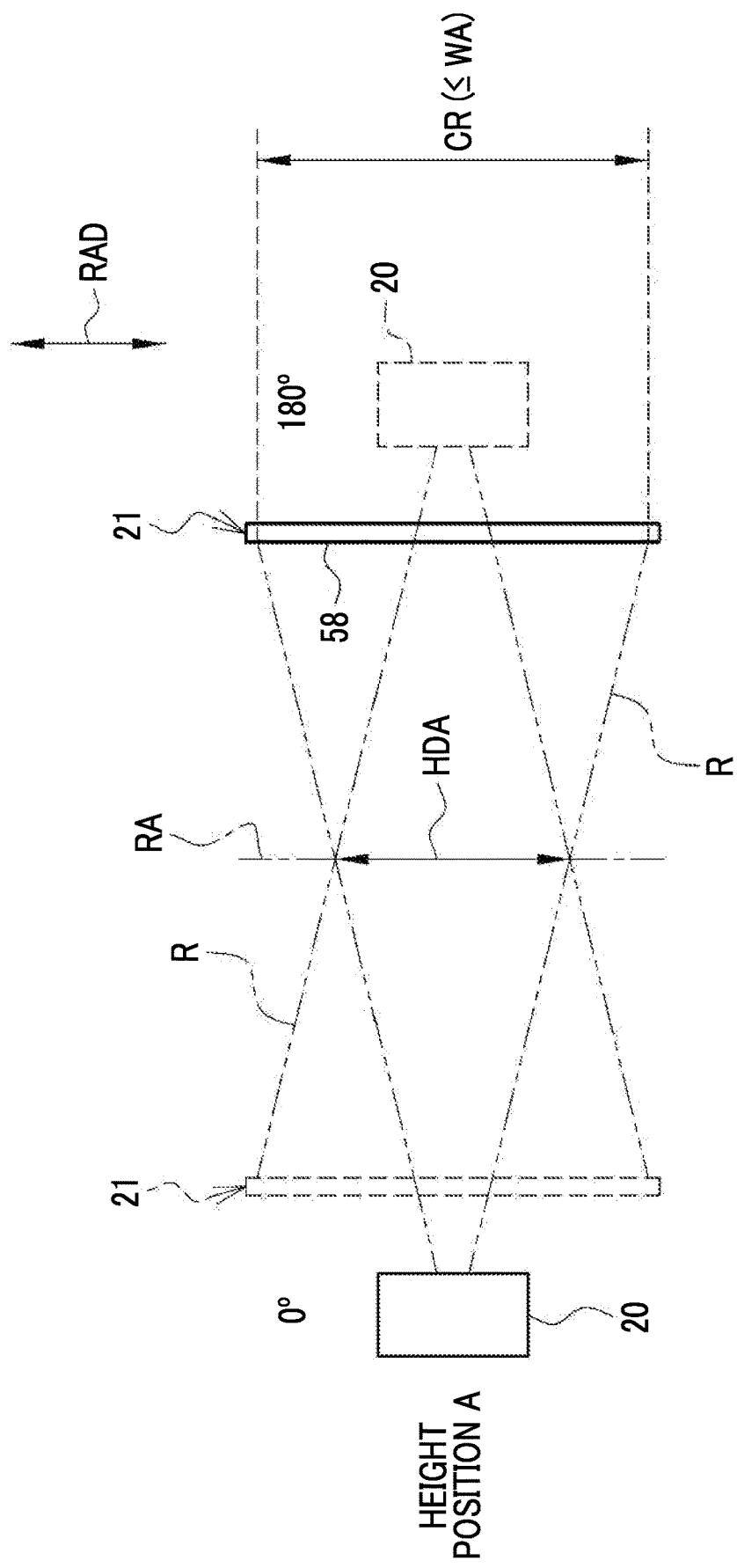
FIG. 20 is a diagram illustrating a case in which one height position is set.

On the other hand, FIG. 20 illustrates a case in which the designated imaging range CR is within the width WA of the detection surface 58 of the radiation detector 21 in the rotation axis direction RAD (CR≤WA) and the imaging control unit 112 sets only one height position A as the height position of the radiation source 20 and the radiation detector 21 during imaging as illustrated in FIG. 16. In particular, FIG. 20 illustrates a case in which the imaging range CR is matched with the width WA (CR=WA).

Figure 21:
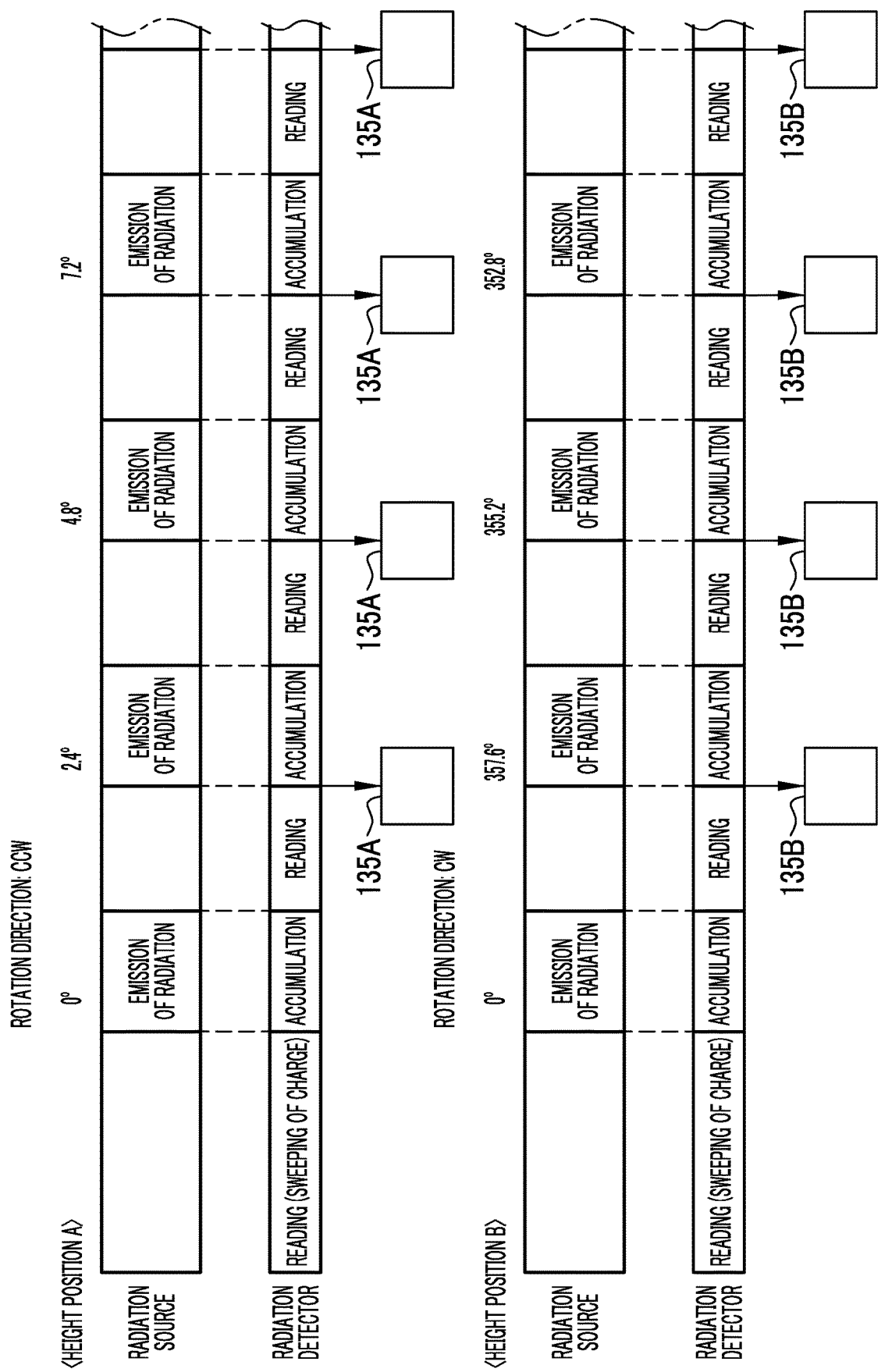
FIG. 21 is a timing chart illustrating a time when the radiation source emits the radiation and a time when the radiation detector reads a projection image in a case in which two height positions are set.

For example, as illustrated in FIG. 21, in the case of the aspect illustrated in FIGS. 17 and 18, at the height position A, the imaging control unit 112 rotates the radiation source 20 in the counterclockwise direction CCW, using 0° as the rotation start position and the rotation end position, and directs the radiation source 20 to emit the radiation R at an interval of 2.4°, for example, at 2.4°, 4.8°, 7.2°, . . . , 352.8°, 355.2°, and 357.6°. In addition, the projection image 135A is output from the radiation detector 21 at an interval of 2.4°. At the height position B, the imaging control unit 112 rotates the radiation source 20 in the clockwise direction CW, using 0° as the rotation start position and the rotation end position, and directs the radiation source 20 to emit the radiation R at an interval of 2.4°, for example, at 357.6°, 355.2°, 352.8°, . . . , 7.2°, 4.8°, and 2.4°. In addition, the projection image 135B is also output from the radiation detector 21 at an interval of 2.4°. As described above, the imaging control unit 112 rotates the radiation source 20 and the radiation detector 21 in opposite directions at the height positions A and B. 2.4° is an example of a "preset angle" according to the technology of the present disclosure. In addition, strictly speaking, the rotation end position at the height position A is a position that is separated from 0° by an angle θ in the counterclockwise direction CCW, and the rotation end position at the height position B is a position that is separated from 0° by the angle θ in the clockwise direction CW.

The imaging control unit 112 directs the radiation detector 21 to perform the reading operation at any of the height positions A and B before imaging. This reading operation is an operation of sweeping out unnecessary charge, such as dark charge, accumulated in the pixel 57 during standby and is also called a reset operation.

After directing the radiation detector 21 to perform the reading operation of sweeping out unnecessary charge, the imaging control unit 112 directs the radiation source 20 to emit the radiation R. In addition, the imaging control unit 112 directs the radiation detector 21 to perform an accumulation operation. The accumulation operation is an operation of accumulating charge based on the radiation R in the pixel 57. Then, the imaging control unit 112 directs the radiation detector 21 to perform the reading operation and directs the radiation detector 21 to output the projection image 135A (the projection image 135 at the height position A) or 135B (the projection image 135 at the height position B) based on the radiation R. Therefore, the imaging control unit 112 performs conventional scanning that directs the radiation source 20 to emit the radiation R at every set angle of 2.4° and directs the radiation detector 21 to output the projection image 135 at the height positions A and B without changing the positional relationship between the subject S, and the radiation source 20 and the radiation detector 21 in the rotation axis direction RAD. For example, the imaging control unit 112 moves the radiation source 20 and the radiation detector 21 to the height position A and performs the conventional scanning at the height position A. Then, the imaging control unit 112 moves the radiation source 20 and the radiation detector 21 to the height position B and performs the conventional scanning at the height position B. In addition, the irradiation time of the radiation R is, for example, 5 msec to 15 msec.

In the case of the aspect illustrated in FIG. 19, the conventional scanning at the height positions A and B is the same as that in the case illustrated in FIG. 21, which is not illustrated. At the height position C, the imaging control unit 112 rotates the radiation source 20 in the counterclockwise direction CCW, using 0° as the rotation start position and the rotation end position, and directs the radiation source 20 to emit the radiation R at an interval of 2.4°, for example, at 2.4°, 4.8°, 7.2°, . . . as at the height position A. In addition, the projection image 135A is output from the radiation detector 21 at an interval of 2.4°. For example, the imaging control unit 112 moves the radiation source 20 and the radiation detector 21 to the height position A and performs the conventional scanning at the height position A. Then, the imaging control unit 112 moves the radiation source 20 and the radiation detector 21 to the height position B and performs the conventional scanning at the height position B. Further, then, the radiation source 20 and the radiation detector 21 are moved to the height position C, and the conventional scanning is performed at the height position C.

Figure 22:
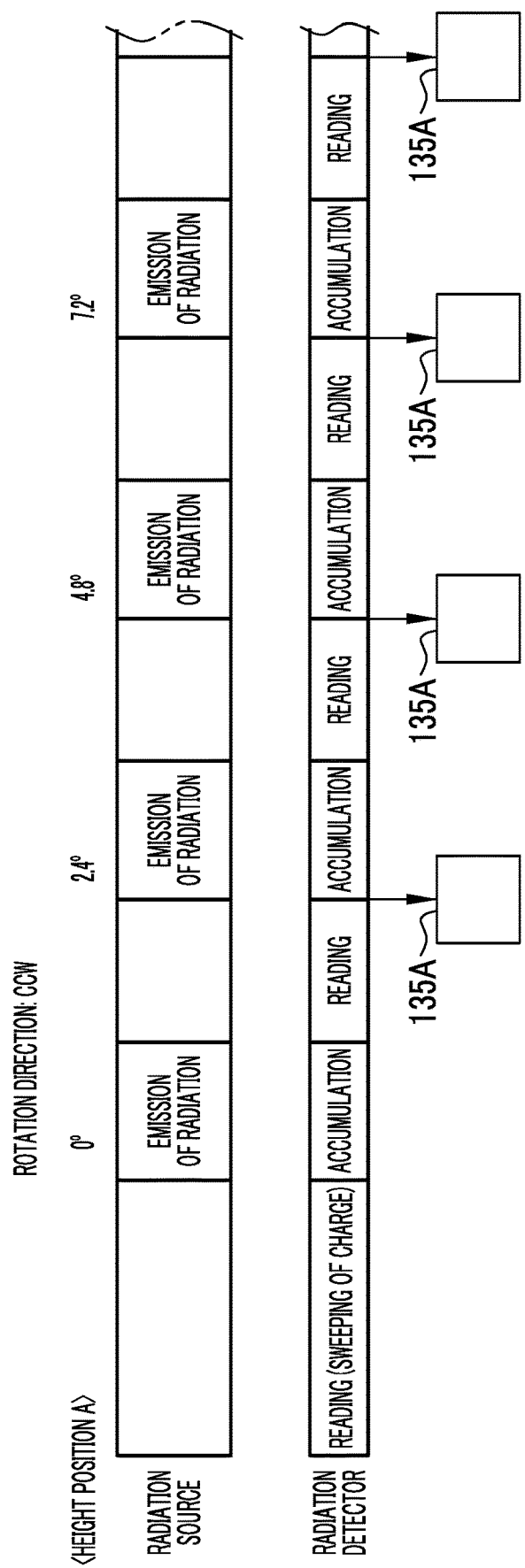
FIG. 22 is a timing chart illustrating the time when the radiation source emits the radiation and the time when the radiation detector reads the projection image in a case in which one height position is set.

On the other hand, for example, as illustrated in FIG. 22, in the case of the aspect illustrated in FIG. 20, at the height position A, the imaging control unit 112 rotates the radiation source 20 in the counterclockwise direction CCW, using 0° as the rotation start position and the rotation end position, and directs the radiation source 20 to emit the radiation R at an interval of 2.4°, for example, at 2.4°, 4.8°, 7.2°, . . . , 352.8°, 355.2°, and 357.6°. In addition, the projection image 135A is output from the radiation detector 21 at an interval of 2.4°. As described above, in the case of the aspect illustrated in FIG. 20, the conventional scanning is performed only once at one height position. In addition, strictly speaking, the rotation end position is a position that is separated from 0° by the angle θ in the counterclockwise direction CCW.

Here, since the radiation source 20 and the radiation detector 21 are rotated, there is a slight deviation between the positions of the radiation source 20 and the radiation detector 21 in a case in which the emission of the radiation R is started and in a case in which the emission of the radiation R is ended. However, it is assumed that the position (0°, 2.4°, 4.8°, . . . ) of the radiation source 20 in a case in which the emission of the radiation R is started is the acquisition position of the projection image 135. In addition, after the rotation of the frame 18 is temporarily stopped at each of the preset angles 0°, 2.4°, 4.8°, . . . , the radiation R may be emitted from the radiation source 20.

Figure 23:
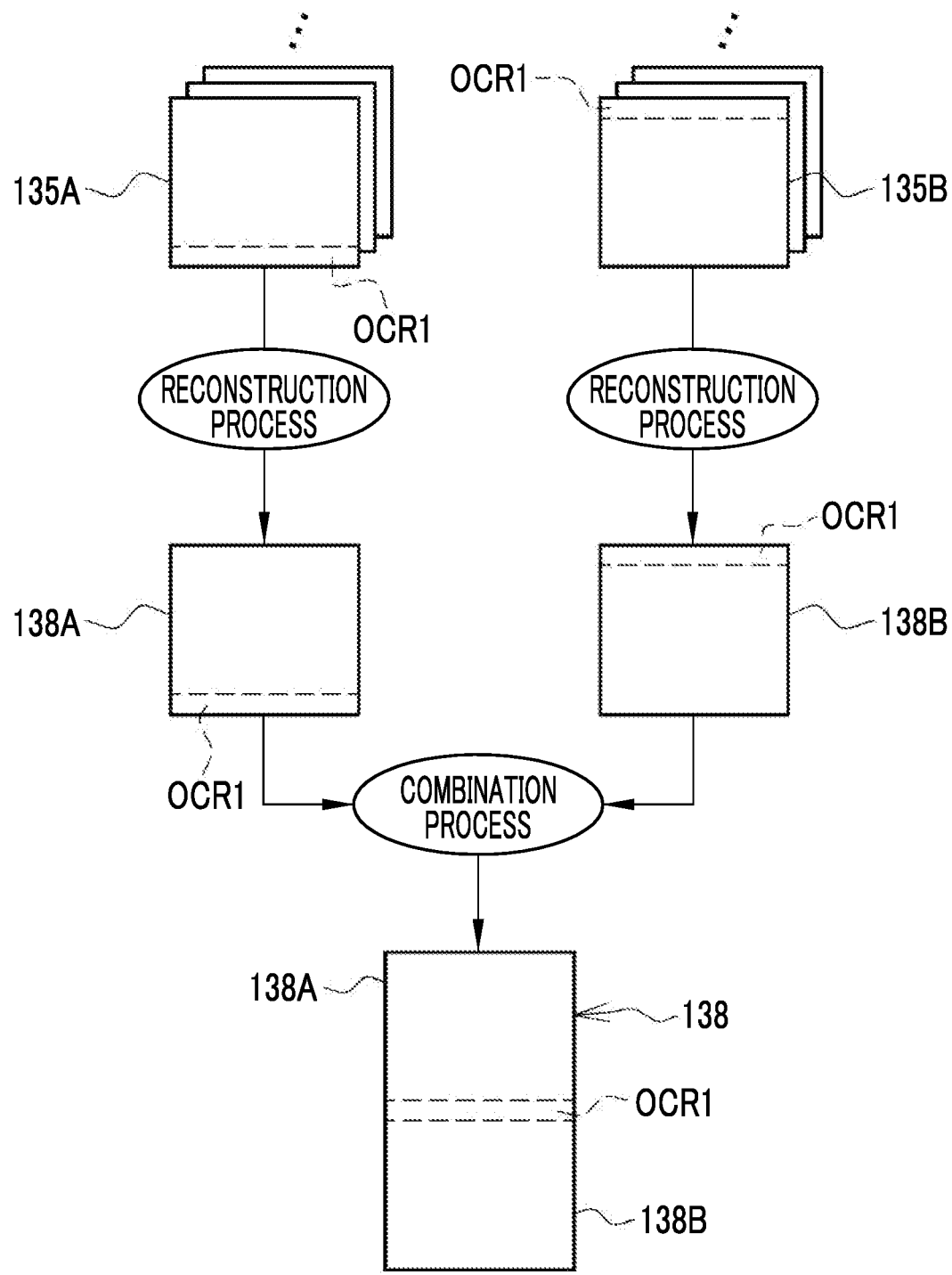
FIG. 23 is a diagram illustrating an outline of a process of an image processing unit in a case in which two height positions are set.

For example, as illustrated in FIG. 23, in the case of the aspect illustrated in FIGS. 17 and 18, the image processing unit 113 performs a reconstruction process on the projection images 135A obtained at the height position A to generate a tomographic image 138A at the position A. In addition, the image processing unit 113 performs the reconstruction process on the projection images 135B obtained at the height position B to generate a tomographic image 138B at the height position B. The image processing unit 113 registers the tomographic images 138A and 138B on the basis of the first overlapping imaging range OCR1 and combines the tomographic images 138A and 138B to generate a final tomographic image 138 for diagnosis. In this case, a process may be performed using a sigmoid function to smoothly connect the tomographic images 138A and 138B in the first overlapping imaging range OCR1.

Figure 24:
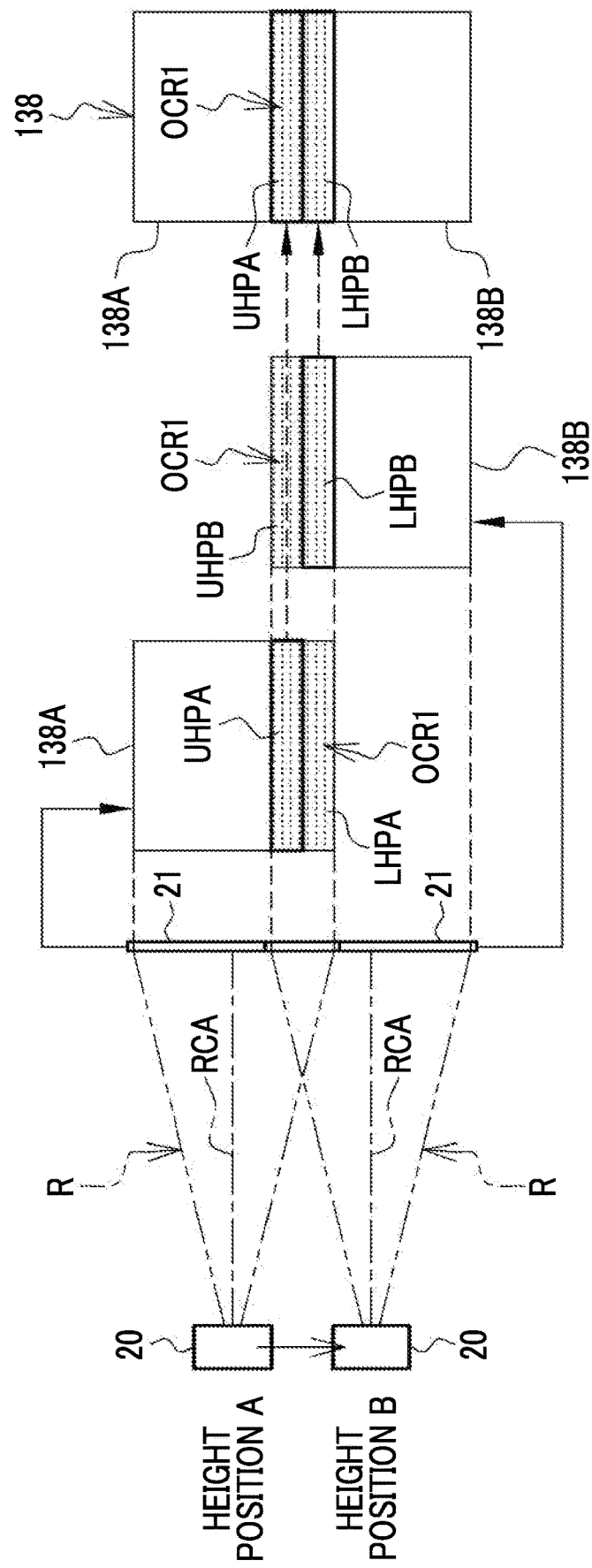
FIG. 24 is a diagram illustrating details of a combination process in FIG. 23.

In FIG. 24 illustrating the details of the combination process in FIG. 23, the image processing unit 113 combines the tomographic images 138A and 138B, selectively using portions which are closer to a focal axis FA of the radiation R in the first overlapping imaging range OCR1. The focal axis FA is a perpendicular line that is drawn from the focus of the radiation R to the center point CS of the detection surface 58 of the radiation detector 21. The focal axis FA is the same as the central axis RCA of the flux of the radiation R because a case in which the upper and lower ends of the irradiation opening of the irradiation field limiter 56 are evenly opened is described here. Therefore, the portions closer to the focal axis FA are a portion UHPA corresponding to the upper half of the first overlapping imaging range OCR1 in the tomographic image 138A and a portion LHPB corresponding to the lower half of the first overlapping imaging range OCR1 in the tomographic image 138B. The portion UHPA is closer to the focal axis FA of the radiation R at the height position A than the portion LHPA corresponding to the lower half of the first overlapping imaging range OCR1 in the tomographic image 138A. In addition, the portion LHPB is closer to the focal axis FA of the radiation R at the height position B than the portion UHPB corresponding to the upper half of the first overlapping imaging range OCR1 in the tomographic image 138B.

Figure 25:
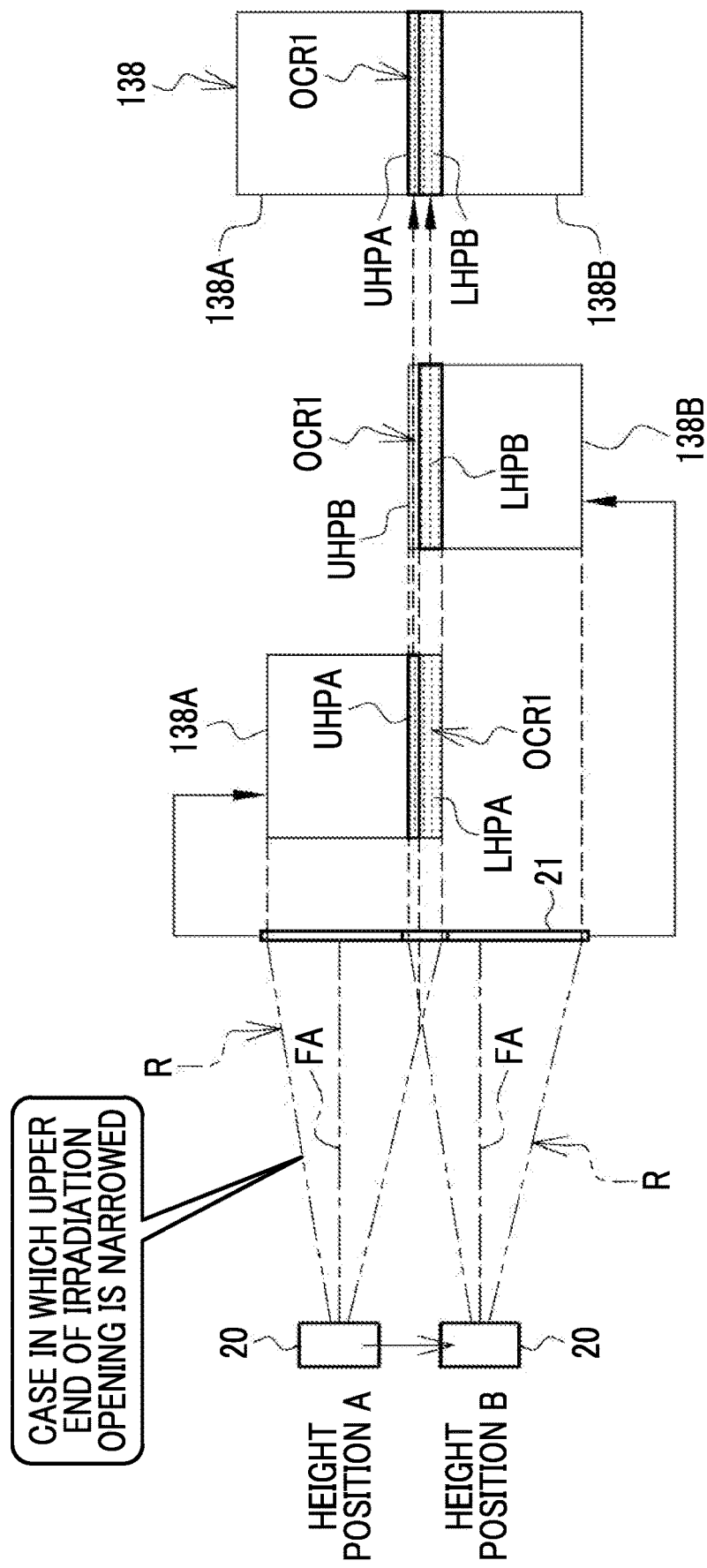
FIG. 25 is a diagram illustrating another example of the details of the combination process.

FIG. 24 illustrates a case in which the upper and lower ends of the irradiation opening of the irradiation field limiter 56 are evenly opened. However, the present disclosure is not limited thereto. For example, as illustrated in FIG. 25, a case in which the upper end is narrower than the lower end of the irradiation opening is also considered. In this case, as in the case illustrated in FIG. 24, the image processing unit 113 combines the tomographic images 138A and 138B, selectively using portions which are closer to the focal axis FA of the radiation R in the first overlapping imaging range OCR1 and which are a portion UHPA corresponding to the upper half of the first overlapping imaging range OCR1 in the tomographic image 138A and a portion LHPB corresponding to the lower half of the first overlapping imaging range OCR1 in the tomographic image 138B.

In the case illustrated in FIG. 24, the width of the portion UHPA corresponding to the upper half of the first overlapping imaging range OCR1 in the tomographic image 138A is equal to the width of portion LHPB corresponding to the lower half of the first overlapping imaging range OCR1 in the tomographic image 138B. On the other hand, in the case illustrated in FIG. 25, since the upper end of the irradiation opening is narrowed, the width of the portion UHPA corresponding to the upper half of the first overlapping imaging range OCR1 in the tomographic image 138A is smaller than the width of the portion LHPB corresponding to the lower half of the first overlapping imaging range OCR1 in the tomographic image 138B. Further, contrary to the case illustrated in FIG. 25, even in a case in which the lower end of the irradiation opening is narrower than the upper end thereof, the image processing unit 113 combines the tomographic images 138A and 138B, selectively using the portions which are closer to the focal axis FA of the radiation R in the first overlapping imaging range OCR1 and which are the portion UHPA corresponding to the upper half of the first overlapping imaging range OCR1 in the tomographic image 138A and the portion LHPB corresponding to the lower half of the first overlapping imaging range OCR1 in the tomographic image 138B, which is not illustrated. In a case in which the lower end of the irradiation opening is narrower than the upper end thereof, the width of the portion LHPB corresponding to the lower half of the first overlapping imaging range OCR1 in the tomographic image 138B is smaller than the width of the portion UHPA corresponding to the upper half of the first overlapping imaging range OCR1 in the tomographic image 138A.

A width W_UHPA of the portion UHPA corresponding to the upper half of the first overlapping imaging range OCR1 in the tomographic image 138A can be calculated by the following Expression (1), using a difference ΔH between the heights of the radiation source 20 at the height positions A and B and the shorter distance D (in the case illustrated in FIG. 25, the distance between the focal axis FA and the upper end of the flux of the radiation) of the distances between the focal axis FA and the upper and lower ends of the flux of the radiation R.

$$W\_UHPA = D - (\Delta H/2) \qquad (1)$$

Therefore, for example, in a case in which D is 149 mm and ΔH is 250 mm, W_UHPA is 24 mm.

In addition, a width W_LHPB of the portion LHPB corresponding to the lower half of the first overlapping imaging range OCR1 in the tomographic image 138B can be calculated by the following Expression (2), using the width WA of the detection surface 58 of the radiation detector 21 in the rotation axis direction RAD, the difference ΔH, and the distance D.

$$W\_LHPB = WA - D - (\Delta H/2) \quad (2)$$

Therefore, for example, in a case in which WA is 430 mm, D is 149 mm, and ΔH is 250 mm, W_UHPA is 156 mm.

Figure 26:
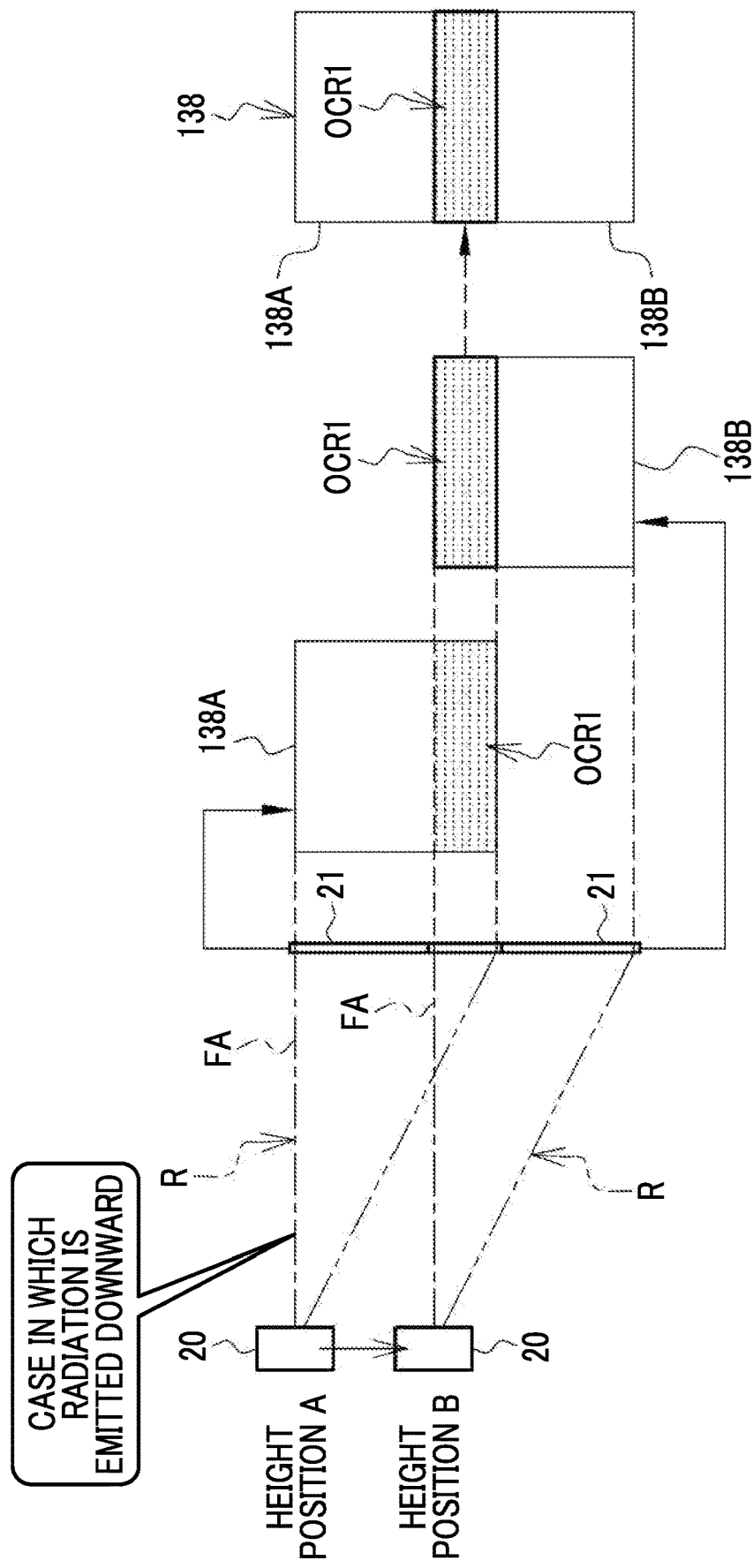
FIG. 26 is a diagram illustrating still another example of the details of the combination process.

For example, as illustrated in FIG. 26, in a case in which the radiation R is emitted downward while the upper end of the flux of the radiation R is matched with the focal axis FA, the image processing unit 113 combines the tomographic images 138A and 138B, using the first overlapping imaging range OCR1 of the tomographic image 138B which is closer to the focal axis FA, without using the first overlapping imaging range OCR1 of the tomographic image 138A which is far away from the focal axis FA. Further, in a case in which the radiation R is emitted upward while the lower end of the flux of the radiation R is matched with the focal axis FA, the image processing unit 113 combines the tomographic images 138A and 138B, using the first overlapping imaging range OCR1 of the tomographic image 138A, which is not illustrated.

In the case of the aspect illustrated in FIG. 19, the image processing unit 113 performs the reconstruction process on each of the projection images 135 obtained at the height positions A to C to generate the tomographic images 138 at the height positions A to C, which is not illustrated. Then, the tomographic images 138 at the height positions A to C are registered on the basis of the first overlapping imaging range OCR1 and are combined.

Figure 27:
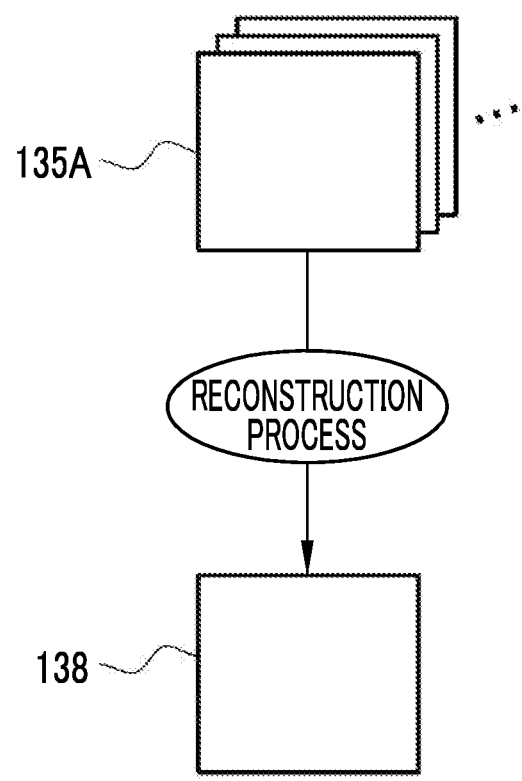
FIG. 27 is a diagram illustrating the outline of the process of the image processing unit in a case in which one height position is set.

On the other hand, for example, as illustrated in FIG. 27, in the case of the aspect illustrated in FIG. 20, the image processing unit 113 performs the reconstruction process on the projection images 135A obtained at the height position A to generate the final tomographic image 138 for diagnosis.

Figure 28:
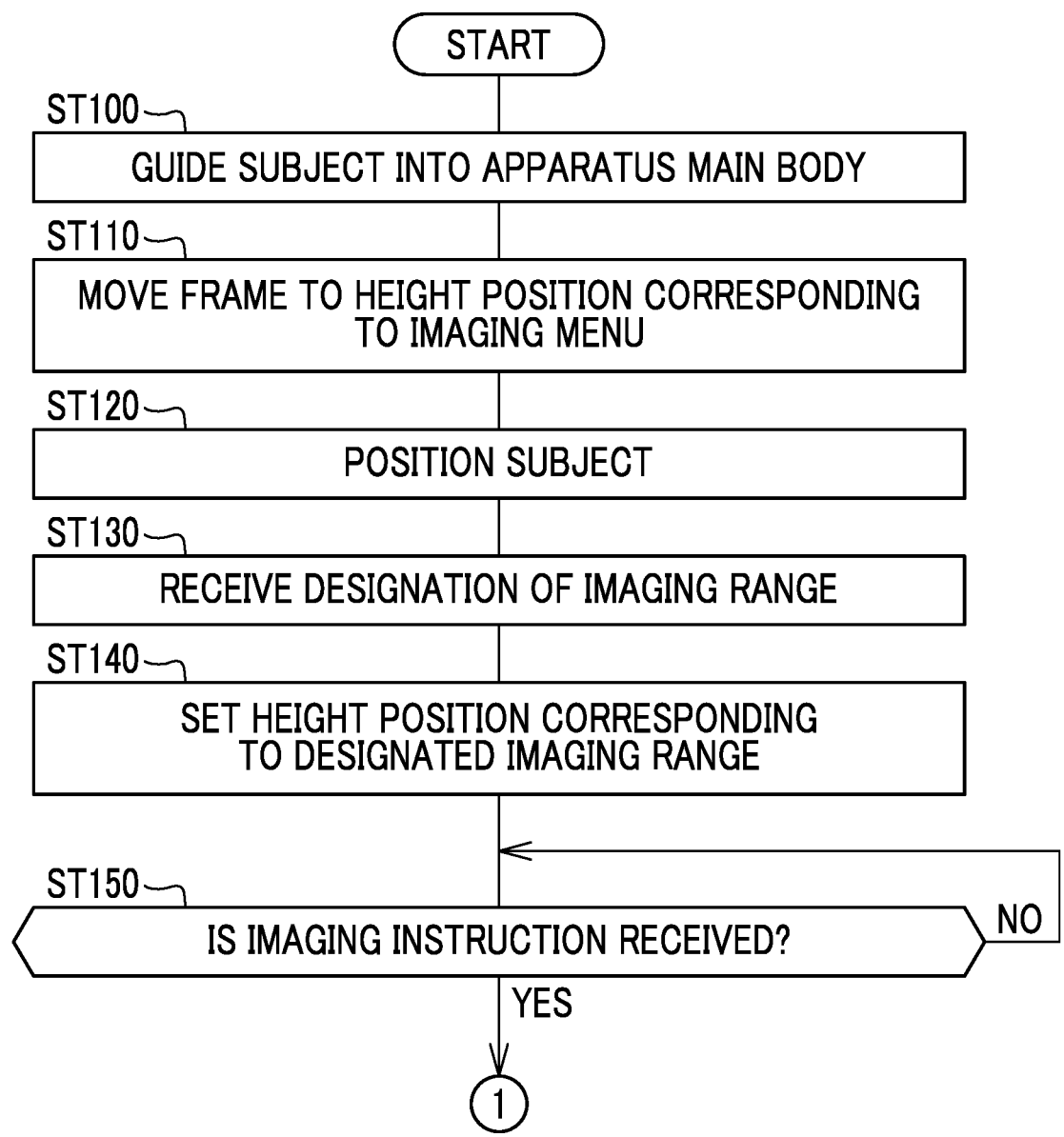
FIG. 28 is a flowchart illustrating an imaging procedure by the CT apparatus.
Figure 29:
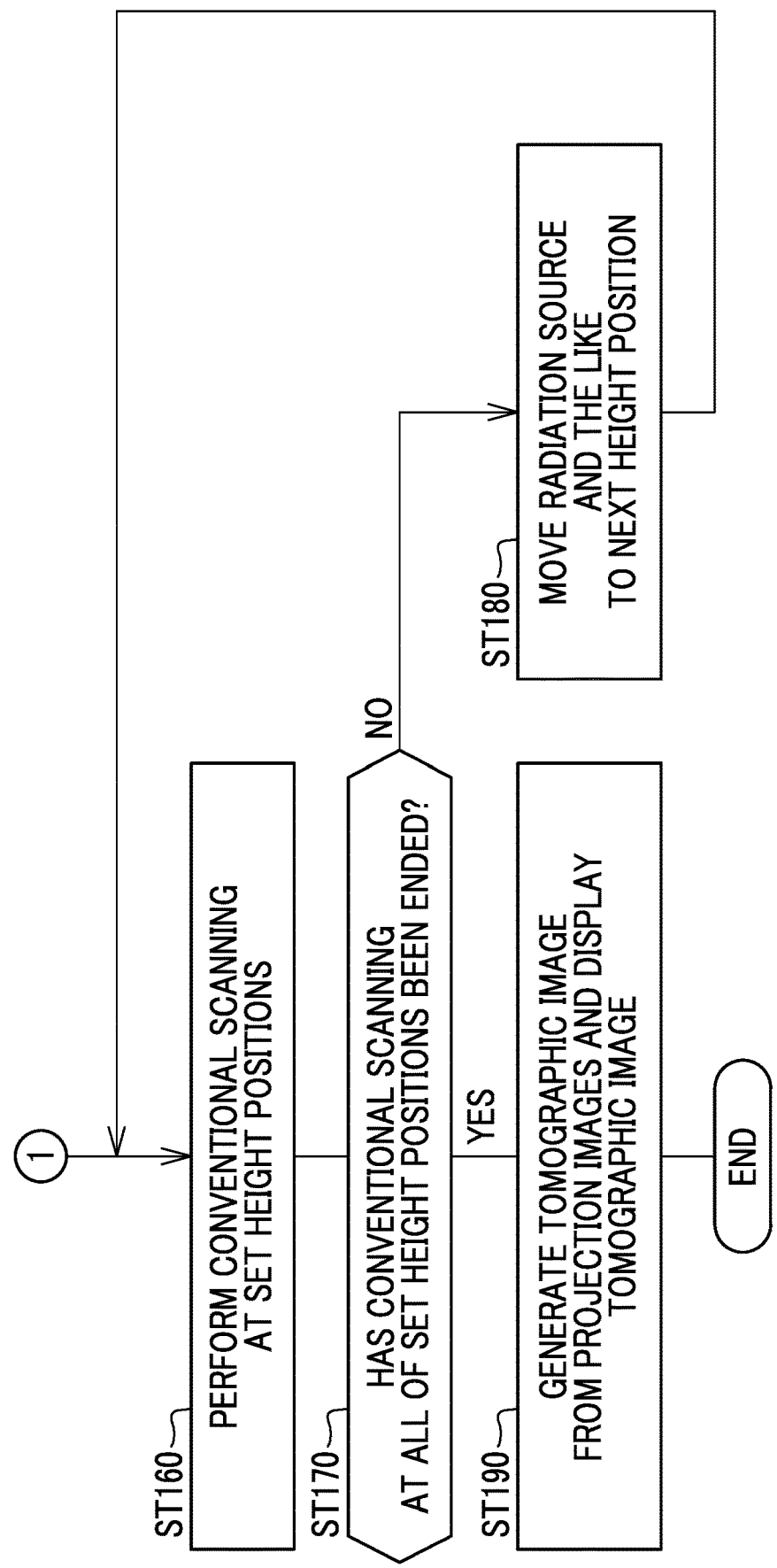
FIG. 29 is a flowchart illustrating the imaging procedure by the CT apparatus.

Next, an example of an imaging procedure by the CT apparatus 10 will be described with reference to flowcharts illustrated in FIGS. 28 and 29. First, the subject S is guided into the apparatus main body 11 by the operator (Step ST100). Then, the frame elevating mechanism 35 is operated under the control of the imaging control unit 112 to move the frame 18 to a height position corresponding to the imaging menu 116 (Step ST110). Then, the operator positions the subject S (Step ST120).

The subject S positioned in the apparatus main body 11 is imaged by the camera 26. The camera image 121 obtained by the imaging is transmitted from the camera 26 to the display control unit 114. Then, as illustrated in FIG. 11 and the like, the camera image display screen 120 including the camera image 121 is displayed on the display 98 or the like under the control of the display control unit 114. The operator determines whether or not the height position of the frame 18 and the positioning of the subject S are appropriate for imaging with reference to the camera image 121 and the imaging range CR displayed to be superimposed on the camera image 121. In a case in which the height position of the frame 18 and the positioning of the subject S are not appropriate for imaging, the operator adjusts the height position of the frame 18 or repositions the subject S. In addition, the bars 124A and 124B indicating the upper and lower ends of the imaging range CR may be moved by the operator. Further, the height position of the frame 18 may be changed by the frame elevating mechanism 35 in operative association with the operation of moving the bars 124A and 124B.

In a case in which the decision button 123 of the camera image display screen 120 is selected, the receiving unit 110 receives the imaging range information 128 indicating the height positions of the bars 124A and 124B at that time. In this way, the designation of the imaging range CR is received (Step ST130).

Here, as illustrated in FIGS. 13 and 14, in a case in which the upper end (bar 124A) of the designated imaging range CR exceeds the upper limit UL and in a case in which the lower end (bar 124B) of the designated imaging range CR exceeds the lower limit LL, the warning screens 130A and 130B are displayed on, for example, the display 98 under the control of the display control unit 114.

As illustrated in FIG. 15, in a case in which the designated imaging range CR exceeds the width WA of the detection surface 58 of the radiation detector 21 in the rotation axis direction RAD, the imaging control unit 112 sets two or more height positions (for example, the height positions A and B) as the height positions of the radiation source 20 and the radiation detector 21 during imaging (Step ST140). On the other hand, as illustrated in FIG. 16, in a case in which the designated imaging range CR is within the width WA of the detection surface 58 of the radiation detector 21 in the rotation axis direction RAD, the imaging control unit 112 sets one height position (height position A) as the height position of the radiation source 20 and the radiation detector 21 during imaging (Step ST140).

After designating the imaging range CR, the operator inputs an imaging instruction through the irradiation switch. The receiving unit 110 receives the imaging instruction (YES in Step ST150). Then, imaging is performed by the radiation source 20 and the radiation detector 21.

In the imaging, as illustrated in FIGS. 21 and 22, the rotation mechanism 45 is operated under the control of the imaging control unit 112, and the frame 18 is rotated. In the meantime, under the control of the imaging control unit 112, the radiation R is continuously emitted from the radiation source 20. Whenever the radiation R is emitted, the projection image 135 is output from the radiation detector 21. This conventional scanning is performed at the set height position (Step ST160).

While two or more height positions are set and the conventional scanning at all of the set height positions has not been ended (NO in Step ST170), the frame elevating mechanism 35 is operated under the control of the imaging control unit 112, and the radiation source 20 and the radiation detector 21 are moved to the next height position (Step ST180). Then, the conventional scanning is performed again (Step ST160). In this case, the radiation source 20 and the radiation detector 21 are rotated in a rotation direction opposite to the rotation direction in the conventional scanning at the previous height position.

In a case in which the conventional scanning at all of the set height positions has been ended (YES in Step ST170), as illustrated in FIGS. 23 to 27, the image processing unit 113 generates the tomographic image 138 from the obtained projection images 135 (Step ST190). Then, under the control of the display control unit 114, the tomographic image 138 is displayed on, for example, the display 98 and is provided for viewing by the operator (Step ST190).

As described above, the CT apparatus 10 comprises the radiation source 20, the radiation detector 21, the rotation mechanism 45, the frame elevating mechanism 35, and the CPU 97. The radiation source 20 emits the radiation R having a quadrangular pyramid shape to the subject S positioned in either the standing posture or the sitting posture. The radiation detector 21 has a plurality of pixels 57 that detect the radiation R transmitted through the subject S and that are two-dimensionally arranged and outputs the projection image 135 of the subject S. The rotation mechanism 45 rotates the radiation source 20 and the radiation detector 21 around the body axis of the subject S. The frame elevating mechanism 35 raises and lowers the radiation source 20 and the radiation detector 21 along the rotation axis direction RAD.

The imaging control unit 112 performs the conventional scanning, which directs the rotation mechanism 45 to rotate the radiation source 20 and the radiation detector 21 without changing the positional relationship between the subject S and the radiation source 20 and the radiation detector 21 in the rotation axis direction RAD, directs the radiation source 20 to emit the radiation R whenever the radiation source 20 and the radiation detector 21 are rotated by the preset angle, and directs the radiation detector 21 to output the projection images 135, at a plurality of height positions along the rotation axis direction RAD. The image processing unit 113 generates the tomographic image 138 on the basis of the projection images 135 obtained at the plurality of height positions.

In the technology of the present disclosure, in a case in which a wider range of the subject in the body axis direction is imaged, the subject S does not move. Therefore, it is possible to reduce the concern that the subject S in the standing posture or the sitting posture which is more unstable than the decubitus posture will stagger and body movement will occur in the subject S. As a result, it is possible to reduce the possibility that the quality of the tomographic image 138 will deteriorate. In addition, since the conventional scanning is performed without changing the positional relationship between the subject S, and the radiation source 20 and the radiation detector 21 in the rotation axis direction RAD, operation control in the conventional scanning is simpler than that in helical scanning. Therefore, according to the technology of the present disclosure, it is possible to obtain the tomographic image 138 of a wider range of the subject S in the body axis direction with simple operation control while reducing the concern that body movement will occur in the subject S.

As illustrated in FIG. 7, the radiation source 20 emits the radiation R having a quadrangular pyramid shape, and the radiation detector 21 has the configuration in which the plurality of pixels 57 detecting the radiation R are two-dimensionally arranged. Therefore, it is possible to complete imaging in a short time, as compared to the CT apparatus according to the related art in which a radiation source emits the radiation R having a fan shape and a radiation detector in which pixels are one-dimensionally arranged detects the radiation R. In addition, the radiation R having a conical shape instead of the quadrangular pyramid shape may be emitted.

As illustrated in FIGS. 1, 2, and 4, the subject S is positioned in either the standing posture or the sitting posture. Therefore, it is possible to meet the demand to observe soft tissues, such as the lungs, in a natural state in which gravity is applied or to observe joints, such as hip joints, in a state in which gravity is applied and a load is applied.

As illustrated in FIGS. 17 to 19, the imaging control unit 112 sets the height positions such that the first overlapping imaging range OCR1 occurs between the projection images 135 obtained at adjacent height positions. As illustrated in FIG. 23, the image processing unit 113 generates a plurality of tomographic images 138 at each of a plurality of height positions from the projection images 135 obtained at the plurality of height positions. Then, the image processing unit 113 registers the plurality of tomographic images 138 on the basis of the first overlapping imaging range OCR1 to combine the plurality of tomographic images 138. Therefore, it is possible to capture the tomographic image 138 covering the imaging range CR that exceeds the width WA of the detection surface 58 for the radiation R in the radiation detector 21. In addition, after a plurality of projection images 135 at each of the plurality of height positions are registered on the basis of the first overlapping imaging range OCR1 and are combined, the reconstruction process may be performed on the combined projection images 135 to generate the tomographic images 138.

As illustrated in FIGS. 24 and 25, the image processing unit 113 combines the tomographic images 138, selectively using the portions (portions UHPA and LHPB) which are closer to the focal axis FA of the radiation R in the first overlapping imaging range OCR1. The portions closer to the focal axis FA has better image quality than the portions (portions LHPA and UHPB) farther away from the focal axis FA. Therefore, in a case in which a plurality of tomographic images 138 are combined selectively using the portions that are closer to the focal axis FA and that have relatively good image quality, it is possible to obtain a tomographic image 138 having better image quality.

As illustrated in FIG. 21, the imaging control unit 112 rotates the radiation source 20 and the radiation detector 21 at adjacent height positions in the opposite directions. Therefore, it is not necessary to provide a special mechanism, such as a slip ring, that allows a rotation of 360° or more, and it is possible to simplify the configuration of the apparatus.

In addition, the amount of backlash caused by reversing the rotation direction may be measured in advance on the basis of the difference between a driving value given to the rotary motor 47, for example, in a case in which the CT apparatus 10 is shipped and the actual amount of rotation, and rotation control may be performed according to the measured amount of backlash. For example, in a case in which the amount of backlash is 1.5°, the driving value given to the rotary motor 47 is corrected such that an extra rotation of 1.5° is made in a case in which the rotation direction is reversed. This correction may be performed only in a case in which the rotation direction is reversed.

As illustrated in FIG. 12, the receiving unit 110 receives the designation of the imaging range CR along the rotation axis direction RAD. As illustrated in FIGS. 17 to 19, the imaging control unit 112 directs the frame elevating mechanism 35 to move the radiation source 20 and the radiation detector 21 to the height position corresponding to the designated imaging range CR. Therefore, it is possible to obtain the tomographic image 138 of the imaging range CR intended by the operator.

As illustrated in FIGS. 20 and 22, in a case in which the designated imaging range CR is within the width WA of the detection surface 58 for the radiation R in the radiation detector 21, the imaging control unit 112 performs the conventional scanning only once at one height position corresponding to the imaging range CR. Therefore, it is possible to obtain not only a tomographic image 138 of the imaging range CR exceeding the width WA but also a tomographic image 138 of the imaging range CR within the width WA.

As illustrated in FIG. 1 and the like, the CT apparatus 10 comprises the camera 26 that images the subject S. As illustrated in FIG. 11 and the like, the display control unit 114 performs control to display the bars 124A and 124B indicating the upper and lower ends of the imaging range CR to be superimposed on the camera image 121 obtained from the camera 26. The receiving unit 110 receives the designation of the imaging range CR by the operation of moving the bars 124A and 124B. Therefore, the operator can easily designate the imaging range CR while seeing the subject S included in the camera image 121. In addition, the following configuration may be used: bars indicating the right and left ends of the imaging range CR are displayed to be superimposed on the camera image 121 and the width of the imaging range CR in a direction orthogonal to the rotation axis direction RAD is changed by the operation of moving the bars.

As illustrated in FIGS. 13 and 14, in a case in which the upper end (bar 124A) of the designated imaging range CR exceeds the upper limit UL and in a case in which the lower end (bar 124B) of the designated imaging range CR exceeds the lower limit LL, the display control unit 114 performs control to display the warning screens 130A and 130B on, for example, the display 98. Therefore, it is possible to avoid that imaging is performed in a state in which the upper end of the imaging range CR exceeds the upper limit UL or that imaging is performed in a state in which the lower end of the imaging range CR exceeds the lower limit LL.

Figure 30:
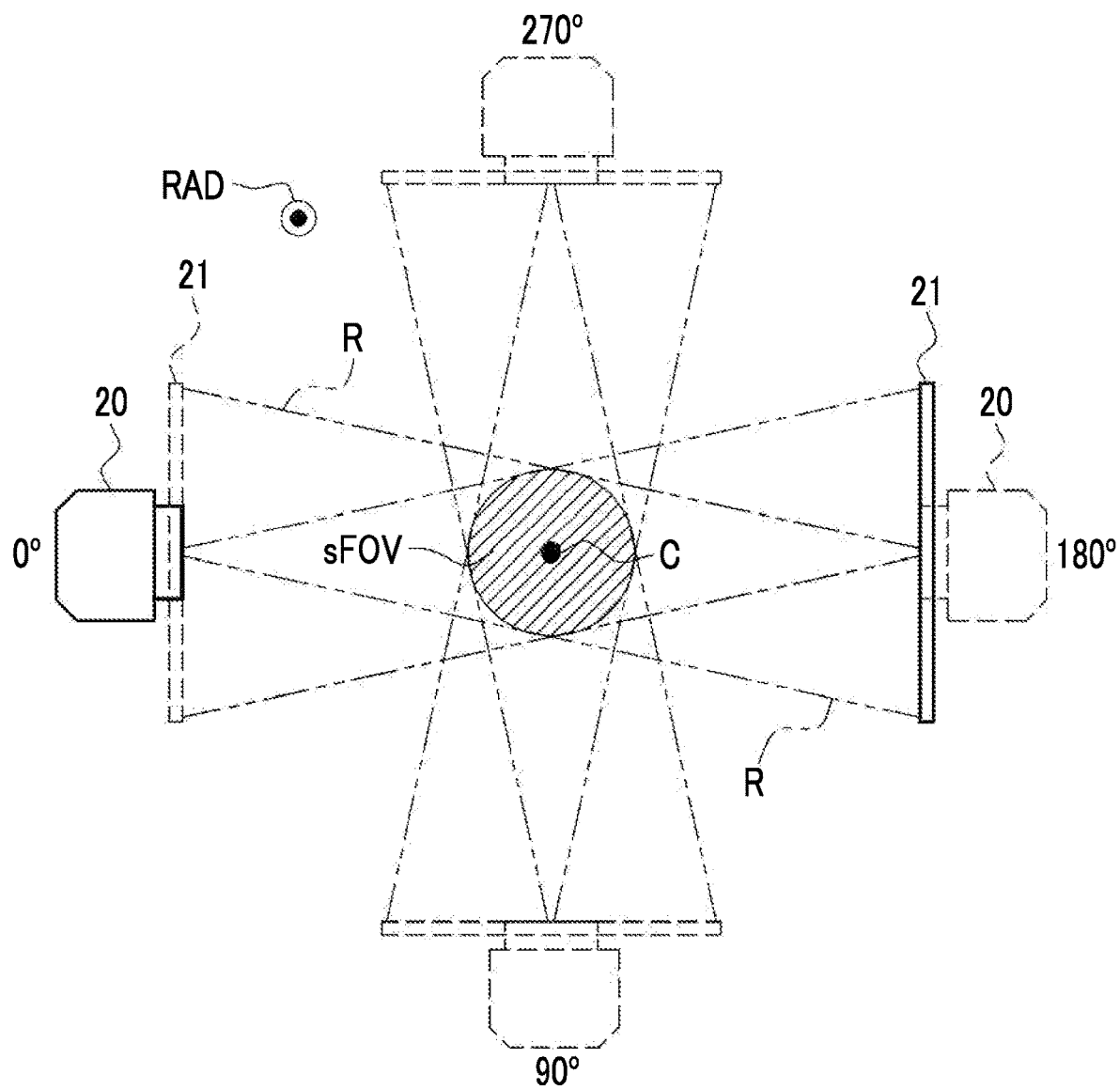
FIG. 30 is a diagram illustrating a scan field of view in a case in which the radiation detector is located at the reference position.
Figure 31:
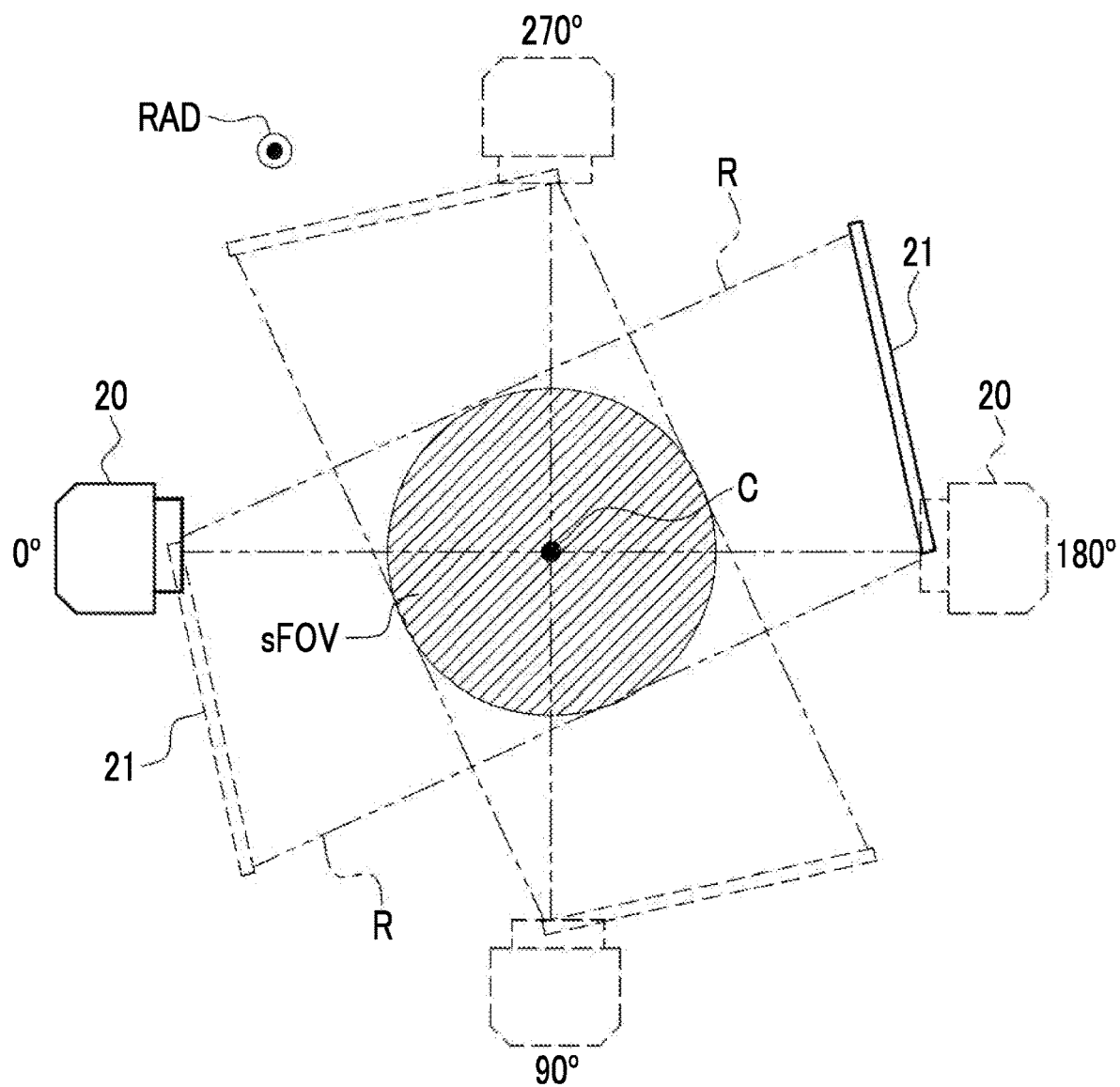
FIG. 31 is a diagram illustrating a scan field of view in a case in which the radiation detector is located at the offset position.

Here, as illustrated in FIG. 30, in a case in which the radiation detector 21 is disposed at the reference position, the region to be scanned does not change with a rotation of 360°. Therefore, a scan field of view sFOV stays in a relatively small region as represented by hatching. On the other hand, as illustrated in FIG. 31, in a case in which the radiation detector 21 is disposed at the offset position, the region to be scanned changes with a rotation of 360°. Therefore, the scan field of view sFOV is a relatively large region as represented by hatching. Therefore, as illustrated in FIG. 9, in a case in which the radiation detector 21 is disposed at the offset position that is separated from the reference position where the radiation detector 21 faces the radiation source 20 by a preset angle as viewed from the rotation axis direction RAD, it is possible to widen the scan field of view sFOV, as compared to the case in which the radiation detector 21 is disposed at the reference position. In addition, the rotation angle in a case in which the radiation detector 21 is disposed at the reference position as illustrated in FIG. 30 is 180° (strictly speaking, 180°+θ).

The radiation source 20 and the radiation detector 21 are held in the frame 18, and the subject S is positioned in the frame 18. As illustrated in FIG. 8, as viewed from the rotation axis direction RAD, the radiation source 20 is disposed outside the frame 18, and the radiation detector 21 is disposed inside the frame 18. The scan field of view sFOV increases as the radiation source 20 is away from the subject S and as the radiation detector 21 is close to the subject S. Therefore, in a case in which the radiation source 20 is disposed outside the frame 18 in which the subject S is positioned and the radiation detector 21 is disposed inside the frame 18, it is possible to widen the scan field of view sFOV.

Second Embodiment

Figure 32:
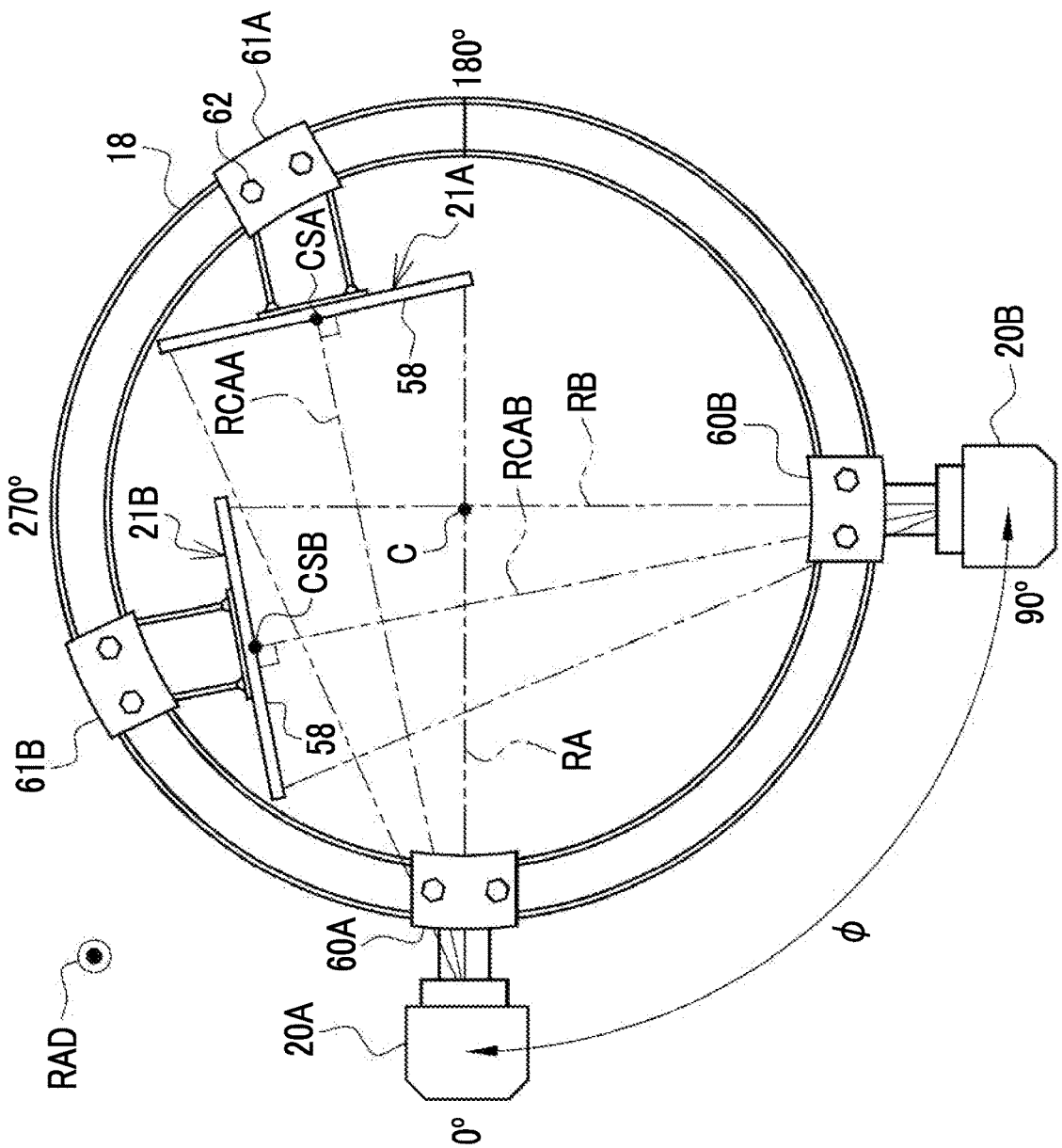
FIG. 32 is a diagram illustrating a second embodiment comprising two imaging units.
Figure 33:
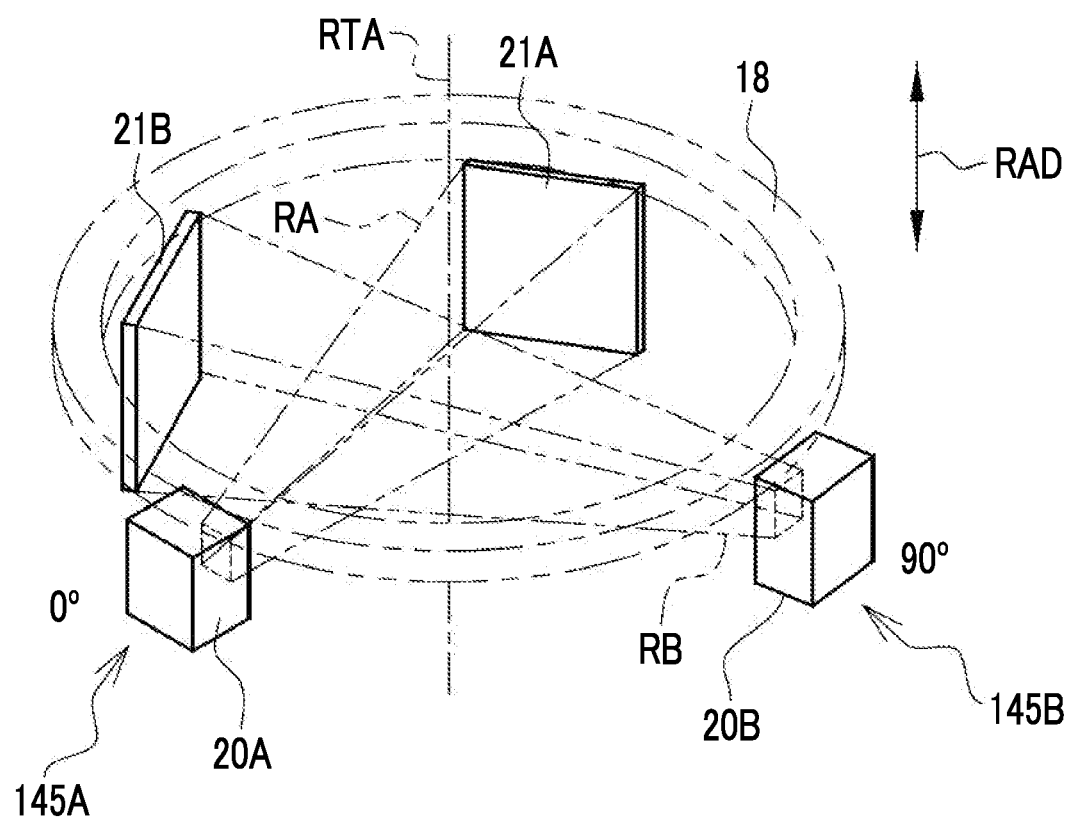
FIG. 33 is a diagram illustrating positions where the imaging units are disposed.

For example, as illustrated in FIGS. 32 and 33, in a second embodiment, two imaging units of an imaging unit 145A and an imaging unit 145B are provided. The imaging unit 145A is composed of a set of a radiation source 20A and a radiation detector 21A, and the imaging unit 145B is composed of a set of a radiation source 20B and a radiation detector 21B. The radiation source 20A is disposed at a position of 0° similarly to the radiation source 20 according to the first embodiment. The radiation source 20B is disposed at a position that is separated from the radiation source 20A by an angle φ. The radiation detectors 21A and 21B are disposed at positions corresponding to the positions where the radiation sources 20A and 20B are disposed. Therefore, the imaging unit 145A and the imaging unit 145B have different phases in the rotation direction. In addition, φ is 90° in this example. Further, both the radiation detectors 21A and 21B are disposed at the offset positions illustrated in FIG. 9.

A central axis RCAA of a flux of radiation RA emitted from the radiation source 20A perpendicularly intersects a center point CSA of the detection surface 58 of the radiation detector 21A. Further, a central axis RCAB of a flux of radiation RB emitted from the radiation source 20B perpendicularly intersects a center point CSB of the detection surface 58 of the radiation detector 21B.

The radiation source 20A is attached to the frame 18 by an attachment 60A. Similarly, the radiation detector 21A is attached to the frame 18 by an attachment 61A. Further, the radiation source 20B is attached to the frame 18 by an attachment 60B, and the radiation detector 21B is attached to the frame 18 by an attachment 61B. Therefore, the imaging unit 145A and the imaging unit 145B are rotated together in the same rotation direction by the rotation mechanism 45 while maintaining the positional relationship therebetween.

Figure 34:
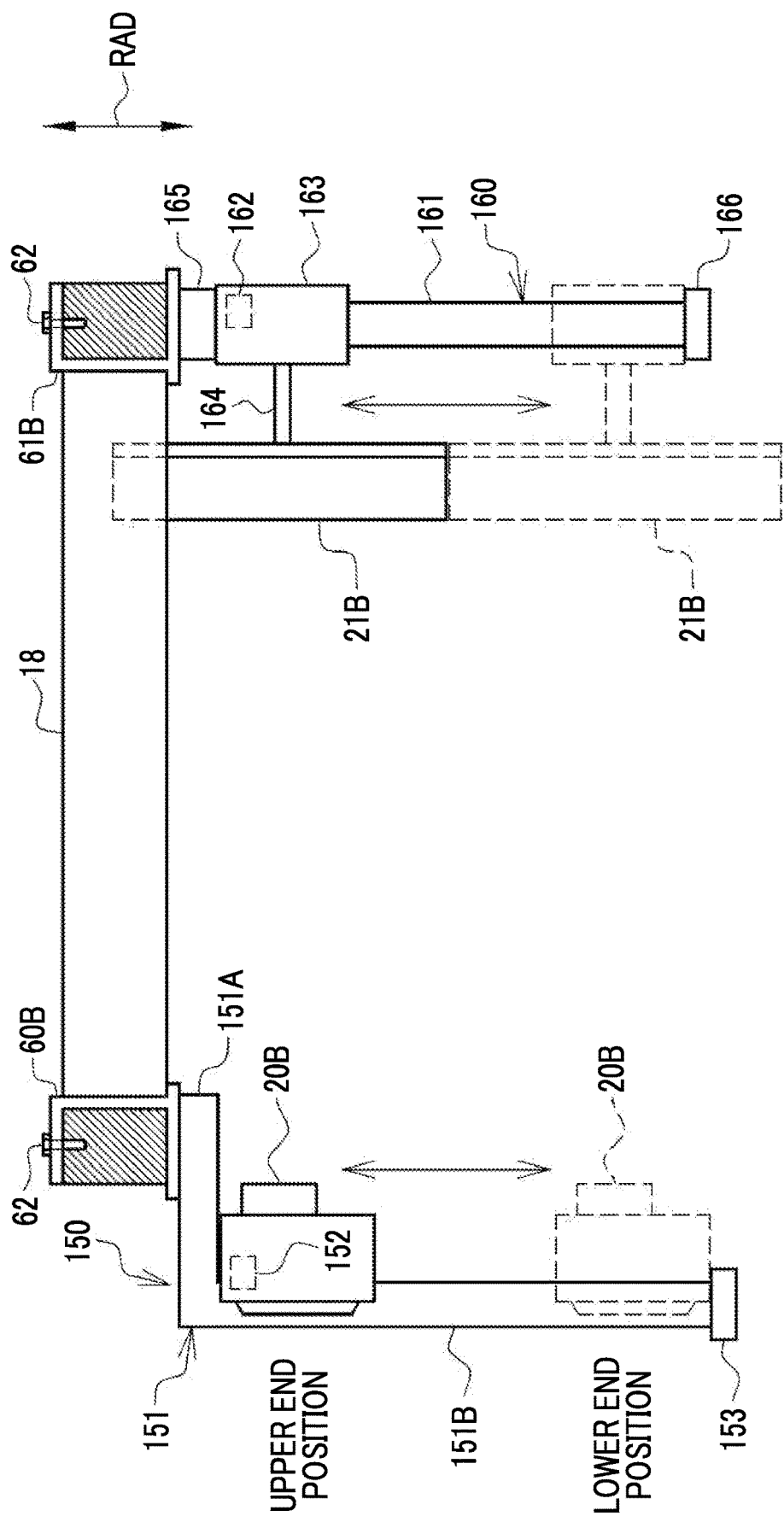
FIG. 34 is a diagram illustrating a radiation source elevating mechanism and a detector elevating mechanism.

For example, as illustrated in FIG. 34, the radiation source 20B is raised and lowered in the rotation axis direction RAD by a radiation source elevating mechanism 150. The radiation source elevating mechanism 150 is composed of, for example, a guide rail 151 and a radiation source elevating motor 152. The guide rail 151 is composed of a first portion 151A that extends from the attachment 60B to the outside of the frame 18 and a second portion 151B that is bent at a right angle from the first portion 151A and extends downward along the rotation axis direction RAD. The second portion 151B has a length capable of covering the half body of a general adult male. Here, the "length capable of covering the half body of the general adult male" is, for example, a length of about 100 cm in a case in which 200 cm is considered as the maximum height although there is a race or individual difference. This setting of the length of the second portion 151B to the "length capable of covering the half body of the general adult male" makes it possible to perform imaging and diagnosis without omitting the entire half body. It is possible to reduce a concern that re-imaging will be required due to the omission of imaging, which causes an increase in imaging time and an increase in the radiation exposure of the subject S. In consideration of a case in which the whole body of the subject S is imaged instead of the half body, the length of the second portion 151B may be set to be greater than about 100 cm. In addition, in FIG. 34, the radiation source 20A and the radiation detector 21A are not illustrated in order to avoid complication.

The radiation source 20B is attached to the second portion 151B. The raising of the radiation source 20B is regulated by the first portion 151A. In addition, a stopper 153 is provided at a lower end of the second portion 151B. The lowering of the radiation source 20B is regulated by the stopper 153. The radiation source 20B can be raised and lowered between an upper end position determined by the first portion 151A and a lower end position determined by the stopper 153.

The radiation source elevating motor 152 is rotationally driven to move the radiation source 20B along the second portion 151B. The height position of the radiation source 20B is determined from the rotation direction and rotation speed of the radiation source elevating motor 152.

The radiation detector 21B is raised and lowered in the rotation axis direction RAD by a detector elevating mechanism 160. The detector elevating mechanism 160 is composed of, for example, a guide rail 161 and a detector elevating motor 162. The guide rail 161 extends straight downward from the attachment 61B along the rotation axis direction RAD. The guide rail 161 has a length capable of covering the half body of the general adult male, similarly to the second portion 151B of the guide rail 151.

An elevating box 163 is attached to the guide rail 161. The detector elevating motor 162 is provided in the elevating box 163. The radiation detector 21B is attached to the elevating box 163 through an arm 164. The arm 164 is an elongated rod that extends from a central portion of the elevating box 163 to the inside of the frame 18.

Stoppers 165 and 166 are provided at upper and lower ends of the guide rail 161, respectively. The raising of the radiation detector 21B is regulated by the stopper 165, and the lowering of the radiation detector 21B is regulated by the stopper 166. The radiation detector 21B can be raised and lowered between an upper end position determined by the stopper 165 and a lower end position determined by the stopper 166. The upper end position and the lower end position of the radiation detector 21B correspond to the upper end position and the lower end position of the radiation source 20B, respectively.

The detector elevating motor 162 is rotationally driven in operative association with the radiation source elevating motor 152 to move the elevating box 163 and thus the radiation detector 21B along the guide rail 161. The height position of the radiation detector 21B is determined from the rotation direction and rotation speed of the detector elevating motor 162.

The radiation source elevating mechanism 150 and the detector elevating mechanism 160 are not provided in the radiation source 20A and the radiation detector 21A which are not illustrated in FIG. 34. Therefore, the radiation source 20A and the radiation detector 21A are not raised and lowered in the rotation axis direction RAD. The height positions of the radiation source 20A and the radiation detector 21A are fixed to the upper end positions (see FIGS. 35 and 36).

While the height positions of the radiation source 20A and the radiation detector 21A are fixed to the upper end positions, the height positions of the radiation source 20B and the radiation detector 21B are changed by the radiation source elevating mechanism 150 and the detector elevating mechanism 160, respectively. That is, an interval between the imaging unit 145A and the imaging unit 145B in the rotation axis direction RAD changes. Therefore, in the second embodiment, it is possible to perform imaging with a relatively large interval between the imaging unit 145A and the imaging unit 145B in the rotation axis direction RAD or to perform imaging with a relatively small interval between the imaging unit 145A and the imaging unit 145B in the rotation axis direction RAD. The radiation source elevating mechanism 150 and the detector elevating mechanism 160 are examples of a "displacement mechanism" according to the technology of the present disclosure.

Figure 35:
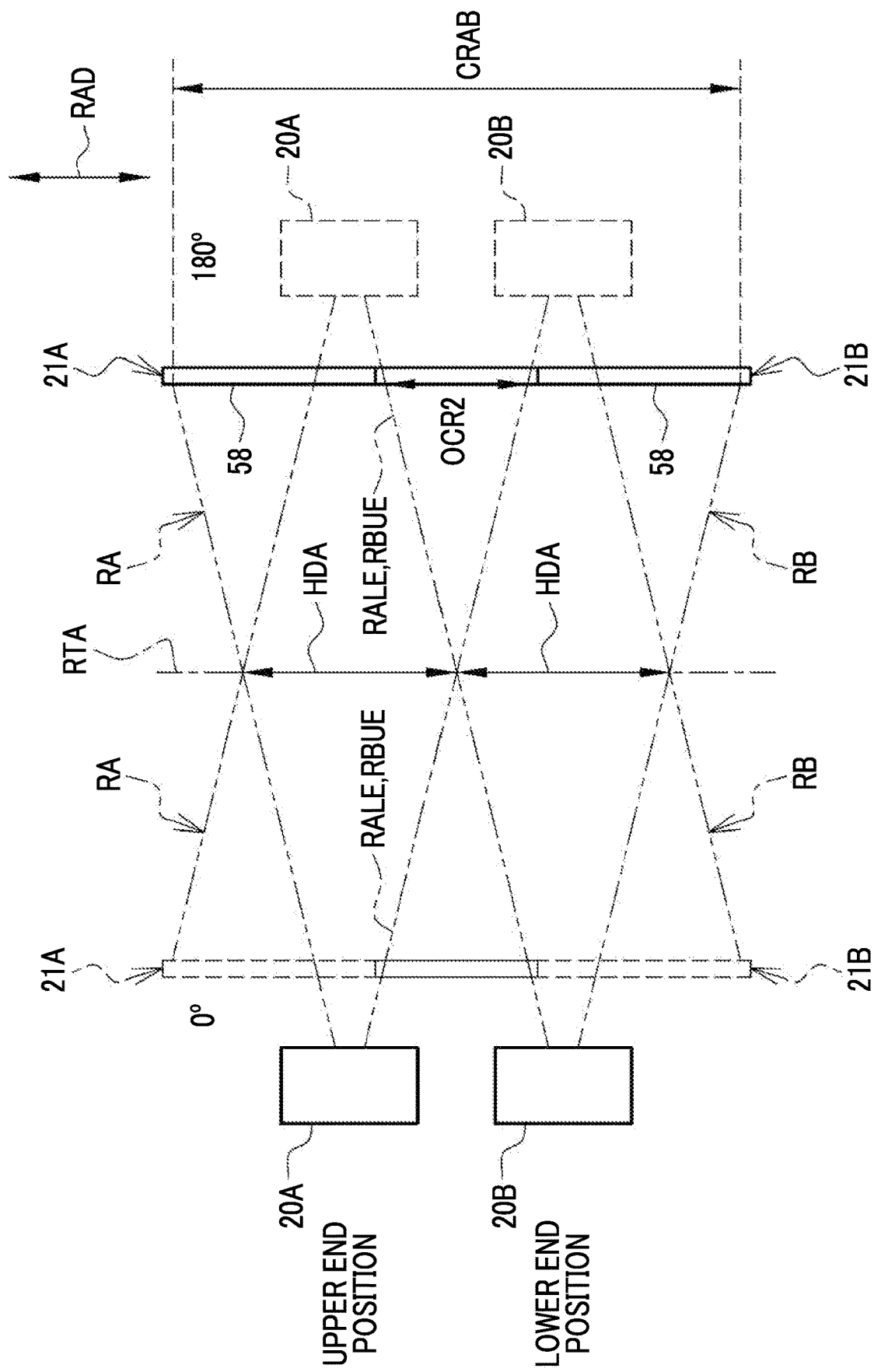
FIG. 35 is a diagram illustrating a flux of radiation in a case in which one imaging unit is located at an upper end position and the other imaging unit is located at a lower end position.

For example, as illustrated in FIG. 35, in a case in which the radiation source 20B and the radiation detector 21B are located at the lower end positions, a lower end RALE of the flux of the radiation RA is matched with an upper end RBUE of the flux of the radiation RB. In other words, the upper end position and the lower end position in this example are positions where the lower end RALE of the flux of the radiation RA is matched with the upper end RBUE of the flux of the second radiation R2. In this case, a combined imaging range CRAB of the imaging unit 145A and the imaging unit 145B is a range having a width that is about 1.5 times the width WA of the detection surface 58 of one radiation detector 21 in the rotation axis direction RAD. That is, the imaging range CRAB is a range that exceeds the width WA.

The imaging ranges CRAB of the imaging unit 145A and the imaging unit 145B partially overlap as represented by letters OCR2. The imaging control unit 112 disposes the imaging unit 145A and the imaging unit 145B at the positions where a second overlapping imaging range OCR2 can be secured. That is, the imaging control unit 112 sets the interval between the imaging unit 145A and the imaging unit 145B in the rotation axis direction RAD such that the second overlapping imaging range OCR2 occurs between projection images 135AA and 135BB (see FIG. 37) obtained by the imaging unit 145A and the imaging unit 145B. In addition, the second overlapping imaging range OCR2 in the case illustrated in FIG. 35 is, for example, 10 mm to 30 mm, like the first overlapping imaging range OCR1 illustrated in FIG. 17.

Figure 36:
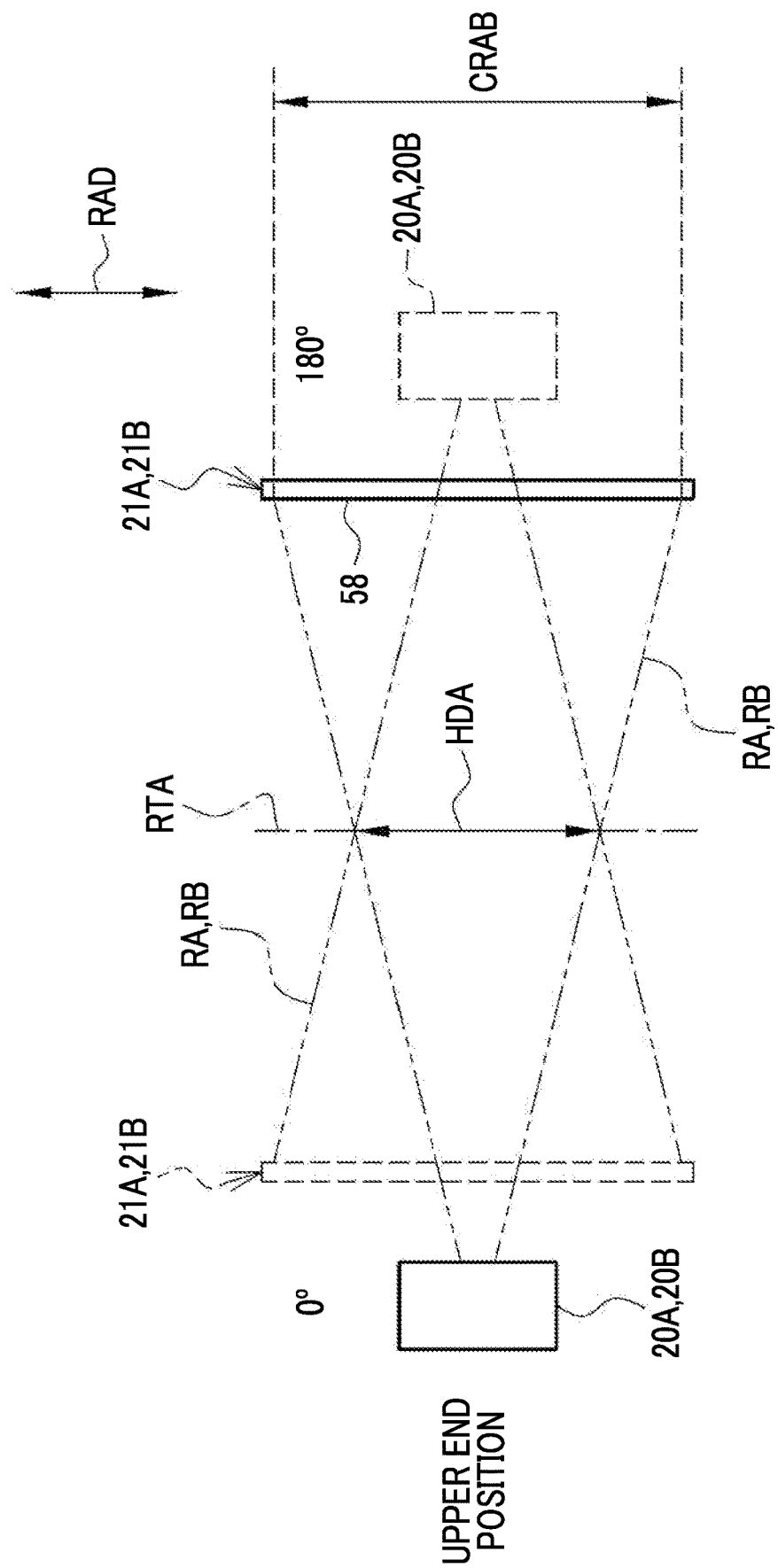
FIG. 36 is a diagram illustrating a flux of radiation in a case in which both of the two imaging units are located at the upper end position.

For example, as illustrated in FIG. 36, in a case in which the radiation source 20B and the radiation detector 21B are located at the upper end positions, the flux of the radiation RA is matched with the flux of the radiation RB. In this case, the imaging range CRAB is a range that is matched with the width WA of the detection surface 58 of one radiation detector 21 in the rotation axis direction RAD. That is, the imaging range CRAB is a range within the width WA.

The aspect illustrated in FIG. 35 is an example of the imaging in which the interval between the imaging unit 145A and the imaging unit 145B in the rotation axis direction RAD is relatively large. On the other hand, the aspect illustrated in FIG. 36 is an example of the imaging in which the interval between the imaging unit 145A and the imaging unit 145B in the rotation axis direction RAD is relatively small.

In the case of the aspect illustrated in FIG. 35, the radiation sources 20A and 20B emit the radiation RA and the radiation RB at an angular interval of 2.4°, using 0° as the rotation start position and the rotation end position, as in the case illustrated in FIG. 21 in the first embodiment. The radiation detectors 21A and 21B output the projection images 135AA and 135BB at an angular interval of 2.4°. In addition, strictly speaking, the rotation end position is a position that is separated from 0° by the angle θ in the counterclockwise direction CCW.

On the other hand, in the case of the aspect illustrated in FIG. 36, the radiation sources 20A and 20B emit the radiation RA and the radiation RB at an angular interval of 2.4°, using 0° as the rotation start position and 268.8° as the rotation end position. The radiation detectors 21A and 21B output the projection images 135AA and 135BB at an angular interval of 2.4°. In addition, strictly speaking, the rotation end position is a position that is separated from 268.8° by the angle θ in the counterclockwise direction CCW.

In the case of the aspect illustrated in FIG. 36, the height positions of the imaging units 145A and 145B are aligned with the same upper end position. Further, as illustrated in FIG. 32, the radiation source 20A and the radiation source 20B are disposed at positions that are separated by an angle of 90°. Therefore, in a case in which the frame 18 is rotated by about 270°, an angular range of 360° is covered.

In the case of the aspect illustrated in FIG. 36, the imaging unit 145A is in charge of imaging in an angular range of 0° to 268.8°, and the imaging unit 145B is in charge of imaging in an angular range of 90° to 358.8°. That is, the imaging of the entire circumference around the body axis of the subject S is shared by the imaging unit 145A and the imaging unit 145B. The projection images 135 obtained by the imaging unit 145A and the imaging unit 145B in the overlapping angular range, here, an angular range of 90° to 268.8° are discarded without being used for generating the tomographic image 138. In addition, the projection images 135 obtained by the imaging unit 145A and the imaging unit 145B in the overlapping angular range may be used for checking the accuracy of the time when the projection images 135 are captured.

Figure 37:
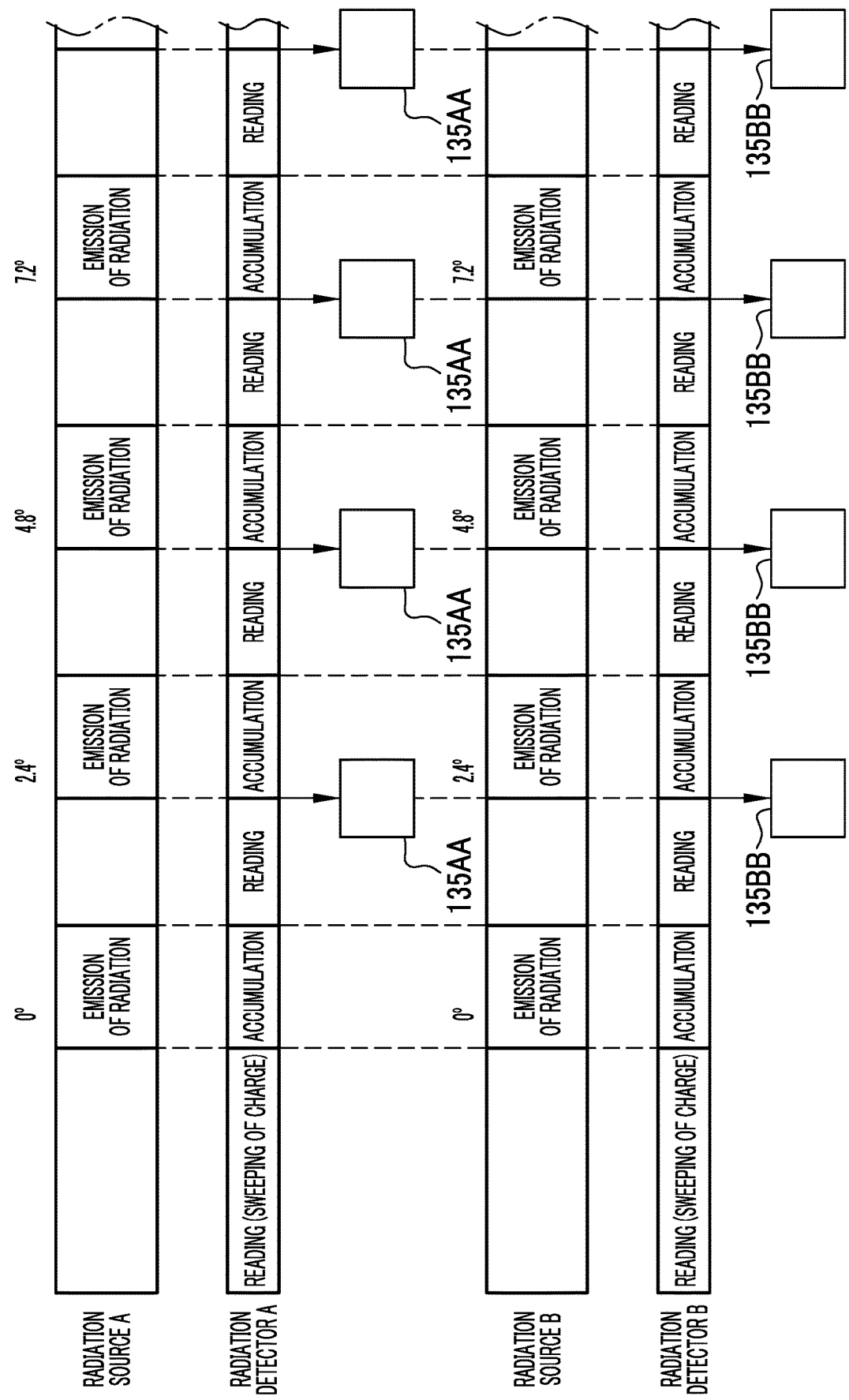
FIG. 37 is a timing chart illustrating the time when the radiation source emits the radiation and the time when the radiation detector reads the projection image in the case illustrated in FIG. 35.

FIG. 37 is an example of a timing chart illustrating the time when the radiation sources 20A and 20B emit the radiation R and the time when the radiation detectors 21A and 21B read the projection images 135 in the second embodiment. In addition, in FIG. 37, the radiation source 20A is referred to as a "radiation source A", the radiation detector 21A is referred to as a "radiation detector A", the radiation source 20B is referred to as a "radiation source B", and the radiation detector 21B is referred to as a "radiation detector B".

As illustrated in FIG. 37, the imaging control unit 112 directs the radiation detectors 21A and 21B to perform the reading operation of sweeping out unnecessary charge before imaging, as in the first embodiment.

After directing the radiation detectors 21A and 21B to perform the reading operation of sweeping out unnecessary charge, the imaging control unit 112 directs the radiation sources 20A and 20B to emit the radiation RA and the radiation RB at the same time. In addition, the imaging control unit 112 directs the radiation detectors 21A and 21B to perform the accumulation operation. Then, the imaging control unit 112 directs the radiation detectors 21A and 21B to perform the reading operation and directs the radiation detectors 21A and 21B to output the projection image 135AA based on the radiation RA and the projection image 135BB based on the radiation RB. The imaging control unit 112 direct the imaging units 145B and 145B to repeatedly perform the emission of the radiation RA and the radiation RB and the output of the projection images 135AA and 135BB at every 2.4°. In addition, the "same time" means the same time including an error which is generally allowed in the technical field to which the technology of the present disclosure belongs and is not contrary to the gist of the technology of the present disclosure, in addition to the exact same time.

Figure 38:
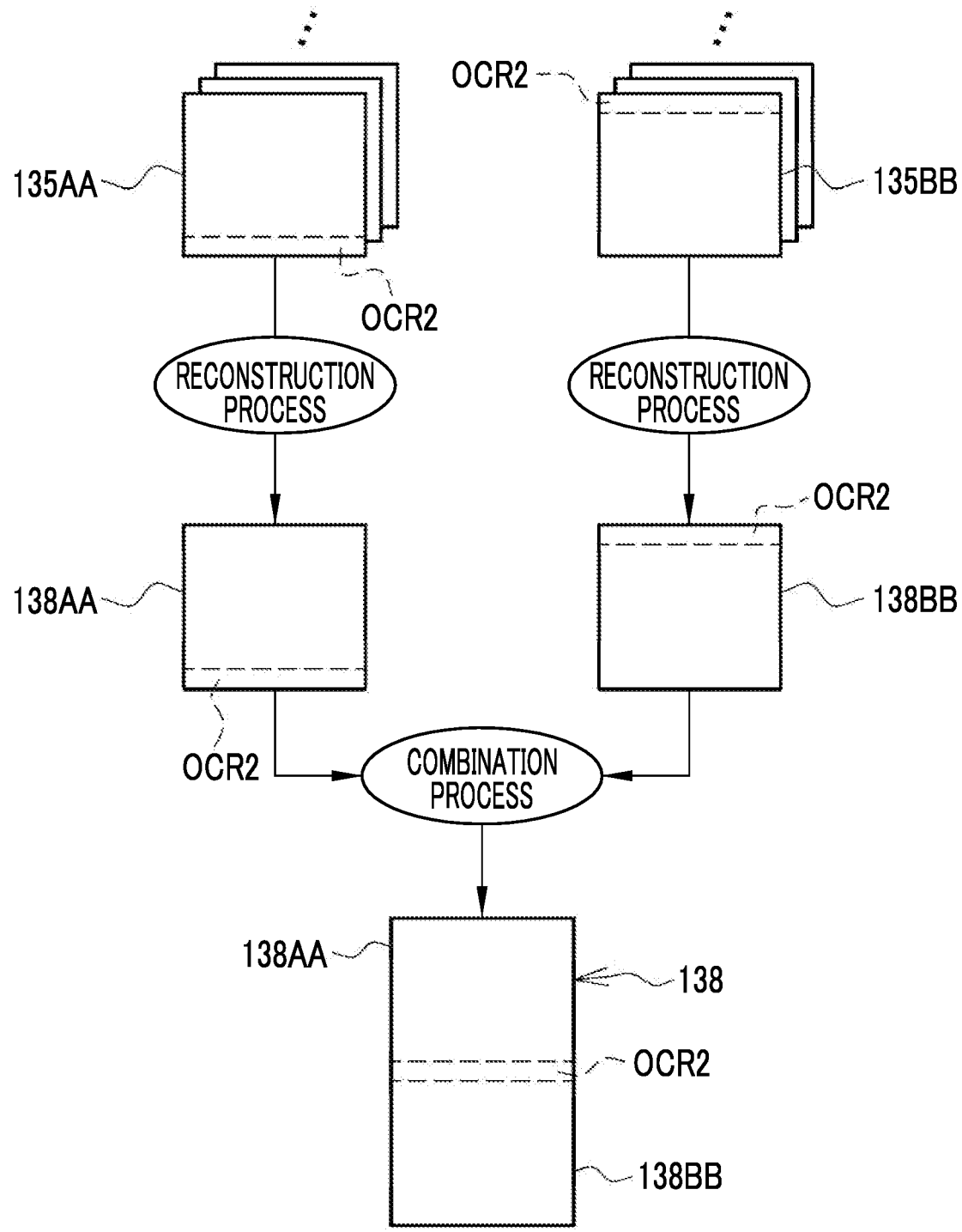
FIG. 38 is a diagram illustrating an outline of a process of an image processing unit according to the second embodiment.

For example, as illustrated in FIG. 38, in the case of the aspect illustrated in FIG. 35, the image processing unit 113 performs the reconstruction process on a plurality of projection images 135AA at the upper end position obtained by the imaging unit 145A to generate the tomographic image 138AA at the upper end position. In addition, the image processing unit 113 performs the reconstruction process on a plurality of projection images 135BB at the lower end position obtained by the imaging unit 145B to generate the tomographic image 138BB at the lower end position. The image processing unit 113 registers the tomographic images 138AA and 138BB on the basis of the second overlapping imaging range OCR2 and combines the tomographic images 138AA and 138BB to generate a final tomographic image 138 for diagnosis. In this case, similarly to the combination of the tomographic images 138A and 138B, a process may be performed using the sigmoid function such that the tomographic images 138AA and 138BB are smoothly connected in the second overlapping imaging range OCR2.

Figure 39:
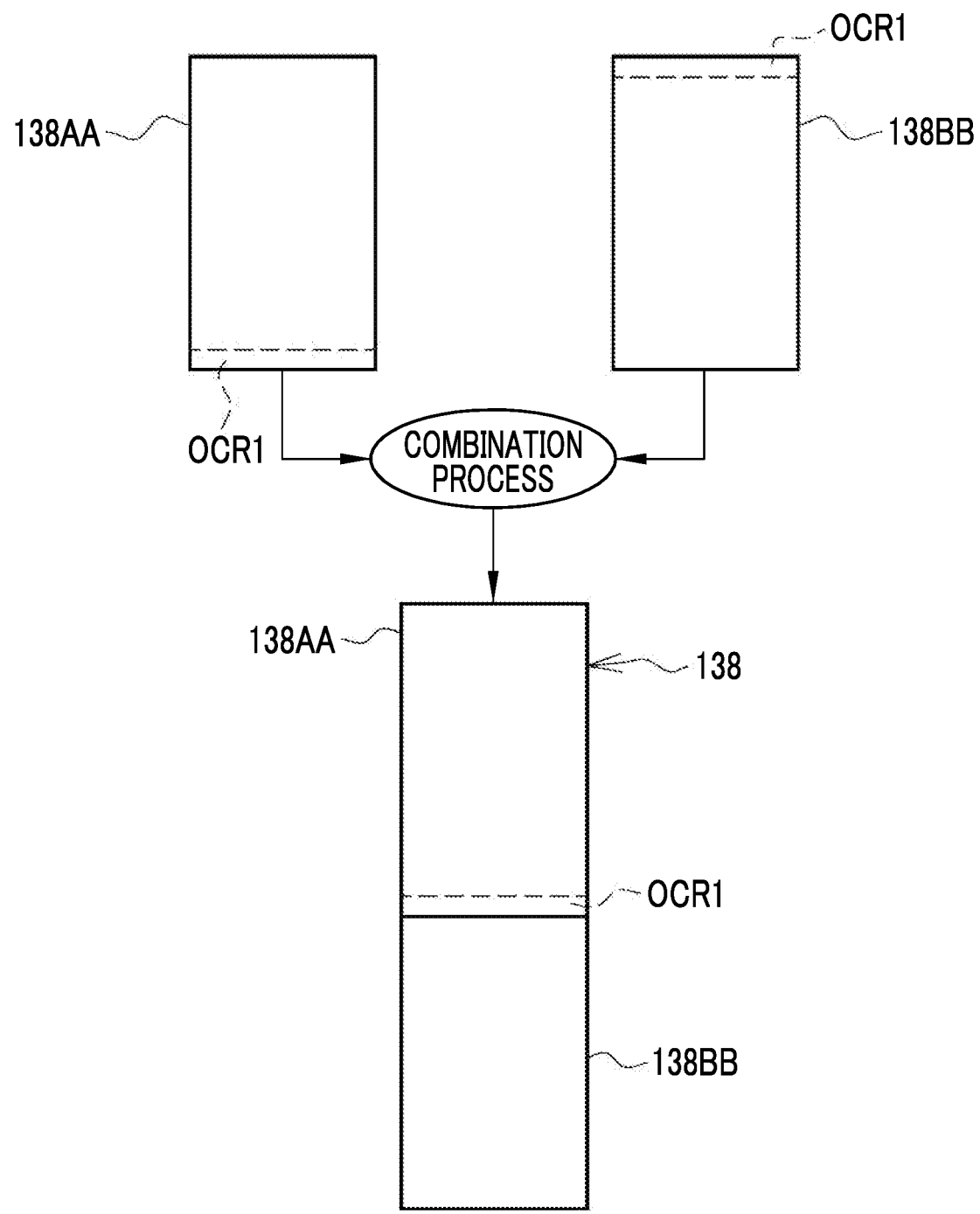
FIG. 39 is a diagram illustrating the outline of the process of the image processing unit according to the second embodiment.

In a case in which two or more height positions are set as the height positions of the radiation source 20 and the radiation detector 21 during imaging by the imaging control unit 112, the image processing unit 113 further performs a process illustrated in FIG. 39. FIG. 39 illustrates a case in which two height positions A and B are set by the imaging control unit 112. In this case, the image processing unit 113 registers tomographic images 138AAA and 138BBB on the basis of the first overlapping imaging range OCR1 and combines the tomographic images 138AAA and 138BBB to generate a final tomographic image 138 for diagnosis. Here, the tomographic image 138AAA is a tomographic image 138 generated on the basis of the projection images 135AA and 135BB obtained by the imaging unit 145A and the imaging unit 145B at the height position A in the procedure illustrated in FIG. 38. Further, the tomographic image 138BBB is a tomographic image 138 generated on the basis of the projection images 135AA and 135BB obtained by the imaging unit 145A and the imaging unit 145B at the height position B in the procedure also illustrated in FIG. 38.

In the case of the aspect illustrated in FIG. 36, the image processing unit 113 generate the final tomographic image 138 for diagnosis, using the projection images 135AA obtained by the imaging unit 145A in an angular range of 0° to 268.8° and the projection images 135BB obtained by the imaging unit 145B in an angular range of 90° to 358.8°.

As described above, in the second embodiment, the imaging unit 145A that is composed of a set of the radiation source 20A and the radiation detector 21A and the imaging unit 145B that is composed of a set of the radiation source 20B and the radiation detector 21B are provided. The imaging unit 145A and the imaging unit 145B have different phases in the rotation direction. Therefore, as in the aspect illustrated in FIG. 36, the imaging of the entire circumference around the body axis of the subject S can be completed with a rotation of less than 360°. Therefore, imaging can be completed in a shorter time than that in the first embodiment in which one set of the radiation source 20 and the radiation detector 21 is provided.

In addition, in the second embodiment, as illustrated in FIG. 34, the radiation source elevating mechanism 150 and the detector elevating mechanism 160 are provided as the displacement mechanism for changing the interval between the imaging units 145A and 145B in the rotation axis direction RAD. Therefore, it is possible to smoothly perform the imaging illustrated in FIG. 35 in which the interval between the imaging units 145A and 145B in the rotation axis direction RAD is relatively large and the imaging illustrated in FIG. 36 in which the interval is relatively small with one CT apparatus 10. The burden on the subject S is reduced as compared to a case in which the imaging in which the interval is relatively large and the imaging in which the interval is relatively small are performed by different apparatuses. In addition, it is possible to secure the reproducibility of the positioning of the subject S in the imaging in which the interval is relatively large and the imaging in which the interval is relatively small.

Imaging is performed with a relatively large interval between the imaging units 145A and 145B in the rotation axis direction RAD, which makes it possible to widen the imaging range at one height position, as compared to the configuration according to the first embodiment in which only one set of the radiation source 20 and the radiation detector 21 is provided. Therefore, for example, even in the imaging range CR in which the conventional scanning needs to be performed at four height positions in the configuration according to the first embodiment, the conventional scanning at two height positions that is half of the four height positions is sufficient in the configuration according to the second embodiment. Therefore, it is possible to reduce the number of movements of the radiation source 20 and the radiation detector 21 and the number of times the conventional scanning is performed. As a result, it is possible to complete imaging in a short time. The burden on the subject S is reduced, and the concern that the quality of the tomographic image 138 will deteriorate due to the body movement of the subject S is also reduced.

In addition, as illustrated in FIGS. 35 and 37, the imaging control unit 112 rotates the imaging units 145A and 145B in parallel to image the imaging range CRAB that exceeds the width WA of the detection surface 58 for the radiation R in the radiation detector 21. In this case, the imaging control unit 112 sets the interval between the imaging units 145A and 145B in the rotation axis direction RAD such that the second overlapping imaging range OCR2 occurs between the projection image 135AA and the projection image 135BB obtained by the imaging units 145A and 145B. As illustrated in FIG. 38, the image processing unit 113 performs the reconstruction process on the projection images 135AA and 135BB obtained from each of the imaging units 145A and 145B to generate the tomographic images 138AA and 138BB for each of the imaging units 145A and 145B. The image processing unit 113 registers the tomographic images 138AA and 138BB on the basis of the second overlapping imaging range OCR2 to combine the tomographic images 138AA and 138BB. Therefore, it is possible to capture the tomographic image 138 covering the imaging range CRAB that exceeds the width WA of the detection surface 58 for the radiation R in the radiation detector 21. In addition, after the projection images 135AA and 135BB are registered on the basis of the second overlapping imaging range OCR2 and are combined, the reconstruction process may be performed on the combined projection image 135 to generate the tomographic image 138.

Figure 40:
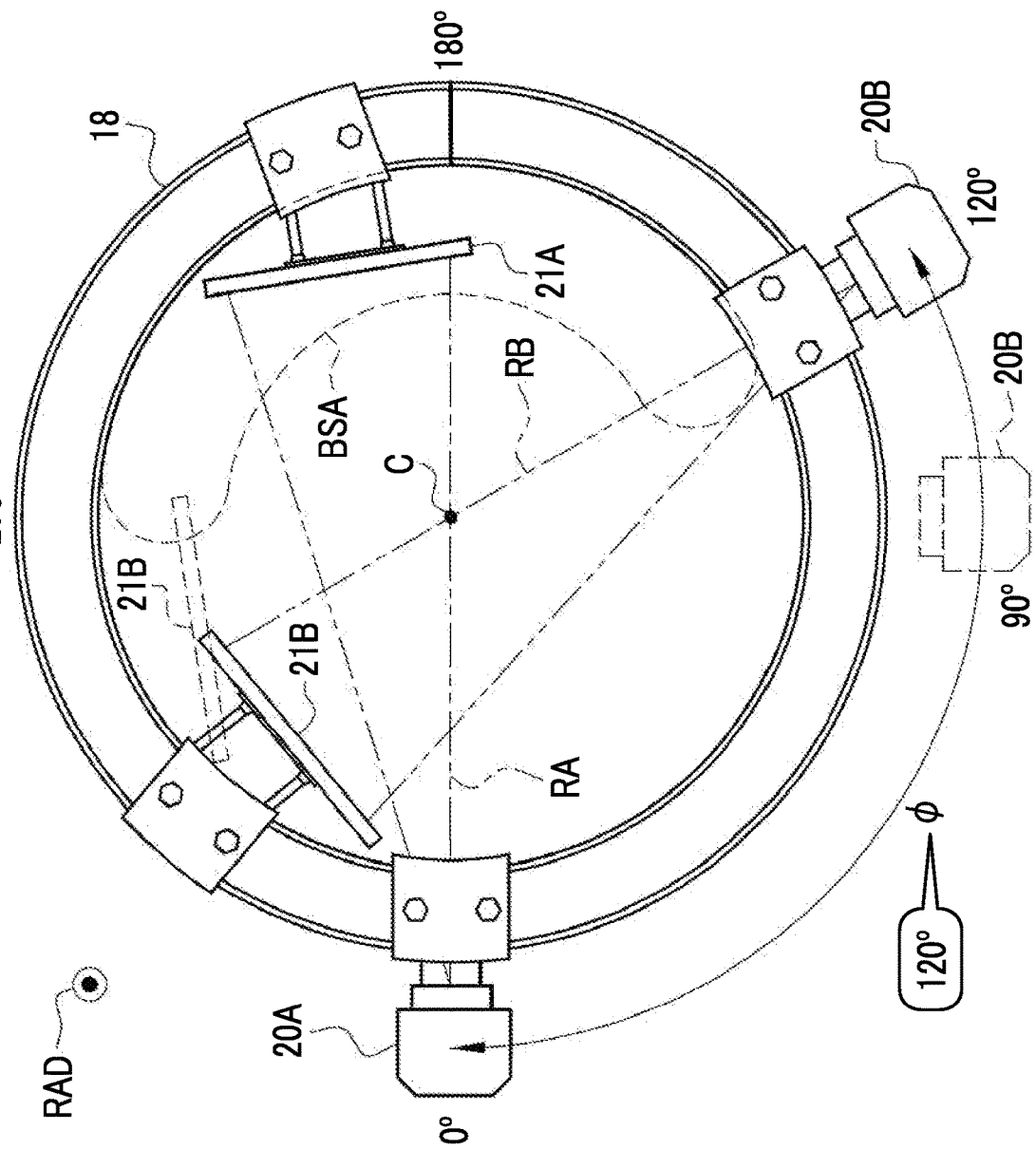
FIG. 40 is a diagram illustrating an example in which the radiation sources are disposed at positions that are separated by 120°.

In addition, the angle φ between the positions where the radiation sources 20A and 20B are disposed is not limited to 90° given as an example. For example, as illustrated in FIG. 40, φ may be set to 120°. Assuming that φ is 120°, the rotation angle of the frame 18 in the aspect illustrated in FIG. 36 can be set to about 240°, and it is possible to complete imaging in a shorter time.

Further, in a case in which φ is set to 120°, the radiation detector 21B can be disposed at a position avoiding a region BSA that is particularly strongly affected by backscattered rays of the radiation RA. Specifically, in a case in which the angle φ is 90°, an end of the radiation detector 21B enters the region BSA as represented by a broken line. Then, in this example, since the radiation RA and the radiation RB are emitted at the same time, components caused by the backscattered rays of the radiation RA are included as noise in the projection image 135BB obtained by the radiation detector 21B. However, in a case in which φ is set to 120°, it is possible to reduce the concern that the components caused by the backscattered rays of the radiation RA will be included as noise in the projection image 135BB obtained by the radiation detector 21B. The backscattered rays referred to here are scattered rays caused by the disposition of the radiation source 20 and the radiation detector 21. However, since the radiation detector 21B is disposed at a position avoiding the region BSA, it is also possible to reduce the influence of scattered rays caused by the subject S.

In addition, for example, a grid may be provided in front of the radiation detector 21 to reduce the influence of the scattered rays. Alternatively, for example, the technique described in JP6006193B that achieves the same image quality improvement effect as that in a case in which a grid is used with image processing, without actually using the grid may be applied.

There is an upper limit to the angle φ. For example, as in a case illustrated in FIG. 41 in which the angle φ is 125°, the end of the radiation detector 21B should not be included in the projection image 135AA obtained by the imaging unit 145A. Therefore, it is preferable that the angle φ is equal to or greater than 90° and is equal to or less than a limit angle at which the end of the radiation detector 21B is included in the projection image 135AA obtained by the imaging unit 145A.

Figure 41:
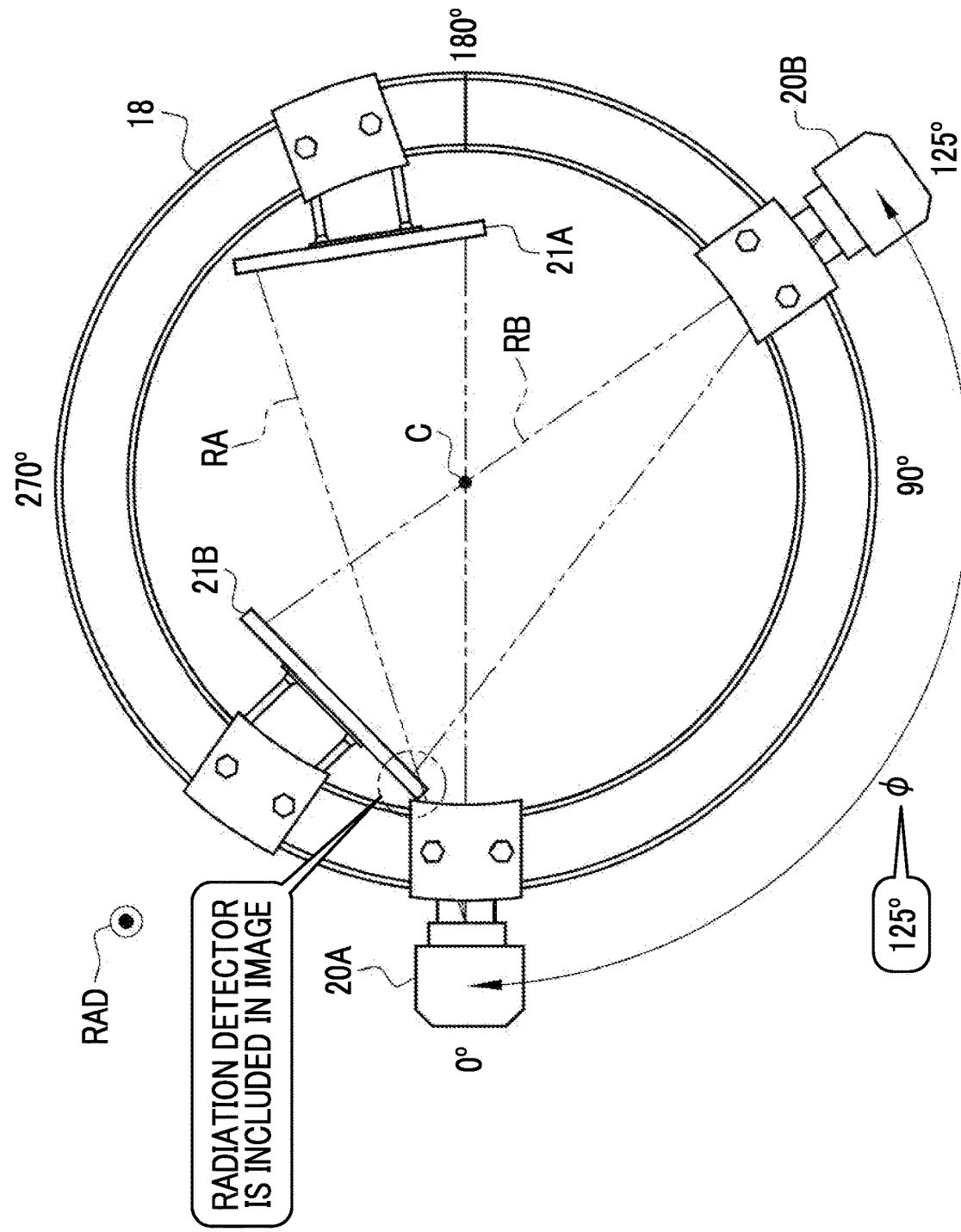
FIG. 41 is a diagram illustrating an example in which the radiation sources are disposed at positions that are separated by 125°.

Further, in a case in which the size of the radiation detector 21 is reduced, the inclusion of the radiation detector 21 in the projection image 135 as illustrated in FIG. 41 is avoided even though the angle φ is increased. However, as the size of the radiation detector 21 is reduced, the scan field of view sFOV is narrowed. In addition, the angle φ can be increased by increasing the rotation radius of the radiation detector 21. However, since the radiation detector 21 is separated from the subject S, the scan field of view sFOV is also reduced in this case. Therefore, it is preferable that the ratio of the rotation radius of the radiation source 20 to the rotation radius of the radiation detector 21 is set to about 2:1 (for example, the rotation radius of the radiation source 20 is 800 mm, and the rotation radius of the radiation detector 21 is 400 mm) to secure a relatively wide scan field of view sFOV.

Alternatively, in a case in which the size of the frame 18 increases to increase the SID, it is possible to increase the angle φ without separating the radiation detector 21 from the subject S. However, it is necessary to prepare a high-output rotary motor 47 in accordance with the frame 18 that has become larger and heavier, or it is necessary to thicken the column 14 to increase rigidity. In addition, it is necessary to increase the power of the radiation R as the SID is longer. From the above, it is also preferable that the angle φ is about 90° to 120° as in this example.

The imaging unit 145A is fixed at the upper end position. However, the present disclosure is not limited thereto. The radiation source elevating mechanism and the detector elevating mechanism may also be provided in the imaging unit 145A to raise and lower the imaging unit 145A in the rotation axis direction RAD.

The number of imaging units is not limited to two given as an example. For example, three imaging units may be provided at intervals of 120°. In a case in which the number of imaging units increases, it is possible to further reduce the rotation angle in the case of the aspect illustrated in FIG. 36 in which the height positions of the imaging units are aligned with the same position, and it is possible to complete imaging in a shorter time.

Third Embodiment

Figure 42:
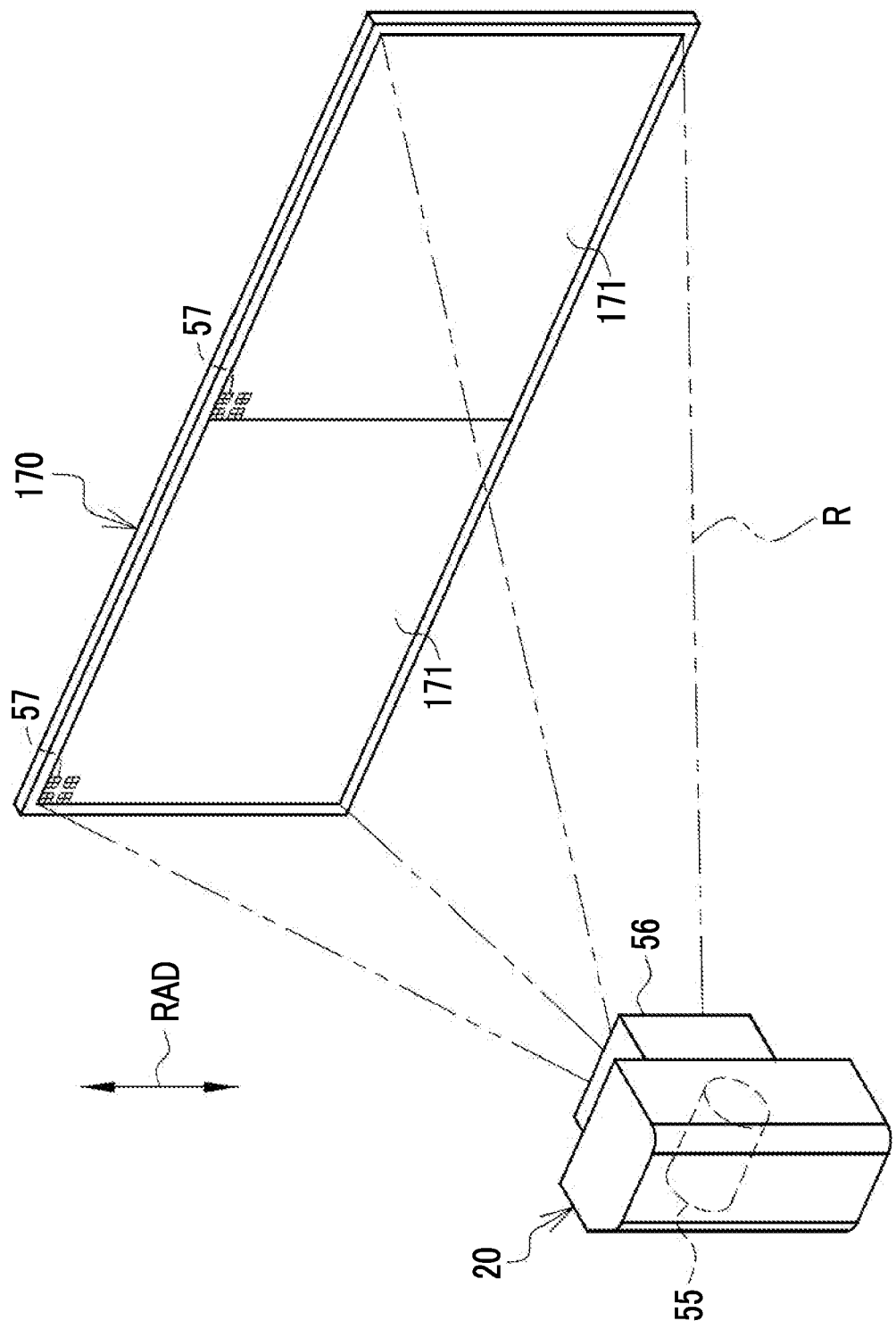
FIG. 42 is a diagram illustrating a radiation detector having a configuration in which a plurality of radiation detection units are arranged.

In a third embodiment, for example, a radiation detector 170 illustrated in FIG. 42 is used. The radiation detector 170 has a configuration in which two detection units 171 for the radiation R are arranged along a direction orthogonal to the rotation axis direction RAD. Here, the detection unit 171 is composed of the above-described scintillator and TFT substrate.

In a case in which the radiation detector 170 is used, the radiation detector 170 is disposed at the reference position facing the radiation source 20. Then, the frame 18 is rotated by 180°+θ, the radiation R is emitted from the radiation source 20 at each preset angle, and the projection image 135 is output from the radiation detector 170. Alternatively, in order to obtain a tomographic image 138 with higher quality, the frame 18 is rotated by 360°+θ, the radiation R is emitted from the radiation source 20 at each preset angle, and the projection image 135 is output from the radiation detector 170.

As described above, in the third embodiment, the radiation detector 170 having the configuration in which a plurality of detection units 171 for the radiation R are arranged along the direction orthogonal to the rotation axis direction RAD is used. Therefore, it is possible to image a wider range in the direction orthogonal to the rotation axis direction RAD at one time. In addition, the radiation detector 170 may be disposed at the offset position.

In a case in which the image processing unit 113 performs the reconstruction process on the projection images 135 to generate the tomographic image 138, a compression sensing method, such as total variation (TV) regularization, may be used. The compression sensing is a method that solves an inverse problem of performing high-accuracy signal restoration from measurement data whose amount is insufficient. Here, the measurement data is the projection image 135, and the data after signal restoration is the tomographic image 138. In addition, here, the case in which the amount of data is insufficient is a case in which the dose of the radiation R is low and/or a case in which the number of projection images 135 is small.

As described above, in a case in which the compression sensing method is used in the reconstruction process, it is possible to reduce the dose of the radiation R or to reduce the number of projection images 135 as compared to a case in which the compression sensing method is not used. Therefore, it is possible to reduce the exposure of radiation to subject S and to complete imaging in a shorter time.

A mechanism that moves the radiation source 20 and the radiation detector 21 along a circumferential direction of the frame 18 may be provided to change the positions where the radiation source 20 and the radiation detector 21 are disposed. This configuration makes it possible to retract the radiation source 20 and the radiation detector 21 that interfere with the guidance of the subject S into the apparatus main body 11 to positions that do not interfere with the guidance.

In the first embodiment, the designation of the imaging range CR is received by the operation of moving the bars 124A and 124B displayed to be superimposed on the camera image 121. However, the present disclosure is not limited thereto. Before main imaging using the conventional scanning, scout imaging with a low dose of the radiation R may be performed, the projection image 135 obtained by the scout imaging may be displayed on, for example, the display 98, and the designation of the imaging range CR may be received on the projection image 135. In a case in which the radiation detector 21 is disposed at the offset position as illustrated in FIG. 9, the scout imaging is performed at two rotation positions of, for example, 90° and 270°, and the designation of the imaging range CR is received on a composite image of two projection images 135 obtained by the scout imaging. In a case in which the radiation detector 21 is disposed at the reference position, the scout imaging is performed only at one rotation position of, for example, 90°, and the designation of the imaging range CR is received on one projection image 135 obtained by the scout imaging. In addition, an indicator, such as a laser, that emits light indicating the upper and lower ends of the imaging range CR may be provided, and the designation of the imaging range CR may be received by the operation of moving the indicator.

The number of columns 14 may be four or five. Further, a stepping motor may be used as the rotary motor 47, and the rotation position of the frame 18 may be determined by the number of pulses applied to the rotary motor 47. Furthermore, the frame 18 is not limited to the circular ring and may be a polygonal ring.

The hardware configuration of the computer constituting the control device 12 can be modified in various ways. For example, the control device 12 may be configured by a plurality of computers separated as hardware in order to improve processing capacity and reliability. For example, the functions of the receiving unit 110, the RW control unit 111, and the display control unit 114 and the functions of the imaging control unit 112 and the image processing unit 113 are distributed to two computers. In this case, the two computers constitute the control device 12.

As described above, the hardware configuration of the computer of the control device 12 can be appropriately changed according to required performances, such as processing capacity, safety, and reliability. Further, not only the hardware but also an application program, such as the operation program 105, may be duplicated or may be dispersively stored in a plurality of storages in order to secure safety and reliability.

In each of the above-described embodiments, for example, the following various processors can be used as the hardware structure of processing units performing various processes, such as the receiving unit 110, the RW control unit 111, the imaging control unit 112, the image processing unit 113, and the display control unit 114. The various processors include, for example, the CPU 97 which is a general-purpose processor executing software (operation program 105) to function as various processing units, a programmable logic device (PLD), such as a field programmable gate array (FPGA), which is a processor whose circuit configuration can be changed after manufacture, and/or a dedicated electric circuit, such as an application specific integrated circuit (ASIC), which is a processor having a dedicated circuit configuration designed to perform a specific process.

One processing unit may be configured by one of the various processors or by a combination of two or more processors of the same type or different types (for example, a combination of a plurality of FPGAs and/or a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As described above, various processing units are configured by using one or more of the various processors as a hardware structure.

In addition, specifically, an electric circuit (circuitry) obtained by combining circuit elements, such as semiconductor elements, can be used as the hardware structure of the various processors.

It is possible to understand the techniques described in the following supplementary notes from the above description.

Supplementary Note 1

A computed tomography apparatus comprising:
a radiation source that emits radiation having a quadrangular pyramid shape to a subject positioned in either a standing posture or a sitting posture;
a radiation detector in which a plurality of pixels detecting the radiation transmitted through the subject are two-dimensionally arranged and which outputs a projection image of the subject;
a rotation mechanism that rotates the radiation source and the radiation detector around a body axis of the subject;
an elevating mechanism that raises and lowers the radiation source and the radiation detector along a rotation axis direction; and
a processor that controls operations of the radiation source, the radiation detector, the rotation mechanism, and the elevating mechanism,
wherein the processor performs conventional scanning, which directs the rotation mechanism to rotate the radiation source and the radiation detector without changing a positional relationship between the subject, and the radiation source and the radiation detector in the rotation axis direction, directs the radiation source to emit the radiation whenever the radiation source and the radiation detector are rotated by a preset angle, and directs the radiation detector to output the projection image, at a plurality of height positions along the rotation axis direction and generates a tomographic image on the basis of the projection images obtained at the plurality of height positions.

Supplementary Note 2

The computed tomography apparatus according to Supplementary Note 1,
wherein the processor sets the height positions such that a first overlapping imaging range occurs between the projection images obtained at the height positions adjacent to each other, generates a plurality of the tomographic images at each of the plurality of height positions from the projection images obtained at the plurality of height positions, and registers the plurality of tomographic images on the basis of the first overlapping imaging range to combine the plurality of tomographic images.

Supplementary Note 3

The computed tomography apparatus according to Supplementary Note 2,
wherein the processor combines the plurality of tomographic images, selectively using a portion that is closer to a focal axis of the radiation in the first overlapping imaging range.

Supplementary Note 4

The computed tomography apparatus according to any one of Supplementary Notes 1 to 3,
wherein the processor rotates the radiation source and the radiation detector in different directions at the height positions adjacent to each other.

Supplementary Note 5

The computed tomography apparatus according to any one of Supplementary Notes 1 to 4,
wherein the processor receives designation of an imaging range along the rotation axis direction and directs the elevating mechanism to move the radiation source and the radiation detector to the height position corresponding to the designated imaging range.

Supplementary Note 6

The computed tomography apparatus according to Supplementary Note 5,
wherein, in a case in which the designated imaging range is within a width of a detection surface for the radiation in the radiation detector, the processor performs the conventional scanning only once at one height position corresponding to the designated imaging range.

Supplementary Note 7

The computed tomography apparatus according to Supplementary Note 5 or 6, further comprising:
a camera that images the subject,
wherein the processor performs control to display bars indicating upper and lower ends of the imaging range to be superimposed on a camera image obtained from the camera and receives the imaging range designated by an operation of moving the bars.

Supplementary Note 8

The computed tomography apparatus according to any one of Supplementary Notes 5 to 7,
wherein the processor performs control to output a warning in a case in which an upper end of the designated imaging range exceeds an upper limit and in a case in which a lower end of the designated imaging range exceeds a lower limit.

Supplementary Note 9

The computed tomography apparatus according to any one of Supplementary Notes 1 to 8, further comprising:
a plurality of imaging units each of which is composed of a set of the radiation source and the radiation detector and which have different phases in a rotation direction.

Supplementary Note 10

The computed tomography apparatus according to Supplementary Note 9, further comprising:
a displacement mechanism that changes an interval between the plurality of imaging units in the rotation axis direction.

Supplementary Note 11

The computed tomography apparatus according to Supplementary Note 10,
wherein the processor sets the interval such that a second overlapping imaging range occurs between the projection images obtained by the imaging units adjacent to each other in a case in which the plurality of imaging units are rotated in parallel to image an imaging range that exceeds the width of the detection surface for the radiation in the radiation detector, generates a plurality of the tomographic images for each of the plurality of imaging units on the basis of the projection images obtained from each of the plurality of imaging units, and registers the plurality of tomographic images on the basis of the second overlapping imaging range to combine the plurality of tomographic images.

In the technology of the present disclosure, the above-described various embodiments and/or various modification examples may be combined with each other as appropriate. In addition, the present disclosure is not limited to the above-described embodiments, and various configurations can be used without departing from the gist of the present disclosure. Furthermore, the technology of the present disclosure extends to a storage medium that non-temporarily stores a program, in addition to the program.

The above descriptions and illustrations are detailed descriptions of portions related to the technology of the present disclosure and are merely examples of the technology of the present disclosure. For example, the above description of the configurations, functions, operations, and effects is the description of examples of the configurations, functions, operations, and effects of portions related to the technology of the present disclosure. Therefore, unnecessary portions may be deleted or new elements may be added or replaced in the above descriptions and illustrations without departing from the gist of the technology of the present disclosure. In addition, in the above descriptions and illustrations, the description of, for example, common technical knowledge that does not need to be particularly described to enable the implementation of the technology of the present disclosure is omitted in order to avoid confusion and facilitate the understanding of portions related to the technology of the present disclosure.

In the specification, "A and/or B" is synonymous with "at least one of A or B". That is, "A and/or B" means only A, only B, or a combination of A and B. Further, in the specification, the same concept as "A and/or B" is applied to a case in which the connection of three or more matters is expressed by "and/or".

All of the documents, the patent applications, and the technical standards described in the specification are incorporated by reference herein to the same extent as each individual document, each patent application, and each technical standard are specifically and individually stated to be incorporated by reference.

What is claimed is:

1. A computed tomography apparatus comprising:
a plurality of imaging units, each of which is composed of:
a radiation source that emits radiation having a quadrangular pyramid shape to a subject positioned in either a standing posture or a sitting posture, and
a radiation detector in which a plurality of pixels detecting the radiation transmitted through the subject are two-dimensionally arranged and which outputs a projection image of the subject;
a rotation mechanism that rotates each radiation source and each radiation detector around a body axis of the subject;
an elevating mechanism that raises and lowers each radiation source and each radiation detector along a rotation axis direction; and
a processor that controls operations of the radiation source, the radiation detector, the rotation mechanism, and the elevating mechanism,
wherein the processor performs conventional scanning, which directs the rotation mechanism to rotate the radiation source and the radiation detector without changing a positional relationship between the subject, and the radiation source and the radiation detector in the rotation axis direction, directs the radiation source to emit the radiation whenever the radiation source and the radiation detector are rotated by a preset angle, and directs the radiation detector to output the projection image, at a plurality of height positions along the rotation axis direction and generates a tomographic image on the basis of the projection images obtained at the plurality of height positions, and
wherein, in a case in which an imaging range that exceeds a width of a detection surface for the radiation in the radiation detector is to be imaged by rotating the plurality of imaging units in parallel, the processor sets an interval between the plurality of imaging units in the rotation axis direction such that a second overlapping imaging range occurs between projection images obtained by imaging units adjacent to each other, generates a plurality of tomographic images for each of the plurality of imaging units on the basis of projection images obtained from each of the plurality of imaging units, and registers the plurality of tomographic images on the basis of the second overlapping imaging range to combine the plurality of tomographic images.

2. The computed tomography apparatus according to claim 1,
wherein the processor sets the height positions such that a first overlapping imaging range occurs between the projection images obtained at the height positions adjacent to each other, generates a plurality of the tomographic images at each of the plurality of height positions from the projection images obtained at the plurality of height positions, and registers the plurality of tomographic images on the basis of the first overlapping imaging range to combine the plurality of tomographic images.

3. The computed tomography apparatus according to claim 2,
wherein the processor combines the plurality of tomographic images, selectively using a portion that is closer to a focal axis of the radiation in the first overlapping imaging range.

4. The computed tomography apparatus according to claim 1,
wherein the processor rotates the plurality of imaging units in different directions at the height positions adjacent to each other.

5. The computed tomography apparatus according to claim 1,
wherein the processor receives designation of an imaging range along the rotation axis direction and directs the elevating mechanism to move the plurality of imaging units to the height position corresponding to the designated imaging range.

6. The computed tomography apparatus according to claim 5,
wherein, in a case in which the designated imaging range is within a width of a detection surface for the radiation in the radiation detector, the processor performs the conventional scanning only once at one height position, among the plurality of height positions, which corresponds to the designated imaging range.

7. The computed tomography apparatus according to claim 5, further comprising:
a camera that images the subject,
wherein the processor performs control to display bars indicating upper and lower ends of the imaging range to be superimposed on a camera image obtained from the camera and receives the imaging range designated by an operation of moving the bars.

8. The computed tomography apparatus according to claim 5,
wherein the processor performs control to output a warning in a case in which an upper end of the designated imaging range exceeds an upper limit and in a case in which a lower end of the designated imaging range exceeds a lower limit.

9. The computed tomography apparatus according to claim 1,
wherein the plurality of imaging units have different phases in a rotation direction.

10. The computed tomography apparatus according to claim 9, further comprising:
a displacement mechanism that changes the interval.

* * * * *